(12) United States Patent
Uesugi et al.

(10) Patent No.: US 9,783,365 B2
(45) Date of Patent: Oct. 10, 2017

(54) DRIVING FORCE TRANSMISSION DEVICE AND IMAGE-FORMING APPARATUS

(71) Applicant: CANON KABUSHIKI KAISHA, Tokyo (JP)

(72) Inventors: Takuji Uesugi, Yokohama (JP); Yuji Nakayashiki, Numazu (JP); Taku Fukita, Toride (JP); Akira Kuroda, Numazu (JP); Masao Umezawa, Mishima (JP); Yoshihiro Matsuo, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 14/498,097

(22) Filed: Sep. 26, 2014

(65) Prior Publication Data

US 2015/0090563 A1   Apr. 2, 2015

(30) Foreign Application Priority Data

| Sep. 30, 2013 | (JP) | ................. 2013-205241 |
| Sep. 30, 2013 | (JP) | ................. 2013-205242 |
| Sep. 30, 2013 | (JP) | ................. 2013-205243 |
| Sep. 25, 2014 | (JP) | ................. 2014-195849 |

(51) Int. Cl.
  *F16H 3/60* (2006.01)
  *B65G 13/06* (2006.01)
  *B41J 29/38* (2006.01)

(52) U.S. Cl.
  CPC .............. *B65G 13/06* (2013.01); *B41J 29/38* (2013.01); *F16H 3/60* (2013.01)

(58) Field of Classification Search
  CPC ................................. F16H 3/60; B65G 13/06
  See application file for complete search history.

(56) References Cited

U.S. PATENT DOCUMENTS

| 6,031,650 | A   |   | 2/2000 | Suzuki et al. |
| 6,253,041 | B1  | * | 6/2001 | Tomizawa ......... G03G 15/1695 |
|           |     |   |        | 399/302 |
| 6,392,771 | B1  |   | 5/2002 | Fukita et al. |

(Continued)

FOREIGN PATENT DOCUMENTS

| JP | 61-85755 U  | 6/1986 |
| JP | 07-19298 A  | 1/1995 |

(Continued)

*Primary Examiner* — Ramya Burgess
*Assistant Examiner* — Lillian Nguyen
(74) *Attorney, Agent, or Firm* — Fitzpatrick, Cella, Harper & Scinto

(57) ABSTRACT

Provided is a driving force transmission device including: an actuator (22) that, in a case where one of a first annular gear (11), a second annular gear (14), and a carrier (16) is an input member, another one is an output member, and the remaining one is a rotational member, causes one of the input member and the output member to rotate integrally with the rotational member. When driving force is inputted from the drive source to the input member and input member is rotated unidirectionally, the rotation direction of the output member in the case where one of the input member and the output member rotates integrally with the rotational member is reversed with respect to that in a case where one of the input member and the output member does not rotate integrally with the rotational member.

8 Claims, 32 Drawing Sheets

(56) References Cited

U.S. PATENT DOCUMENTS

| | | |
|---|---|---|
| 8,298,112 B2 | 10/2012 | Takada |
| 9,235,176 B2 * | 1/2016 | Takahashi .......... G03G 15/2064 |
| 2014/0097066 A1 * | 4/2014 | Kim ...................... B65G 13/06 |
| | | 198/791 |
| 2015/0033888 A1 | 2/2015 | Kuroda et al. |

FOREIGN PATENT DOCUMENTS

| | | |
|---|---|---|
| JP | 2008-304050 A | 12/2008 |
| JP | 2011-140980 A | 7/2011 |
| WO | 2009/017551 A2 | 2/2009 |

\* cited by examiner

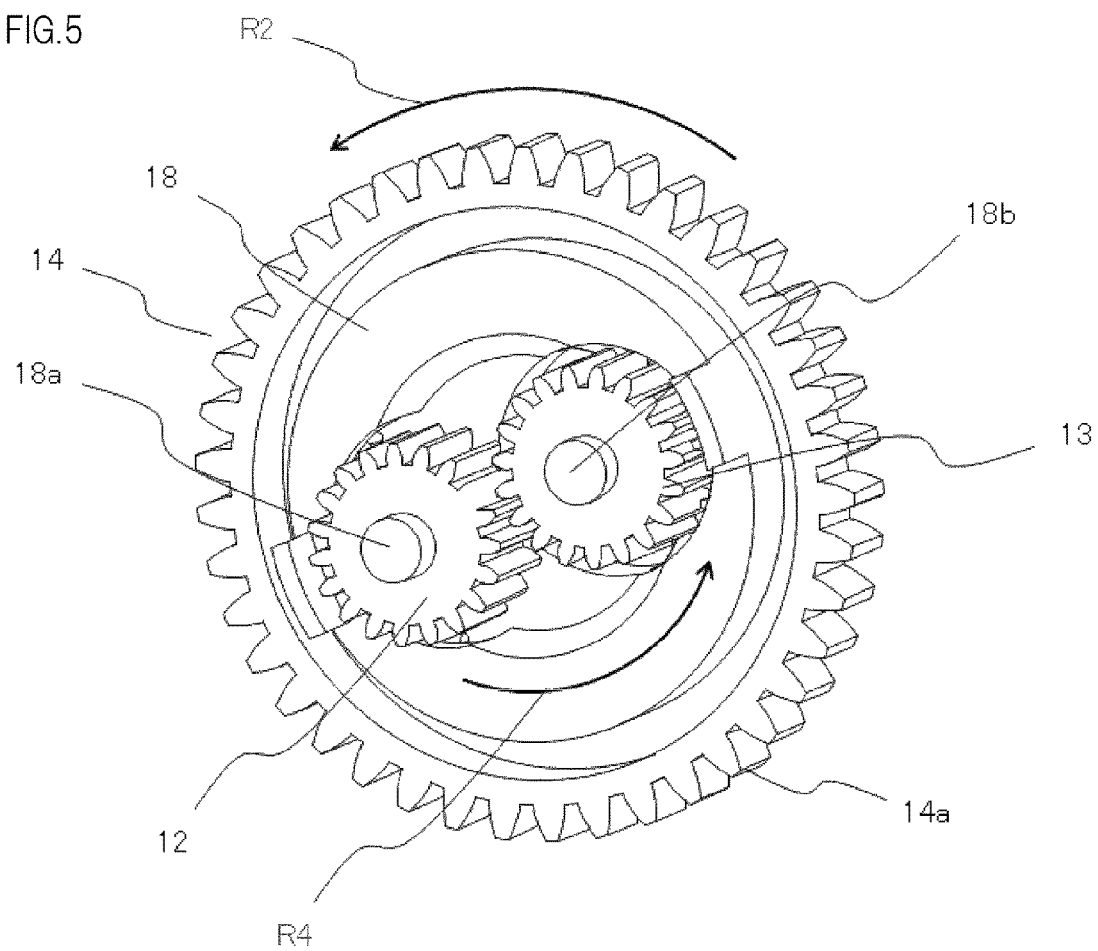

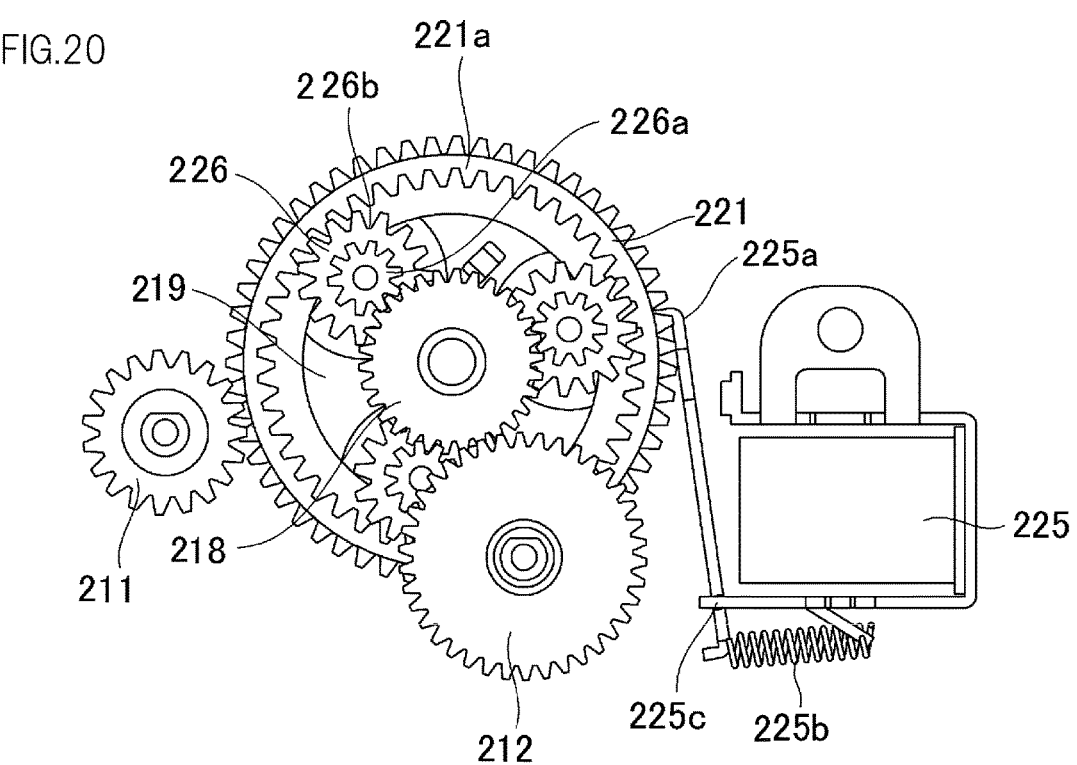

DRIVING FORCE TRANSMISSION DEVICE AND IMAGE-FORMING APPARATUS

BACKGROUND OF THE INVENTION

Field of the Invention

The present invention relates to a mechanism for switching driving force in an image-forming apparatus.

Description of the Related Art

An image-forming apparatus in which a plurality of rotating members is rotationally driven by unidirectional rotational driving force can be equipped with a driving force transmission device that can switch the rotation direction of some rotating members to a reverse direction. The conventional driving force transmission device uses a planetary gear mechanism (Japanese Patent Application Publication No. 2011-140980). The planetary gear mechanism is constituted by three rotating elements, namely, a sun gear, an inner-tooth gear, and a planetary gear carrier, and the rotation direction on the output side can be switched (changed) by distributing the drive input, drive output, and rotation stop between the elements. In the structure disclosed in Japanese Patent Application Publication No. 2011-140980, a drive switching member interlocked with a solenoid is provided between two planetary gear mechanism arranged on the same plane, the drive switching member is engaged with the sun gear of one of the planetary gear mechanism, and a drive transmission path is selected by stopping the rotation thereof. In other words, by selecting a sun gear that actuates and stops the solenoid, it is possible to switch the rotation direction on the output side while the rotation direction on the input side (drive source) remains the same.

However, there is still room for improvement in terms of miniaturization, noise reduction, and other problems in the driving force transmission device disclosed in Japanese Patent Application Publication No. 2011-140980 in which the rotation direction on the output side is switched while the rotation direction on the input side (drive source) remains the same.

SUMMARY OF THE INVENTION

Accordingly, it is an objective of the present invention to improve the configuration that can switch the rotation direction on the output side while the rotation direction on the input side (drive source) remains the same.

Another objective of the present disclosure is to provide a driving force transmission device that transmits driving force from a drive source, the driving force transmission device comprising:
a first annular gear;
a second annular gear rotating coaxially with the first annular gear;
a first inner gear disposed inside the first annular gear and meshing with the first annular gear;
a second inner gear disposed inside the second annular gear and meshing with the second annular gear and the first inner gear;
a carrier rotatably supporting the first inner gear and the second inner gear and rotating coaxially with the first annular gear; and
an actuator that, in a case where one of the first annular gear, the second annular gear, and the carrier is an input member, another one is an output member, and the remaining one is a rotational member, causes either one of the input member and the output member to rotate integrally with the rotational member, wherein
when driving force is inputted from the drive source to the input member and unidirectional rotation is implemented, the rotation direction of the output member in a case where one of the input member and the output member rotates integrally with the rotational member is reversed with respect to that in a case where one of the input member and the output member does not rotate integrally with the rotational member.

Another objective of the present disclosure is to provide a driving force transmission device, which is provided with:
a rotatable sun gear; a planetary gear that meshes with the sun gear and can revolve around the sun gear; an inner-tooth gear that meshes with the planetary gear and can rotate coaxially with the sun gear; and a carrier that rotatably supports the planetary gear and can rotate coaxially with the sun gear, and in which
in a case where one of the sun gear, the inner-tooth gear, and the carrier is an input member, another one is an output member, and the remaining one is a rotational member, driving force from a drive source is transmitted from the input member to the output member,
the driving force transmission device comprising:
an engagement portion that is held at the rotational member and can move to an engaging position in which the engagement portion is engaged with one of the input member and the output member and a disengaging position in which the engagement portion is not engaged with one of the input member and the output member;
a biasing member that biases the engagement portion to move from the disengaging position to the engaging position; and
an actuator having a movable portion that can move to a contact position in which the movable portion is in contact with the rotational member and a separated position in which the movable portion is separated from the rotational member, wherein
when the movable portion is at the separated position, the engagement portion is at the engaging position in which the engagement portion is engaged with the one of the input member and the output member and the rotational member rotates integrally with the one of the input member and the output member; and
the engagement portion is moved to the disengaging position, in which the engagement portion is not engaged with the one of the input member and the output member, and the rotation of the rotational member is regulated by contacting with the movable portion that is in the contact position contacting with the rotational member.

Another objective of the present disclosure is to provide a driving force transmission device, which is provided with:
a rotatable sun gear; a planetary gear that meshes with the sun gear and can revolve around the sun gear; an inner-tooth gear that meshes with the planetary gear and can rotate coaxially with the sun gear; and a carrier that rotatably supports the planetary gear and can rotate coaxially with the sun gear, and in which
in a case where one of the sun gear, the inner-tooth gear, and the carrier is an input member, another one is an output member, and the remaining one is a first rotational member, driving force from a drive source is transmitted from the input member to the output member,
the driving force transmission device comprising:
a rotatable second rotational member meshing with the first rotational member, wherein in a state in which the rotation of the first rotational member is stopped by stopping the rotation of the second rotational member when the input member is caused to rotate unidirectionally by the driving force from the drive source, the output member rotates in a first direction, and in a state in which the first rotational member is caused to rotate in the same direction as the input member by rotating the second rotational member, the output member rotates in a second direction opposite to the first direction.

Further features of the present invention will become apparent from the following description of exemplary embodiments (with reference to the attached drawings).

BRIEF DESCRIPTION OF THE DRAWINGS

FIG. 5 illustrates the operation of gears at the time of switchback in Embodiment 1 of the present invention;

FIG. 20 illustrates the configuration of the planetary gear of the driving force transmission device according to Embodiment 6 of the present invention;

DESCRIPTION OF THE EMBODIMENTS

Now, with reference to the drawings, the implementation of the present invention will be described below in detail in an illustrative manner based on embodiments. However, the sizes, materials, shapes, relative arrangements, and the like of components described in the embodiments should be appropriately changed in accordance with the configuration of an apparatus to which the invention is applied or with any of various conditions. That is, the scope of the invention is not intended to be limited to the following embodiments.

(Embodiment 1)

The driving force transmission device and image-forming apparatus according to Embodiment 1 of the present invention will be explained hereinbelow with reference to FIGS. 1 to 6.

<Image-Forming Apparatus>

Figure 1:
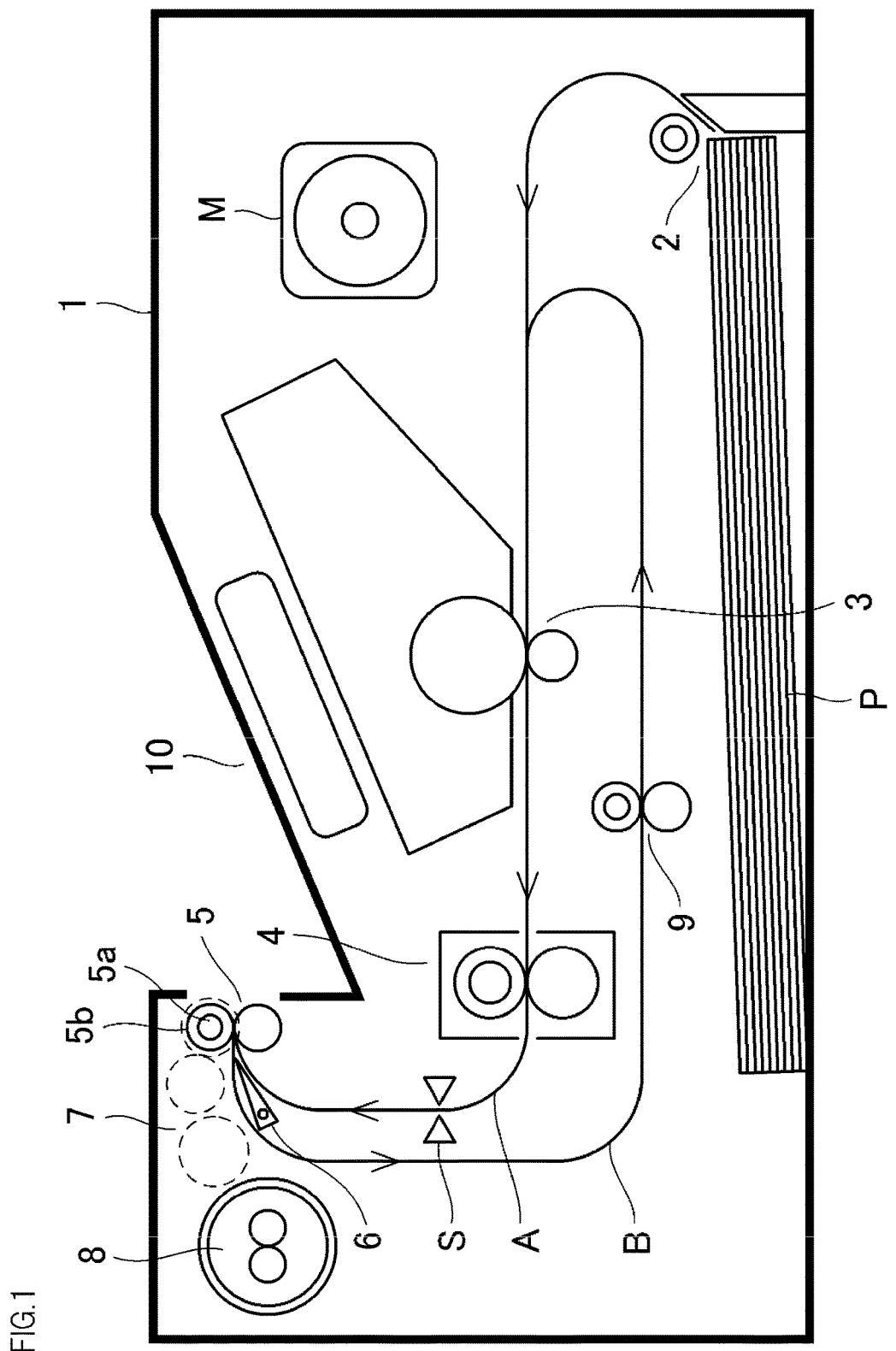
FIG. 1 is a schematic cross-sectional view of the image-forming apparatus according to Embodiment 1 of the present invention.

The image-forming apparatus according to Embodiment 1 of the present invention will be explained hereinbelow with reference to FIG. 1. FIG. 1 is a schematic cross-sectional view illustrating the schematic configuration of the image-forming apparatus according to the present embodiment. A copier and a printer capable of two-sided printing are examples of the image-forming apparatus 1 according to the present embodiment.

When two-sided printing is performed in the image-forming apparatus 1 according to the present embodiment, as depicted in FIG. 1, a paper sheet P as a recording material is conveyed through a conveying path A from a paper feed unit 2 via an image-forming unit 3 and a fixing unit 4 and printed on one side (front surface). Then, before the rear end of the paper sheet P passes by a discharging roller (rotating member) 5a in a paper discharge unit 5, the rotation direction of the discharging roller 5a is switched from the direction in which the paper sheet P is discharged into a paper discharge tray 10 to a switchback direction (reverse direction), thereby reversing the conveying direction of the paper sheet P. The paper sheet P is conveyed by a flapper 6 to a conveying path B and conveyed upstream of the image-forming unit 3 through a two-sided conveying unit 9, printed again on the second side (rear surface) in the conveying path A, and then discharged. Since the conveying of the paper sheet is unidirectional in the paper feed unit 2, the image-forming unit 3, the fixing unit 4, and the two-sided conveying unit 9, each drive member is driven by a unidirectionally rotating motor M. The image-forming apparatus 1 according to the present embodiment is provided with a driving force transmission device 8 that performs forward/reverse switching only of the output direction of a driving force, while maintaining the unidirectional rotation of the input to the drive members, in order to reverse at random the rotation direction of the discharging roller 5a during the two-sided printing.

<Driving Force Transmission Device>

Figure 2:
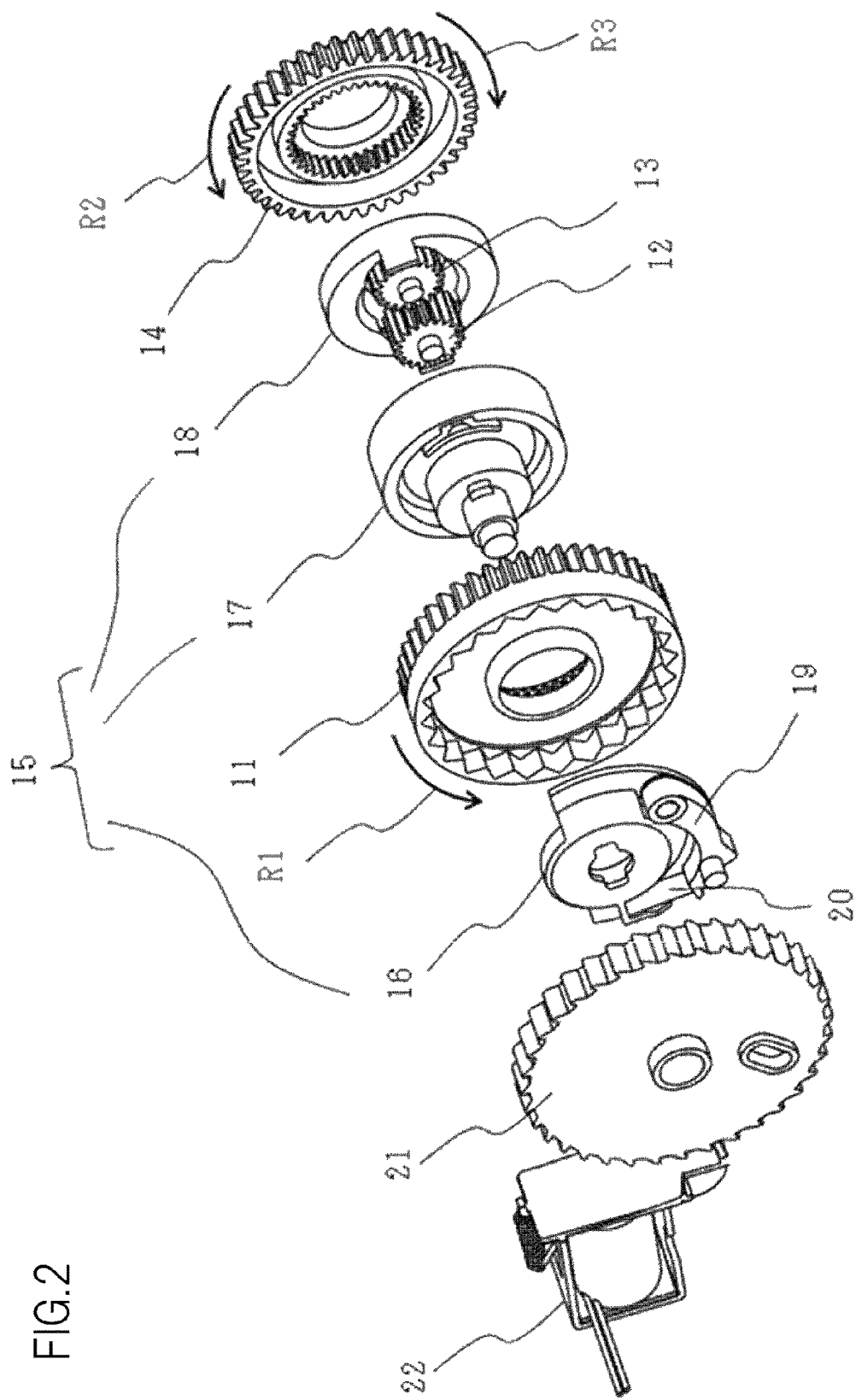
FIG. 2 is a configuration diagram of the driving force transmission device according to Embodiment 1 of the present invention.

The schematic configuration of the driving force transmission device according to Embodiment 1 will be explained hereinbelow with reference to FIG. 2. FIG. 2 is an exploded perspective view illustrating the configuration of the driving force transmission device 8 according to the present embodiment.

The driving force transmission device 8 is provided mainly with an input gear (first annular gear) 11, an output gear (second annular gear) 14, drive transmission gears (first and second inner gears) 12, 13, and a carrier unit (carrier) 15. The input gear 11 is an input member that rotates by receiving driving force from the motor M through a drive gear train (not depicted in the figure). The output gear 14 is an output member that outputs the driving force to a discharging roller drive gear train (driven member) 7 rotating the discharging roller 5a. The drive transmission gears 12, 13 serve to transmit the drive from the input gear 11 to the output gear 14. The carrier unit 15 is constituted by three carriers 16, 17, and 18. The carrier 16 holds a locking lever 19 and a pushing spring 20, the carrier 17 holds the input gear 11 and has an axis of rotation of a disk member 21, and the carrier 18 is a rotational member that holds the output gear 14 and the drive transmission gears 12, 13 and can rotate coaxially with the input gear. Those three carriers 16 to 18 are integrated by fitting. The locking lever 19 is rotatably held as an engagement portion on the carrier 16. The locking lever 19 can be moved by a biasing force of the pushing spring 20, which serves as a biasing member, between an engaging position in which the input gear 11 is engaged with the carrier 16 and a disengaging position in which the input gear is not engaged, and the locking lever restrains and integrates the input gear 11 and the carrier unit 15 when moved to the engaging position. The disk member 21 controls the operation of the locking lever 19 and is configured to so that the rotation thereof is locked by a solenoid 22 serving as an actuator.

Figure 3A:
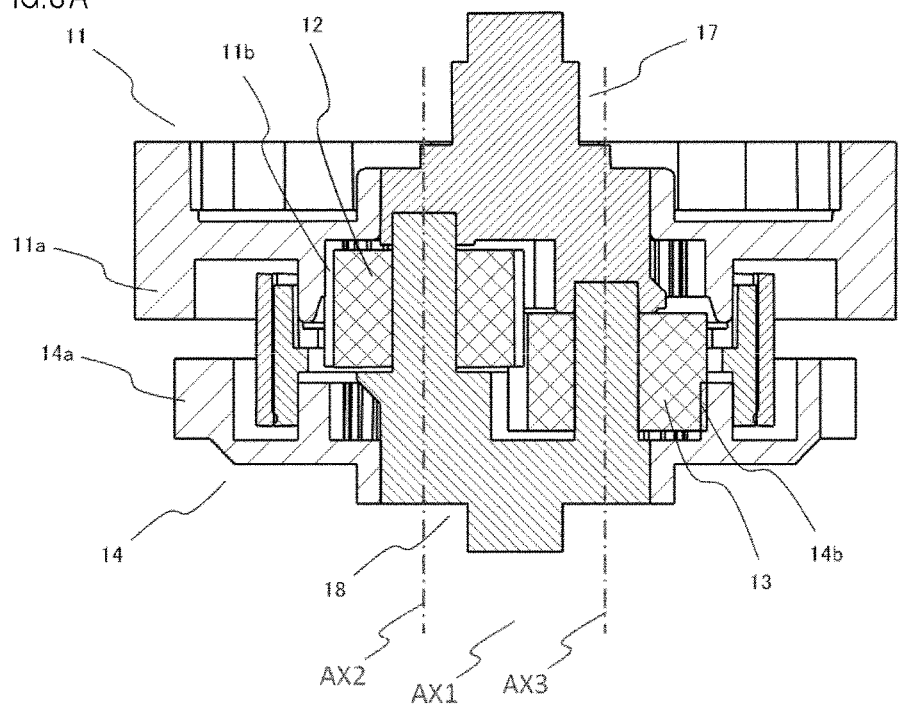
FIGS. 3A and 3B are cross-sectional views of the driving force transmission device according to Embodiment 1 of the present invention.
Figure 3B:
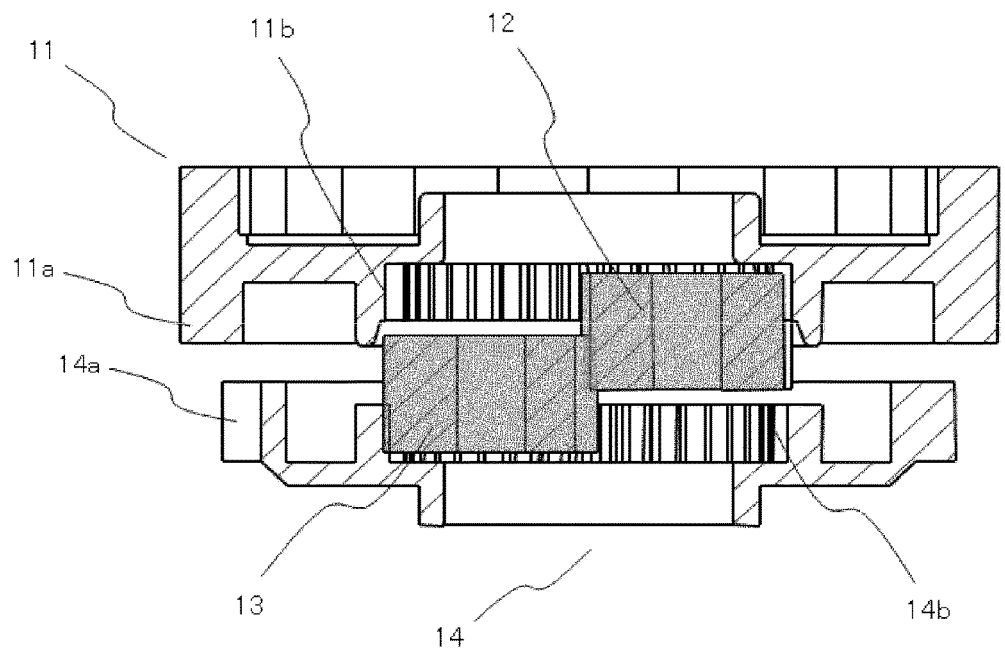

The meshing relationship of the input gear 11, the output gear 14, and the drive transmission gears 12, 13 is explained hereinbelow with reference to FIG. 3. FIG. 3 is a cross-sectional view illustrating part of the configuration of the driving force transmission device 8. FIG. 3A depicts the input gear 11, the output gear 14, the drive transmission gears 12, 13, and the carriers 17, 18, and FIG. 3B depicts the configuration depicted in FIG. 3A in which the carriers 17, 18 are omitted.

The input gear 11 has outer teeth 11a which mesh with a drive gear train (not depicted in the figure) and input rotational driving force, inner teeth 11b which mesh with the drive transmission gear 12, and a hole for inserting a shaft portion of the carrier 17, and is rotatably supported on the shaft portion of the carrier 17. The drive transmission gears 12, 13 are parts of the same shape that are rotatably supported on rotation shafts 18a, 18b, respectively, which are provided at the carrier 18, and the outer teeth thereof mesh at meshing positions shifted with respect to each other in the axial direction. Thus, the drive transmission gears 12, 13 are configured such that mutually meshing gear portions and gear portions meshing with the input gear 11 or the output gear 14 are arranged side by side in the direction of axes of rotation (AX2, AX3 direction). The output gear 14 has outer teeth 14a outputting the rotational driving force to the discharging roller drive gear train 7, inner teeth 14b meshing with the drive transmission gear 13, and a hole for inserting a shaft portion of the carrier 18, and is rotatably supported by the shaft portion of the carrier 18. The drive transmission gear (first inner gear) 12 meshes with the inner teeth 11b of the input gear 11, the drive transmission gear (second inner gear) 13 meshes with the drive transmission gear 12, and the drive transmission gear 13 meshes with the inner teeth 14b of the output gear 14, whereby the driving force is successively transmitted from the input gear 11 to the output gear 14. Where the geometric axes of rotation are considered, the input gear 11, the output gear 14, and the carrier 18 rotate about the same axis AX1, whereas the axes of rotation AX2, AX3 of the drive transmission gears 12, 13 are parallel to the axis AX1, but are not the same axis.

In the driving force transmission device 8 of the above-described configuration, the outer teeth 11a of the input gear 11 obtain the drive of unidirectional rotation in the direction of an arrow R1 from the motor M, which is a drive source, through a drive gear train (not depicted in the figure). Further, the discharging roller gear 5b, which rotates the discharging roller 5a, obtains the drive from the outer teeth 14a of the output gear 14 through the discharging roller drive gear train 7, and as the rotation direction of the output gear 14 is switched, the drive of the discharging roller 5a is reversed accordingly.

<<Forward Rotation Operation>>

At the time of forward rotation operation in which the discharging roller 5a is rotationally driven in the direction of discharging the paper sheet P, in the driving force transmission device 8, the rotational driving force in the direction of the arrow R1 which is inputted to the input gear 11 becomes the rotational driving force in the direction of an arrow R3 and is outputted from the output gear 14. At the time of the forward rotation operation, the driving force transmission device 8 is in a state in which the energizing of the electromagnet of the solenoid 22 is OFF and the rotation of the disk member 21, which is the member to be acted upon, is regulated by an armature (movable portion) of the solenoid 22 located at an operation position (contact position).

Since the rotation of the disk member 21 is regulated, the state assumed after the engagement state of the locking lever 19 with the input gear 11 has been released is maintained, and the rotation of the carriers 16, 17, and 18 in the carrier unit 15 is regulated. The rotational driving force in the direction of the arrow R1 which is inputted to the input gear 11 is transmitted to the output gear 14 through the drive transmission gears 12, 13 rotatably supported by the stopped carrier 18, and the transmitted power is outputted as the rotational driving force in the direction of the arrow R3 which is opposite to the direction of the arrow R1. Since the drive transmission gear 12 meshes with the inner teeth of the input gear 11, the drive transmission gear rotates in the same direction as the input gear 11. Since the drive transmission gear 13 meshes with the inner teeth of the output gear 14, the drive transmission gear rotates in the same direction as the output gear 14. The conversion of the rotation direction of the rotational driving force is performed between the drive transmission gears 12, 13.

<<Reverse Rotation Operation>>

At the time of reverse rotation operation in which the discharging roller 5a is rotationally driven in the direction opposite that of discharging the paper sheet P, in the driving force transmission device 8, the rotational driving force in the direction of the arrow R1 which is inputted to the input gear 11 becomes the rotational driving force in the direction of an arrow R2 and is outputted from the output gear 14. At the time of the reverse rotation operation, the driving force transmission device 8 is in a state in which the energizing of the electromagnet of the solenoid 22 is ON, and the armature is pulled to the electromagnet and located at a non-operation position (separated position). Since no regulation is performed by the armature of the solenoid 22, the disk member 21 can freely rotate. Since no regulation is performed by the solenoid 22 through the disk member 21, the locking lever 19 receives the biasing force of the pushing spring 20 and engages with the input gear 11. Because of this engagement, the carrier 16 is locked to the input gear 11. Therefore, a state is assumed in which the carrier 16 rotates integrally with the input gear 11, and the carriers 17 and 18 which are integrated with the carrier 16 also rotate integrally with the input gear 11. The drive transmission gear 12 supported by the carrier 18 is maintained in a stopped (fixed) state with respect to the carrier 18 because no relative displacement occurs between the carrier 18 and the input gear 11. Likewise, the drive transmission gear 13 supported by the carrier 18 is also maintained in a stopped (fixed) state with respect to the carrier 18 because no relative displacement occurs between the drive transmission gear 12 and the carrier 18. Therefore, the drive transmission gear 13 is integrated with the input gear 11 and other components of the carrier unit 15 and moves circularly in the same direction as the direction of the arrow R1 about the axis of rotation of the input gear 11. Since the input gear 11 and the carrier unit 15 rotate integrally, the rotational driving force in the direction of the arrow R1 which is inputted to the input gear 11 is transmitted to the output gear 14 through the drive transmission gear 13 that moves circularly in the same direction. Since the output gear 14 receives the rotational driving force by the inner teeth 14b from the drive transmission gear 13 that moves circularly while being fixed to the carrier 18, the output gear 14 rotates in the direction of the arrow R2, which is the same as the direction of the arrow R1, and outputs the rotational driving force.

<<Switching from Forward Rotation to Reverse Rotation>>

Figure 4A:
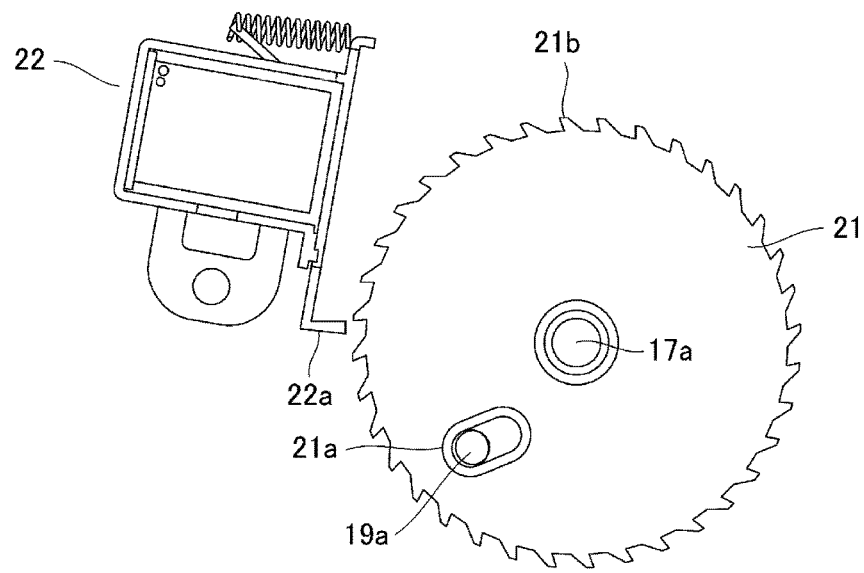
FIGS. 4A and 4B illustrate the operation of the driving force transmission device at the time of switchback in Embodiment 1 of the present invention.
Figure 4B:
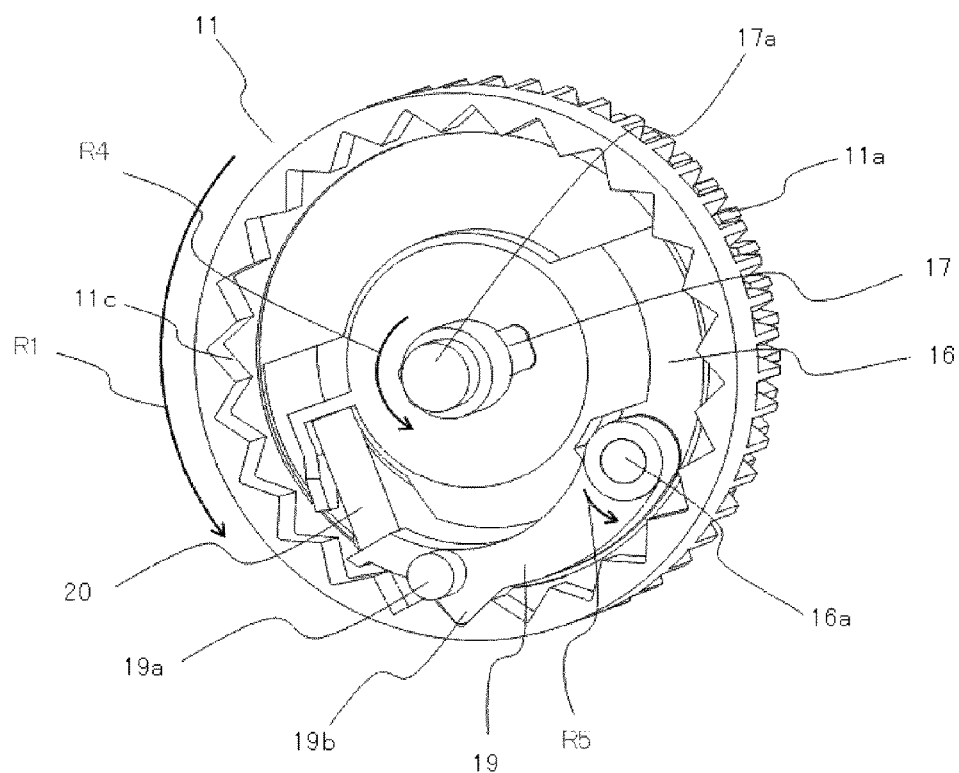

The configuration and operation of the driving force transmission device 8 at the time of switchback of the paper sheet P in the paper discharge unit 5 (when the discharging roller 5a is switched from the forward rotation operation to the reverse rotation operation) will be explained hereinbelow with reference to FIGS. 4 and 5. The switching operation is performed when the paper sheet P that has been printed on one surface (one side) is conveyed from the conveying unit 5 to the conveying path B in the two-sided printing process. FIG. 4 is a schematic diagram illustrating the operation of each component of the driving force transmission device 8 in switching from the forward rotation to the reverse rotation. FIG. 4A illustrates the operation of the disk member 21 and the solenoid 22, and FIG. 4B illustrates the operation of the input gear 11 and the carrier 16. FIG. 5 illustrates the operation of the drive transmission gears 12, 13 and the output gear 14 at the time of switching from the forward rotation to the reverse rotation.

As depicted in FIG. 4A, where the energized solenoid 22 generates an electromagnetic force and attracts the armature 22a, a state in which a portion-to-be-locked 21b of the disk member 21 is locked by the armature 22a is released. At this time, as depicted in FIG. 4B, the locking lever 19 which is held rotatably on a rotation shaft 16a of the carrier 16 receives the biasing force of the pushing spring 20 and rotates in the direction of an arrow R5, and a locking portion 19b engages with a portion-to-be-locked (portion to be engaged) 11c of the input gear 11. Where the input gear 11 and the carrier unit 15 are restrained (integrated) by the locking lever 19, the carrier unit 15 also rotates in the direction of an arrow R4 about a rotation shaft 17a by the rotation of the input gear 11 in the direction of the arrow R1. At this time, the locking lever 19 is biased by the pushing spring 20 and fixed in a state of locking the disk member 21, and the disk member 21 is integrated with the carrier 16 by a pin 19a of the locking lever 19 which is inserted into an elongated round orifice (guiding orifice) 21a. As a result, the rotational driving force of the carrier 16 acts upon the disk member 21 through the pin 19a of the locking lever 19, and the disk member rotates together with the carrier unit 15 in the direction of the arrow R4.

As depicted in FIG. 5, the drive transmission gears 12, 13 are held rotatably on the rotation shafts 18a, 18b, respectively, which are provided at the carrier 18, but the drive transmission gears are stopped with respect to the rotation shafts 18a, 18b by the integrated rotation of the input gear 11 and the carrier unit 15. Thus, the drive transmission gears 12, 13 are also integrated with the carrier unit 15 and rotate (move circularly) in the direction of the arrow R4. Therefore, in this state, all of the constituent elements of the driving force transmission device 8, with the exception of the solenoid 22, are integrated and rotate in the direction of the arrow R1, and the rotation of the output gear 14 is in the direction of the arrow R2. As a result, the drive of the output gear 14 is transmitted to the discharging roller gear 5b through the discharging roller drive gear train 7, and the discharging roller 5a rotates in the direction of pulling the paper sheet P into the conveying path B.

<<Switching from Reverse Rotation to Forward Rotation>>

Figure 6A:
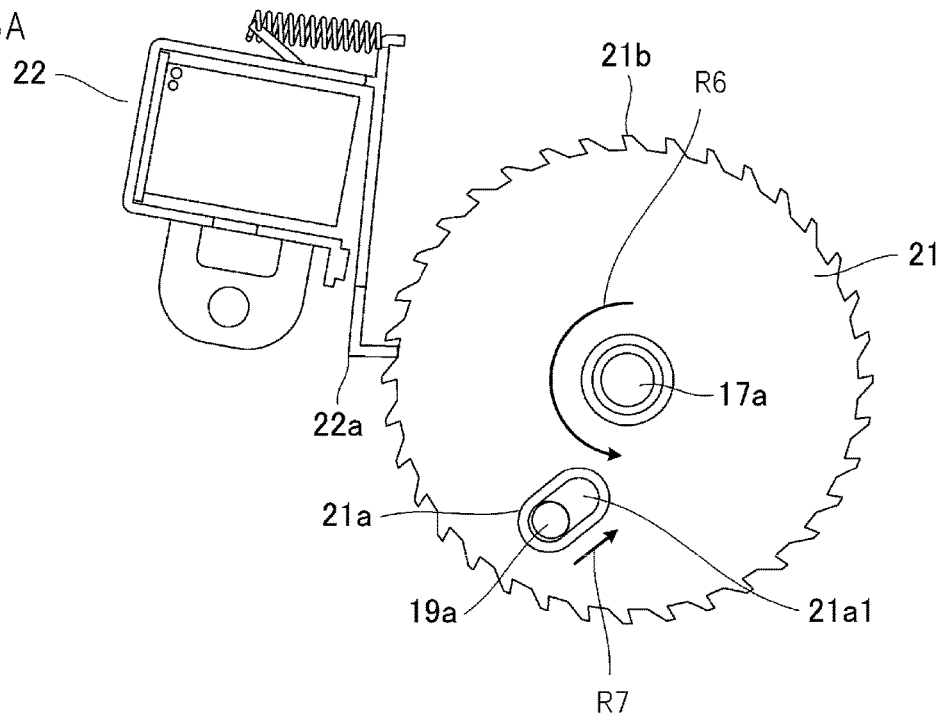
FIGS. 6A and 6B illustrate the operation of the driving force transmission device at the time of paper discharge in Embodiment 1 of the present invention.
Figure 6B:
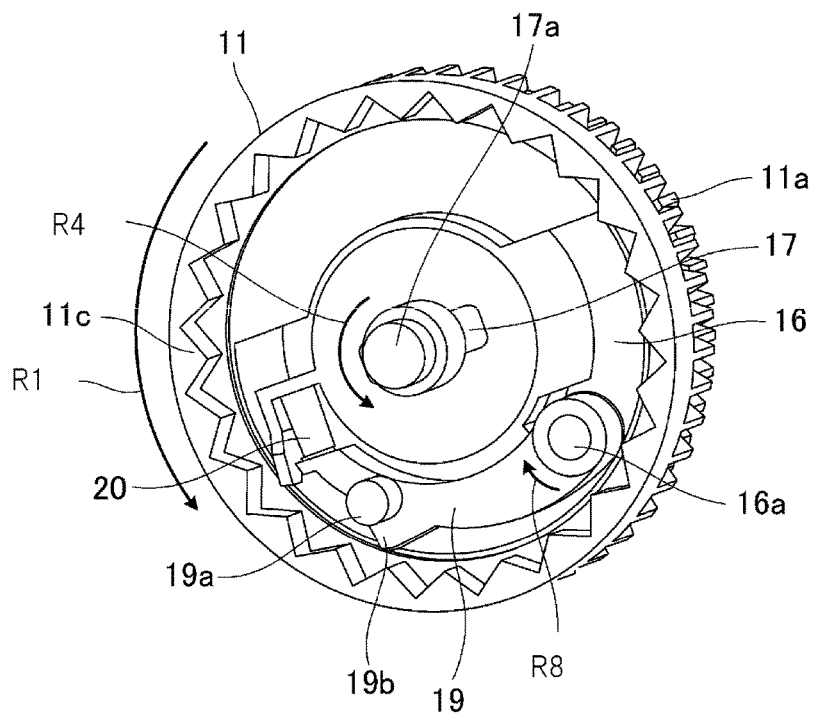
Figure 7:
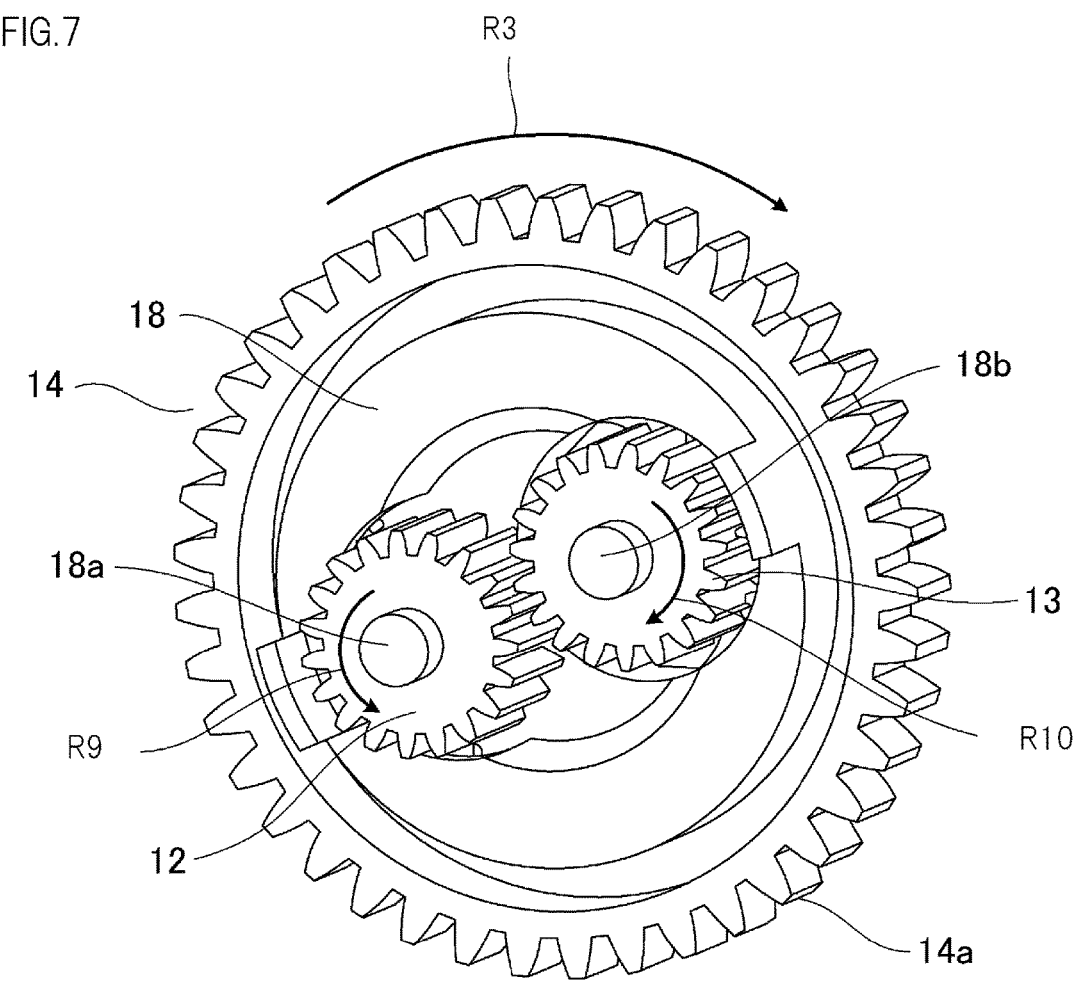
FIG. 7 illustrates the operation of gears at the time of paper discharge in Embodiment 1 of the present invention.

The drive switching (switching from the reverse rotation operation to the forward rotation operation) of the discharging roller 5a at the time the paper sheet P is discharged to the paper discharge tray 10 will be explained hereinbelow with reference to FIGS. 6 and 7. FIG. 6 illustrates the configuration and operation of the driving force transmission device 8 in switching of the discharging roller 5a from the reverse rotation to the forward rotation. FIG. 6A illustrates the operation of the disk member 21 and the solenoid 22, and FIG. 6B illustrates the operation of the input gear 11 and the carrier 16. FIG. 7 illustrates the operation of the drive transmission gears 12, 13 and the output gear 14 at the time of switching from the reverse rotation to the forward rotation.

As depicted in FIG. 6A, when the energizing of the solenoid 22 is switched from ON to OFF, a hook portion (contact region) at the tip of the armature 22a engages (comes into contact) with the portion-to-be-locked (region to be contacted) 21b provided at the outer rim of the disk member 21, and the rotation of the disk member 21 rotating in the direction of an arrow R6 is stopped. In this case, since the carrier unit 15 and the locking lever 19 continue rotating in the direction of the arrow R4, the locking lever 19 rotates on the carrier 16 in conjunction with the operation of guiding the pin 19a in the direction of an arrow R7 along the elongated round orifice 21a of the disk member 21. The elongated round orifice 21a guides the pin 19a so that the circular trajectory of the pin 19a deviates from the circular trajectory at the time the disk member 21 rotates together with the carrier unit 15.

As depicted in FIG. 6B, as a result of the pin 19a being guided by the elongated round orifice 21a, the locking lever 19 rotates in the direction of an arrow R8 about the rotation shaft 16a against the biasing force of the pushing spring 20. Due to such rotation, the locking portion 19b of the locking lever 19 withdraws from the position of engagement with the portion-to-be-locked 11c of the input gear 11 to the disengaging position, and the restraint of the carrier unit 15 and the input gear 11 is released. Where the withdrawal of the locking lever 19 is completed and the pin 19a moves to an end portion 21a1 of the elongated round orifice 21a of the disk member 21, the circular movement of the locking lever 19 in the direction of the arrow R4 about the rotation shaft 17a is regulated by the disk member 21. As a result, the rotation of the carrier unit 15 in the direction of the arrow R4 is regulated by the armature 22a.

As depicted in FIG. 7, the drive transmission gear 12 is rotated in the direction of an arrow R9 about the rotation shaft 18a of the carrier 18 by the rotational driving force transmitted from the input gear 11. The drive transmission gear 13 is rotated in the direction of an arrow R10, which is opposite to the rotation direction of the drive transmission gear 12, about the rotation shaft 18b of the carrier 18 by the rotational driving force transmitted from the drive transmission gear 12. Furthermore, the rotational driving force is transmitted from the drive transmission gear 13 to the output gear 14, the rotation direction of the output gear 14 is reversed with respect to the direction of the arrow R1, which is the rotation direction of the input gear 11, and the rotational driving force in the direction of the arrow R3 is outputted. In this case, the rotational driving force of the output gear 14 is transmitted to the discharging roller gear 5b through the discharging roller drive gear train 7, and the discharging roller 5a rotates in the direction of discharging the paper sheet P to the paper discharge tray 10.

According to the present embodiment, the driving force transmission device of the image-forming apparatus exhibits advantages.

The following advantages are obtained in comparison with the configuration in which the output direction is switched by using a planetary mechanism including a sun gear, a planetary gear, a carrier for the planetary gear, and an inner-tooth gear disposed on the outer periphery of the planetary gear and restricting, or not restricting two of the three elements, namely, the sun gear, carrier, and inner-tooth gear. In the planetary mechanism, a space should be provided inside the inner-tooth gear to dispose the sun gear coaxially with the inner-tooth gear and enable the revolution of the planetary gear therearound. Therefore, the inner diameter of the inner-tooth gear should be about the size obtained by adding the width of two planetary gears to the width of one sun gear. Meanwhile, the drive transmission gears 12, 13 are disposed inside the input gear 11 and inside the output gear 14, but the axes AX2 and AX3 of rotation thereof are different from the axis AX1 of rotation of the input gear 11 and the output gear 14. Therefore, the inner diameter of the input gear 11 and the inner diameter of the output gear 14 may be about the size obtained by adding up the widths of the drive transmission gears 12 and 13. Therefore, the drive transmission configuration from the input gear 11 to the output gear 14 can be miniaturized in the radial direction of the input gear 11 and output gear 14.

Further, the disk member 21 obtains the rotational power in the direction of the arrow R6 from the carrier unit 15 through the locking lever 19, and the rotation thereof is locked by the armature 22a of the solenoid 22. Therefore, when the armature 22a is pulled from the disk member 21, the force in the rotation direction of the disk member 21 acts as a frictional force upon the engagement point of the disk member 21 and the armature 22a and becomes a load when the armature 22a is actuated. Meanwhile, when the armature 22a is actuated, the disk member 21 is locked and the rotation in the direction of the arrow R6 is stopped, and since the disk member 21 and the armature 22a are not engaged during the actuation, no load is applied to the armature 22a. Therefore, by switching the drive under an applied drag force, in particular, by allocating an attraction force of the powerful solenoid to the operation of pulling the armature 22a, it is possible to increase the allowed range of torque applied to the disk member 21 by comparison with the conventional configuration in which the drive is switched by using also a repulsive force.

By optimizing the torque value applied to the disk member 21 and reducing the revolution speed, it is possible to suppress impacts occurring when the portion-to-be-locked 21b of the disk member 21 is locked to the armature 22a of the solenoid 22, and the occurrence of sudden sounds can be reduced. Further, since all of the constituent elements of the driving force transmission device 8, with the exception of the solenoid 22, are held at the carrier unit 15 and integrated therewith, the size of the structure can be easily reduced in comparison with the size of a conventional structure.

Further, in the configuration of the present embodiment, the carrier is engaged with the input gear as one gear, but a configuration with the engagement with the output gear as another gear may be also used.

A configuration may be also used in which the gear 11 is not necessarily an input member inputting the driving force from the motor M, the gear 14 is not an output member outputting the driving force to the driven member, and the carrier unit 15 is not a rotational member. In other words, a configuration may be used in which one of the gear (first annular gear) 11, the gear (second annular gear) 14, and the carrier unit (carrier) 15 is an input member, another one is an output member, and the remaining one is a rotational member, and it is possible to select between rotating and not rotating the rotational member and one of the input member and output member integrally.

(Embodiment 2)

The driving force transmission device according to Embodiment 2 of the present invention will be described hereinbelow with reference to FIGS. 8 to 11. The driving force transmission device of the present embodiment also can be used in the image-forming apparatus 1 explained in Embodiment 1. In the present embodiment, functions and components same as those in Embodiment 1 are assigned with same reference numerals and the explanation thereof is herein omitted. The features that are not explained herein are the same as in Embodiment 1.

<Driving Force Transmission Device>

Figure 8:
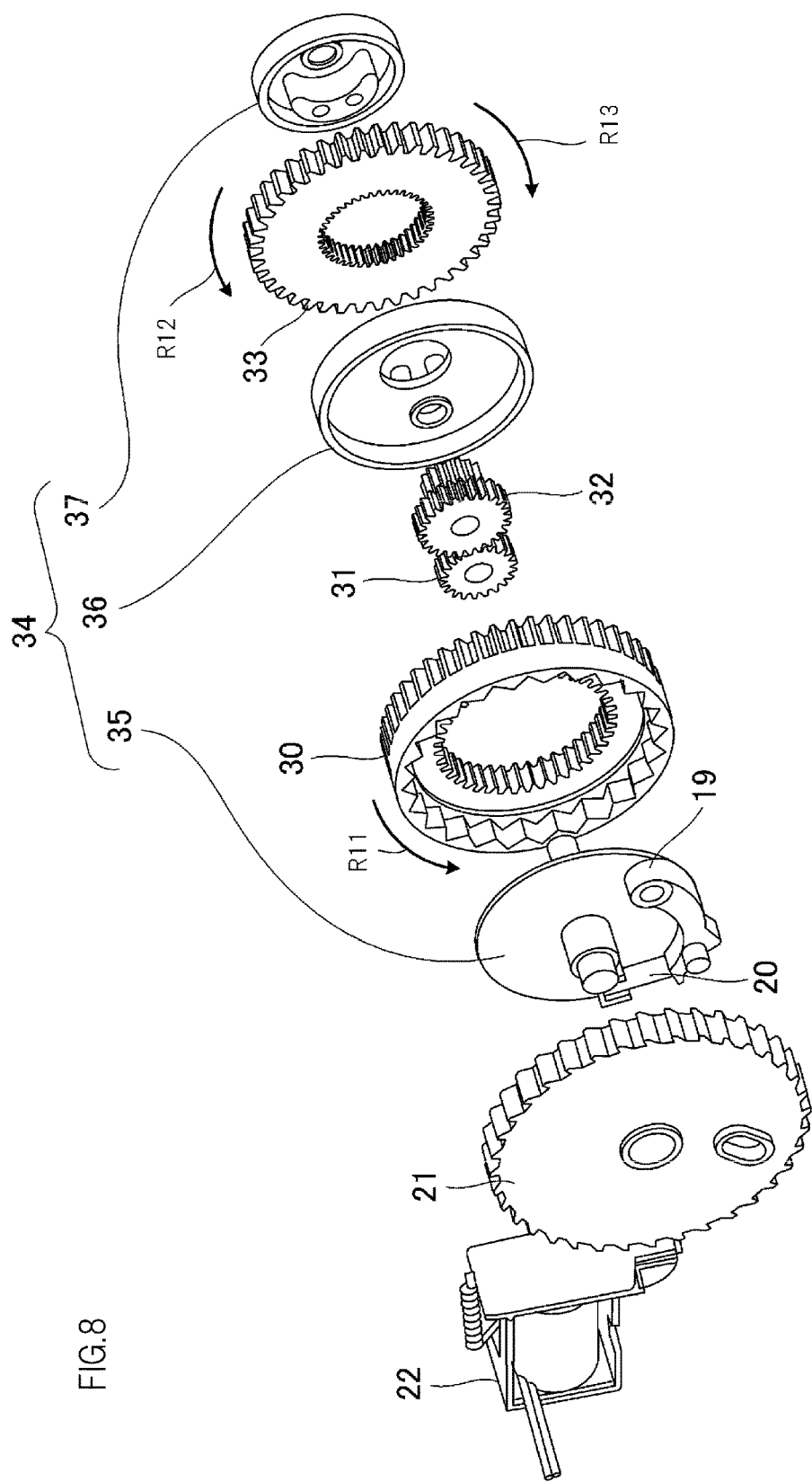
FIG. 8 is a configuration diagram of the driving force transmission device according to Embodiment 2 of the present invention.

The schematic configuration of the driving force transmission device 8 according to Embodiment 2 will be explained hereinbelow with reference to FIG. 8. FIG. 8 is an exploded perspective view illustrating the configuration of the driving force transmission device 8 according to the present embodiment.

The driving force transmission device 8 according to Embodiment 2 is provided mainly with an input gear 30, an output gear 33, a drive transmission gear 31, a reduction gear 32, and a carrier unit 34. The input gear 30 is an input member that rotates by receiving driving force from the motor M. The output gear 33 outputs the drive to the discharging roller drive gear train 7. The drive transmission gear 31 and the reduction gear 32 serve to transmit the drive from the input gear 30 to the output gear 33. The carrier unit 34 is constituted by three parts, namely, carriers 35, 36 that hold the locking lever 19 and the pushing spring 20 and have an axis of rotation of the input gear 30 and the disk member 21, and the carrier 37 that holds the output gear 33. The three parts are integrated by fitting. The locking lever 19 that is held rotatably at the carrier 35 restrains and integrates the input gear 30 and the carrier unit 34 when the input gear 30 is locked to the carrier 35 by the biasing force of the pushing spring 20. The disk member 21 controls the operation of the locking lever 19 and is configured so that the rotation thereof is locked by the solenoid 22.

Figure 9:
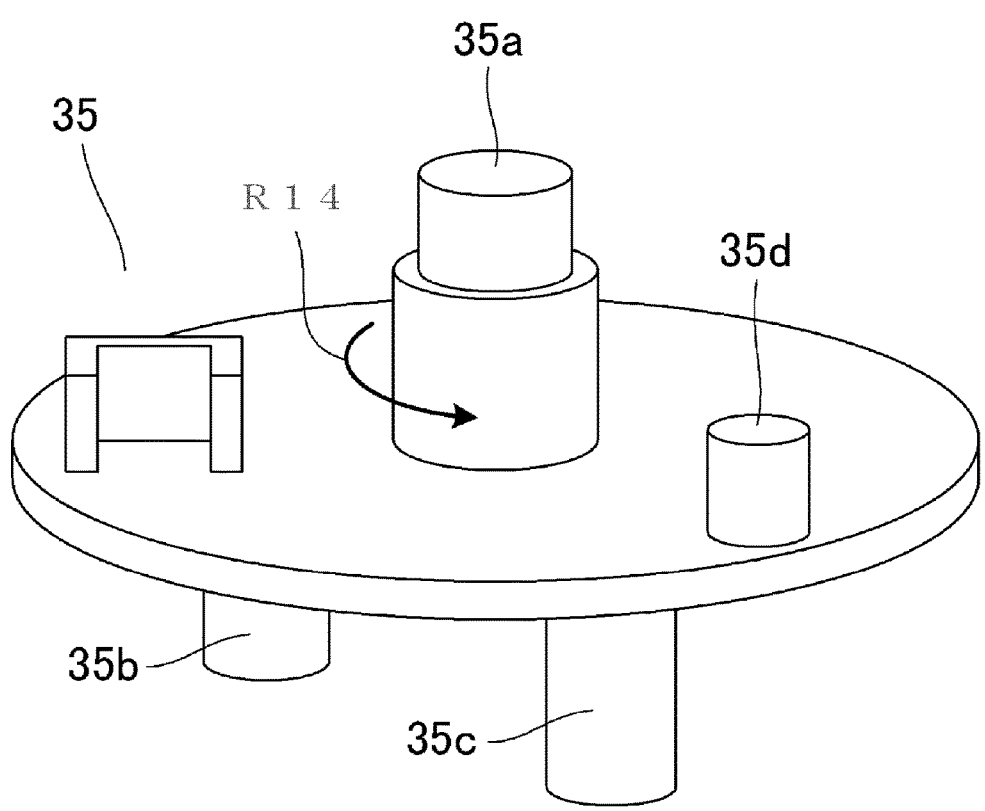
FIG. 9 is a configuration diagram of the carrier in Embodiment 2 of the present invention.

FIG. 9 is a perspective view illustrating the configuration of the carrier 35. The carrier 35 has a rotation shaft 35a serving as a rotation center for the input gear 30 and the disk member 21, a rotation shaft 35b of the drive transmission gear 31, and a rotation shaft 35c of the reduction gear 32, and the locking lever 19 is rotatably held at the rotation shaft 35d. Unidirectional rotation in the direction of the arrow R11 is inputted to the outer teeth 30a of the input gear 30 depicted in FIG. 8, and the input gear 30 rotates about the rotation shaft 35a of the carrier 35.

Figure 10:
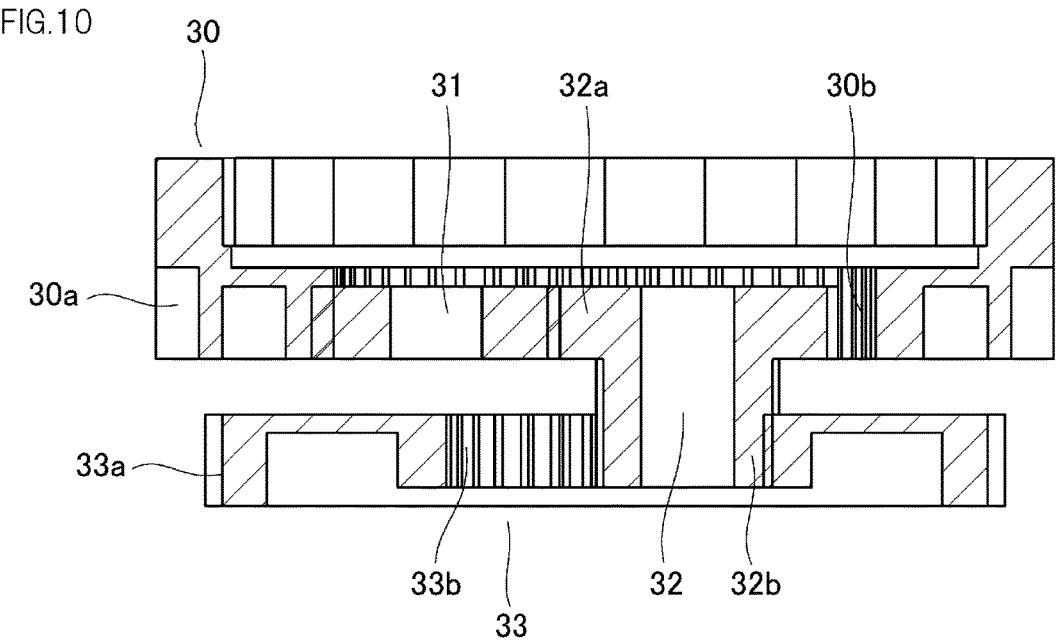
FIG. 10 is a cross-sectional view of the driving force transmission device according to Embodiment 2 of the present invention.

FIG. 10 is a cross-sectional view illustrating the meshing relationship of the input gear 30, the drive transmission gear 31, the reduction gear 32, and the output gear 33. Parts other than the aforementioned four parts are omitted in the figure.

The input gear 30 has outer teeth 30a which mesh with a drive gear train (not depicted in the figure) and input the rotational driving force, inner teeth 30b which mesh with the drive transmission gears 31 and the reduction gear 32, and a hole for inserting a shaft portion of the carrier 35, and is rotatably supported by the carriers 35, 36. The drive transmission gear 31 is rotatably supported at the rotation shaft 35b provided at the carrier 35, and meshes with the input gear 30 and the reduction gear 32. The reduction gear 32 has a stepped gear structure provided with large teeth 32a and small teeth 32b that have mutually different pitch circle diameters. The output gear 33 has outer teeth 33a outputting the rotational driving force to the discharging roller drive gear train 7, and inner teeth 33b meshing with the small teeth 32b of the reduction gear 32, and is rotatably supported by the carriers 36, 37. The drive transmission gear 31 meshes with the inner teeth 30b of the input gear 30, the large teeth 32a of the reduction gear 32 mesh with the drive transmission gear 31, and the small teeth 32b of the reduction gear 32 mesh with the inner teeth 33b of the output gear 33, whereby the driving force is successively transmitted from the input gear 30 to the output gear 33.

Figure 11:
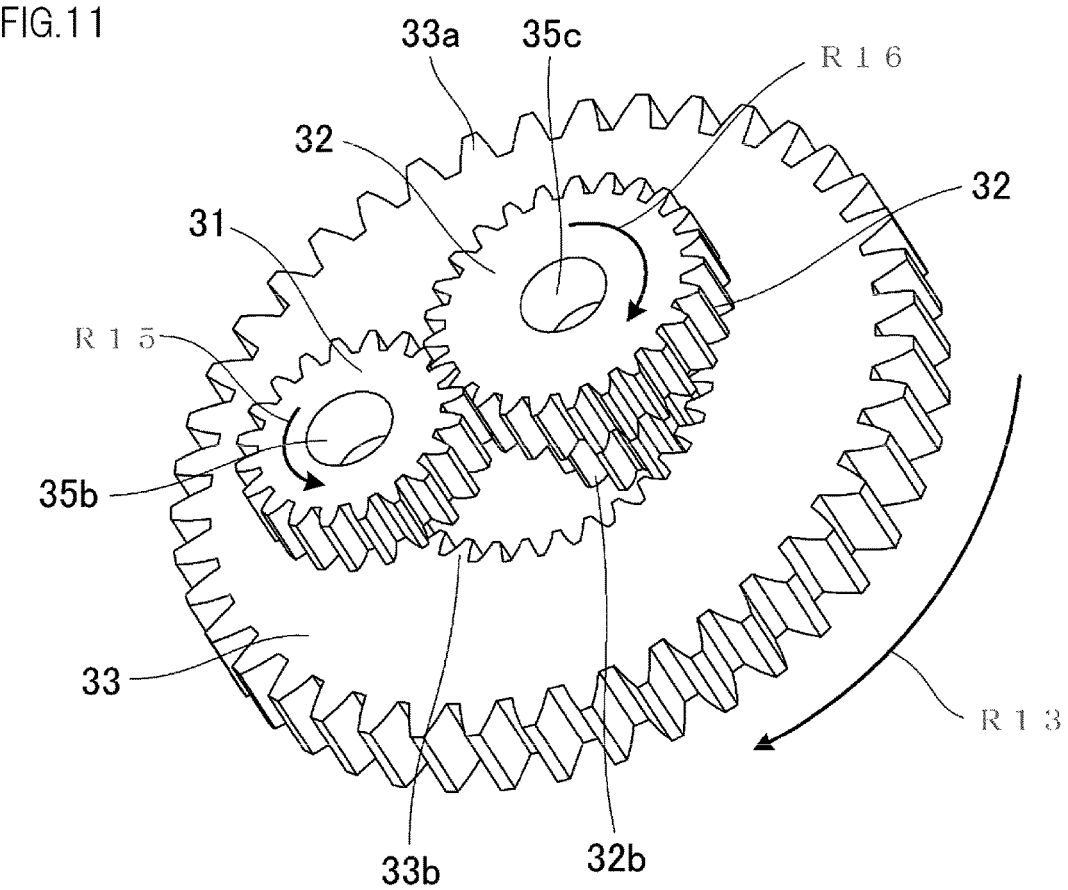
FIG. 11 illustrates the operation of gears at the time of paper discharge in Embodiment 2 of the present invention.

FIG. 11 depicts the operation of the drive transmission gear 31, the reduction gear 32, and the output gear 33 in the driving force transmission device 8 when the paper sheet P is discharged to the paper discharge tray 10.

The reduction gear 32 receives the drive from the input gear 30 and rotates in the direction of an arrow R15 about the rotation shaft 35b of the carrier 35. The reduction gear 32 receives the drive from the drive transmission gear 31 and rotates in the direction of an arrow R16, which is opposite to the rotation direction of the drive transmission gear 31, about the rotation shaft 35c of the carrier 35. The drive is further transmitted from the reduction gear 32 to the output gear 33, the rotation direction of the output gear 33 is reversed with respect to the direction of the arrow R11, which is the rotation direction of the input gear 30, and the drive is outputted in the direction of the arrow R13. In this case, the drive of the output gear 33 is transmitted to the discharging roller gear 5b through the discharging roller drive gear train 7, and the discharging roller 5a rotates in the direction of discharging the paper sheet P into the paper discharge tray 10.

Where the paper sheet P is switched back in order to convey the paper sheet P from the paper discharge unit 5 into the conveying path B, the solenoid 22 is set ON and the locked state of the disk member 21 is released in the same manner as in Embodiment 1. Since the input gear 30 and the carrier unit 34 are restrained and integrated by the locking lever 19, the drive transmission gear 31 and the reduction gear 32 stop with respect to the rotation shafts 35b, 35c and rotate integrally with the carrier unit 34 in the direction of the arrow R14. In this case, all of the constituent elements, with the exception of the solenoid 22, are integrated and rotate in the direction of the arrow R11 (the output gear 33 rotates in the direction of the arrow R12), and the rotation direction of the inputted drive and the outputted drive is the same.

In the driving force transmission device 8 of the present embodiment, the meshing position of the input gear 30 and the drive transmission gear 31 and the meshing position of the drive transmission gear 31 and the reduction gear 32 are on the same plane. Therefore, the entire driving force transmission device 8 can be reduced in the lengthwise dimension in the axial direction and the miniaturization is facilitated as compared with Embodiment 1 in which the three meshing positions are all shifted with respect to each other in the axial direction.

Further, by changing the number of large teeth 32a and small teeth 32b of the reduction gear 32 or the number of inner teeth in the input gear 30 and the output gear 33, it is possible to change the revolution speed of the output gear 33 with respect to the revolution speed of the input gear 30. As a result, any output revolution speed of the drive can be set.

In order to equalize the revolution speed of the input gear 30 and the output gear 33, the number of teeth in each gear should satisfy the following condition. Here, the revolution speed of the input gear 30 is denoted by N, the number of the inner teeth 30b in the input gear 30 is denoted by A, the number of the inner teeth 33b in the output gear 33 is denoted by B, the number of teeth in the drive transmission gear 31 is denoted by X, the number of large teeth 32a in the reduction gear 32 is denoted by Y, and the number of small teeth 32b therein is denoted by Z. The variables A, B, X, Y, and Z are natural numbers satisfying the following equation.

$$N=(A/X)\times(X/Y)\times(Z/B)\times N$$

(Embodiment 3)

Figure 12:
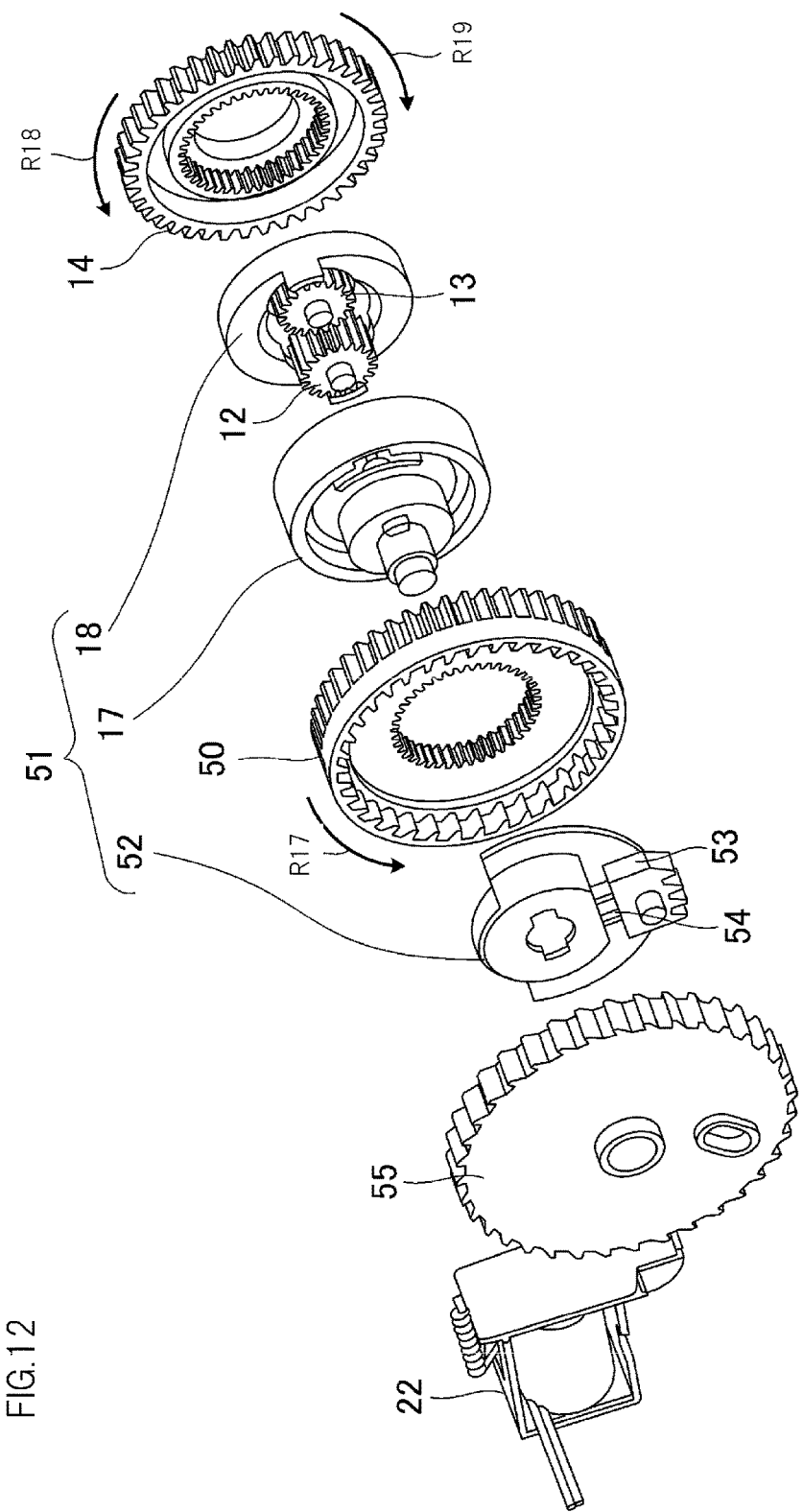
FIG. 12 is a configuration diagram of the driving force transmission device according to Embodiment 3 of the present invention.

The driving force transmission device according to Embodiment 3 of the present invention will be described hereinbelow with reference to FIGS. 12 to 14. The driving force transmission device of the present embodiment is also suitable for the image-forming apparatus 1 explained in Embodiment 1. In the present embodiment, functions and components same as those in Embodiments 1 and 2 are assigned with the same reference numerals and the explanation thereof is omitted. The features that are not explained herein are the same as in Embodiments 1 and 2.

The schematic configuration of the driving force transmission device 8 according to Embodiment 3 will be explained hereinbelow with reference to FIG. 12. FIG. 12 is an exploded perspective view illustrating the configuration of the driving force transmission device 8 according to the present embodiment.

The driving force transmission device 8 according to Embodiment 3 is provided mainly with an input gear 50, the output gear 14, the drive transmission gears 12, 13, and a carrier unit 51. The input gear 50 rotates by receiving driving force from the motor M. The output gear 14 outputs the drive to the discharging roller drive gear train 7. The drive transmission gears 12, 13 transmit the drive from the input gear 50 to the output gear 14. The carrier unit 51 is constituted by three carriers 52, 17, and 18. The carrier 52 holds a locking part 53 and a pushing spring 54. The carrier 17 holds the input gear 50 and has an axis of rotation of a disk member 55. The carrier 18 holds the output gear 14 and the drive transmission gears 12, 13. The three carriers 52, 17, and 18 are integrated by fitting. The locking part 53 is held at the carrier 52 so that the locking part can move linearly. The locking part 53 restrains and integrates the input gear 50 and the carrier unit 51 by the biasing force of the pushing spring 54. The disk member 55 controls the operation of the locking part 53 and is configured to so that the rotation thereof is locked by the solenoid 22.

The unidirectional rotation is inputted to the input gear 50 in the direction of an arrow R17. The number of teeth in the input gear 50, the drive transmission gears 12, 13, and the output gear 14 and the meshing thereof are the same as in Embodiment 1.

<<Switching from Forward Rotation to Reverse Rotation>>

Figure 13A:
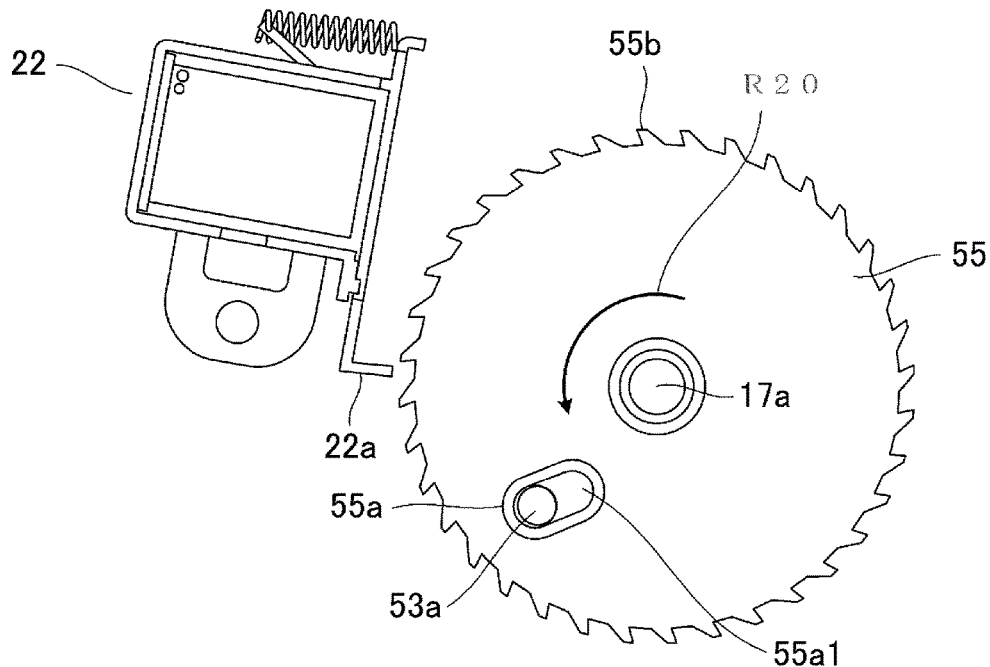
FIGS. 13A and 13B illustrate the operation of the driving force transmission device at the time of switchback in Embodiment 3 of the present invention.
Figure 13B:
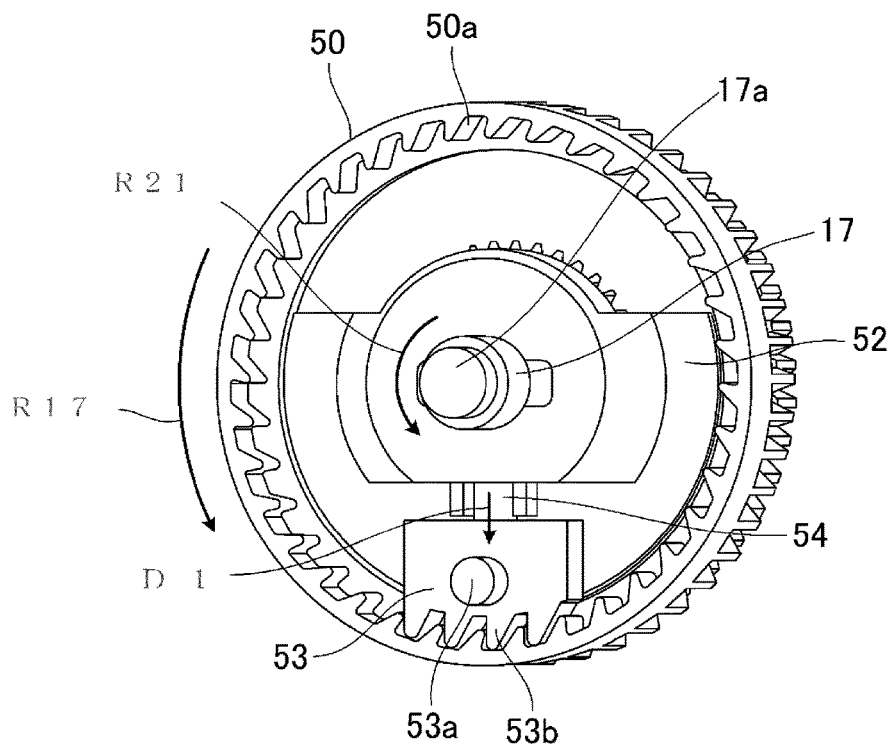

The configuration and operation of the driving force transmission device 8 at the time of switchback of the paper sheet P in the paper discharge unit 5 will be explained hereinbelow with reference to FIG. 13. FIG. 13 is a schematic diagram illustrating the operation of each component of the driving force transmission device 8 in switching from the forward rotation to the reverse rotation. FIG. 13A illustrates the operation of the disk member 55 and the solenoid 22, and FIG. 13B illustrates the operation of the input gear 50 and the carrier 52.

As depicted in FIG. 13A, where the energized solenoid 22 generates an electromagnetic force and attracts the armature 22a, a state in which a portion-to-be-locked 55c of the disk member 55 is locked by the armature 22a is released. At this time, as depicted in FIG. 13B, the locking part 53 of the carrier 52 receives the biasing force of the pushing spring 54 and moves in the direction of an arrow D1, and a locking portion 53b is engaged with a portion-to-be-locked 50a of the input gear 50. Where the input gear 50 and the carrier unit 51 are restrained (integrated) by the locking part 53, the carrier unit 51 also rotates in the direction of an arrow R21 about the rotation shaft 17a by the rotation of the input gear 50 in the direction of the arrow R17. At this time, the locking part 53 is biased by the pushing spring 54 and fixed in a state of locking the disk member 55, and the disk member 55 is integrated with the carrier 52 by a pin 53a of the locking part 53 which is inserted into an elongated round orifice 55a. As a result, the rotational driving force of the carrier 52 acts upon the disk member 55 through the pin 53a of the locking part 53, and the disk member rotates together with the carrier unit 51 in the direction of an arrow R20.

The drive transmission gears 12, 13 are held rotatably on the rotation shafts 18a, 18b, respectively, provided at the carrier 18, but the drive transmission gears are stopped with respect to the rotation shafts 18a, 18b by the integrated rotation of the input gear 11 and the carrier unit 15 in the same manner as in Embodiment 1. Thus, the drive transmission gears 12, 13 are also integrated with the carrier unit 51 and rotate (move circularly) in the direction of the arrow R21. Therefore, in this state, all of the constituent elements of the driving force transmission device 8, with the exception of the solenoid 22, are integrated and rotate in the direction of the arrow R17, and the rotation of the output gear 14 is in the direction of the arrow R18. As a result, the drive of the output gear 14 is transmitted to the discharging roller gear 5b through the discharging roller drive gear train 7, and the discharging roller 5a rotates in the direction of pulling the paper sheet P into the conveying path B.

<<Switching from Reverse Rotation to Forward Rotation>>

Figure 14A:
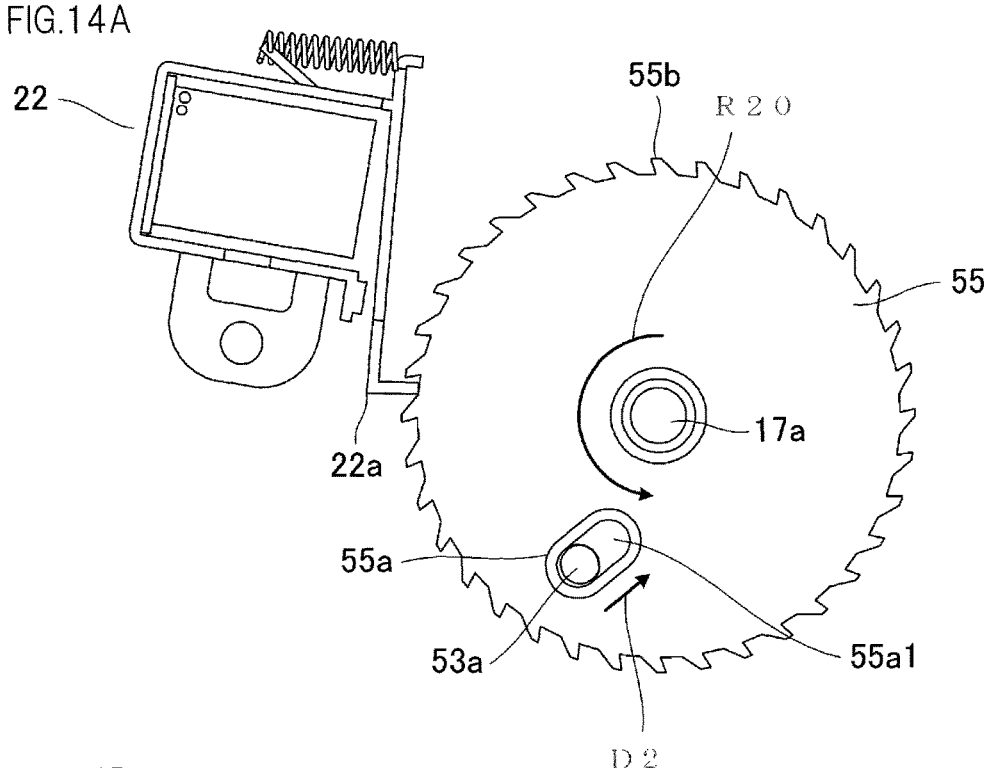
FIGS. 14A and 14B illustrate the operation of the driving force transmission device at the time of paper discharge in Embodiment 3 of the present invention.

The drive switching (switching from the reverse rotation operation to the forward rotation operation) of the discharging roller 5a at the time the paper sheet P is discharged into the paper discharge tray 10 will be explained hereinbelow with reference to FIG. 14. FIG. 14 illustrates the configuration and operation of the driving force transmission device 8 in switching of the discharging roller 5a from the reverse rotation to the forward rotation. FIG. 14A illustrates the operation of the disk member 55 and the solenoid 22, and FIG. 14B illustrates the operation of the input gear 50 and the carrier 52.

As depicted in FIG. 14A, where the energizing of the solenoid 22 is switched from ON to OFF, the tip of the armature 22a engages with a hook-to-be-locked 55b provided at the outer rim of the disk member 55, and the rotation of the disk member 55 rotating in the direction of an arrow R20 is stopped. In this case, as depicted in FIG. 14B, the carrier unit 51 and the locking part 53 held at the carrier 52 continue rotating in the direction of the arrow R21 about the rotation shaft 17a. As a result, the locking part 53 moves on the carrier 52 because the pin 53a is guided in the direction of an arrow D2 depicted in FIG. 14A along an elongated round orifice 55a of the disk member 55. The elongated round orifice 55a guides the pin 53a so that the circular trajectory of the pin 53a deviates from the circular trajectory at the time the disk member 55 rotates together with the carrier unit 51.

Figure 14B:
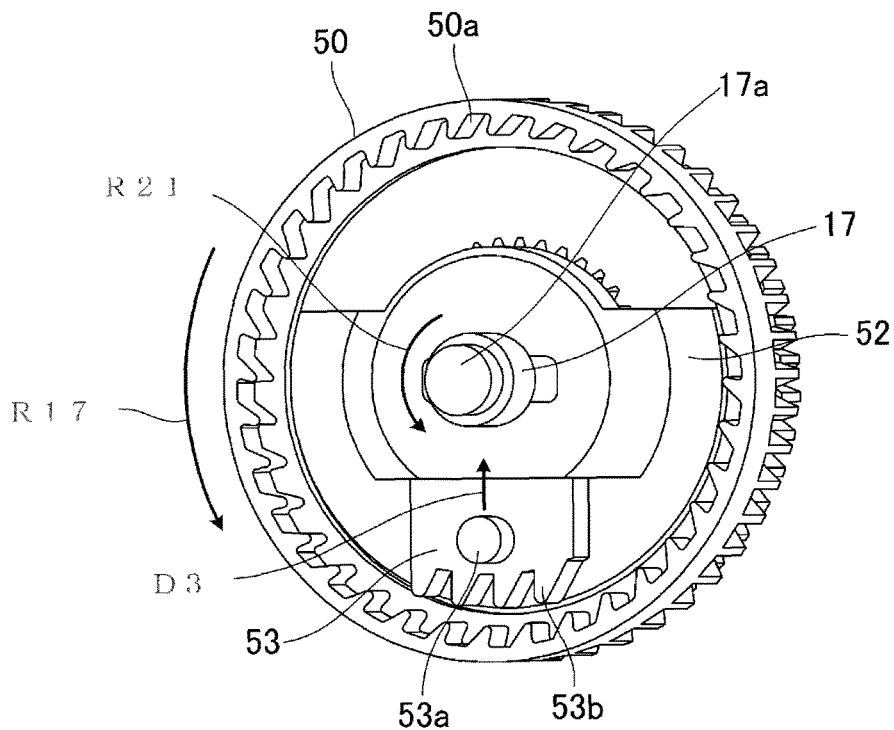

As depicted in FIG. 14B, as a result of the pin 53a being guided by the elongated round orifice 55a, the locking part 53 moves linearly in the direction of an arrow D3 against the biasing force of the pushing spring 54. Due to such movement, the locking portion 53b of the locking part 53 withdraws from a position of engagement with the portion-to-be-locked 50a of the input gear 50 to a position without the engagement, and the restraint of the carrier unit 51 and the input gear 50 is released. Where the withdrawal of the locking part 53 is completed and the pin 53a moves to an end portion 55a1 of the elongated round orifice 55a of the disk member 55, the circular movement of the locking part 53 in the direction of the arrow R21 about the rotation shaft 17a is regulated by the disk member 55. As a result, the rotation of the carrier unit 51 in the direction of the arrow R21 is regulated by the armature 22a.

Where such a state is assumed, the drive transmission gear 12 is rotated in the same direction as the direction of the arrow R17 (same as the direction of the arrow R9 in FIG. 7) about the rotation shaft 18a of the carrier 18 by the rotational driving force transmitted from the input gear 50. The drive transmission gear 13 is rotated in the direction opposite to the direction of the arrow R17 (same as the direction of the arrow R10 in FIG. 7), which is the reverse direction of the drive transmission gear 12, about the rotation shaft 18b of the carrier 18 by the rotational driving force transmitted from the drive transmission gear 12. Furthermore, the rotational driving force is transmitted from the drive transmission gear 13 to the output gear 14, the rotation direction of the output gear 14 is reversed with respect to the direction of the arrow R17, which is the rotation direction of the input gear 50, and the rotational driving force in the direction of the arrow R19 is outputted. In this case, the rotational driving force of the output gear 14 is transmitted to the discharging roller gear 5b through the discharging roller drive gear train 7, and the discharging roller 5a rotates in the direction of discharging the paper sheet P into the paper discharge tray 10.

In the driving force transmission device 8 according to the present embodiment, a predetermined time is required for the drive to be switched after the input of a signal to the solenoid 22, and it is desirable that the response time be constant at all times in order to perform stable paper conveying. An error in the response time during the drive switching depends on the number of the portions-to-be-locked 50a of the input gear 50, and the resolution during the drive switching can be increased and the response error can be reduced by increasing the number of the portions-to-be-locked 50a. However, where the number of the portions-to-be-locked 50a is increased without changing the diameter of the input gear 50, the meshing amount with the locking part 53 per one portion-to-be-locked 50a decreases, and therefore, the meshing amount should be maintained by increasing the number of locking portions 53b of the locking part 53. However, where the locking part 53 having a plurality of locking portions 53b is rotated as described in Embodiment 1, a plurality of locking portions 53b cannot be simultaneously engaged with or disengaged from the portions-to-be-locked 50a of the input gear 50 due to the difference in rotation radius. As a result, the restraint and release of the carrier unit 51 and the input gear 50 can be impeded.

In the present embodiment, by causing the locking part 53 to move linearly, it is possible to engage/disengage the plurality of locking portions 53b to/from the portions-to-be-locked 50a of the input gear 50 at the same time even when a plurality of locking portions 53b are used.

(Embodiment 4)

Figure 15:
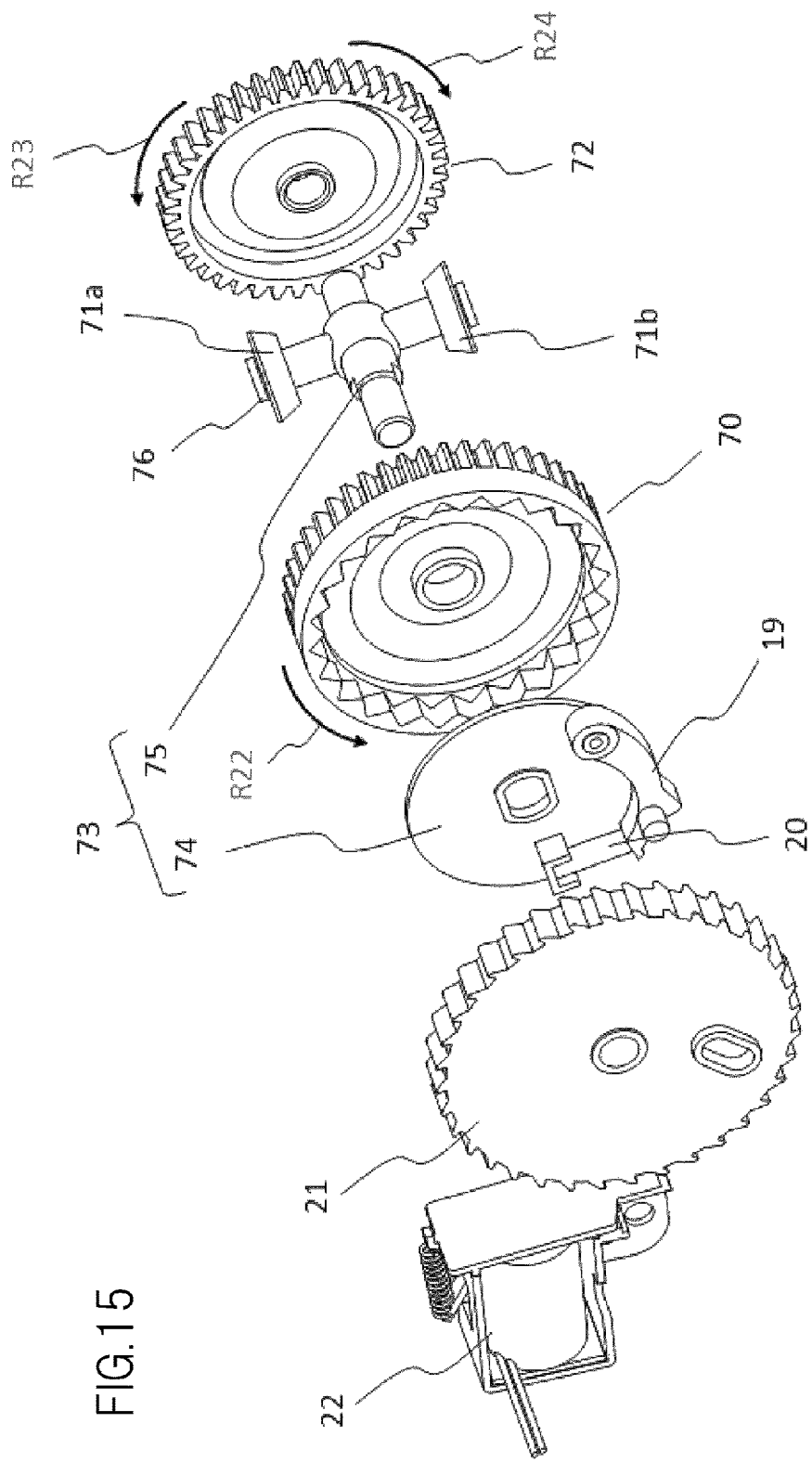
FIG. 15 is a configuration diagram of the driving force transmission device according to Embodiment 4 of the present invention.
Figure 16:
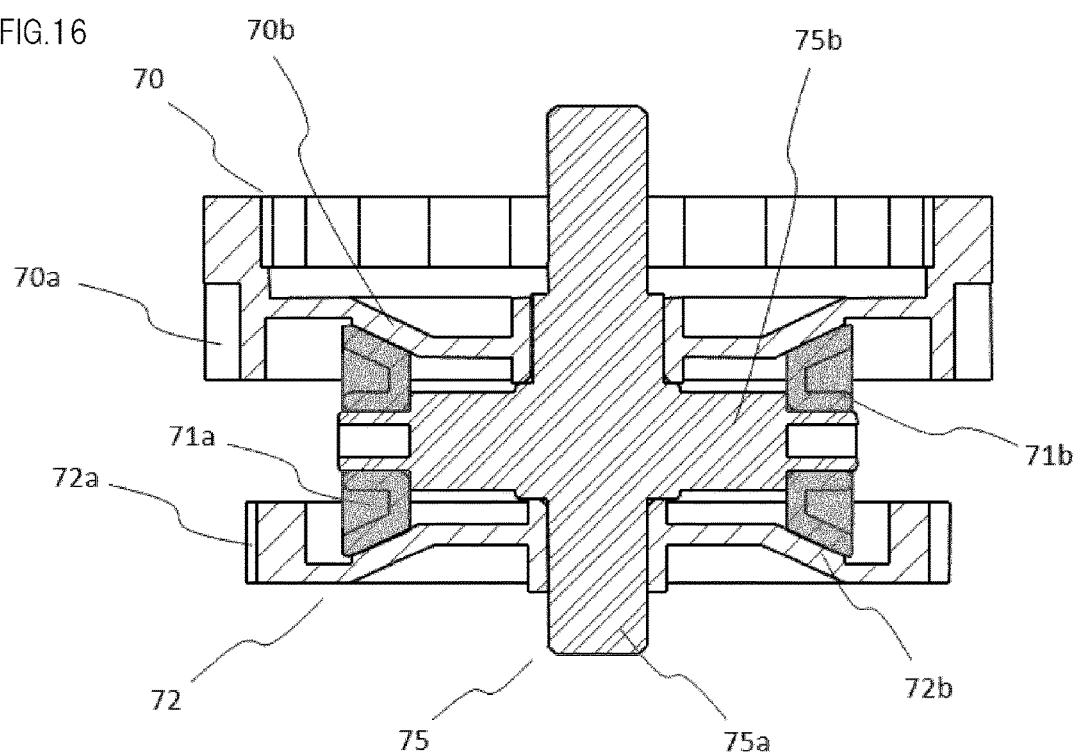
FIG. 16 is a cross-sectional view of the driving force transmission device according to Embodiment 4 of the present invention.

The driving force transmission device according to Embodiment 4 will be described hereinbelow with reference to FIGS. 15 to 17. The driving force transmission device of the present embodiment is also suitable for the image-forming apparatus 1 explained in Embodiment 1. In the present embodiment, functions and components same as those in Embodiment 1 are assigned with the same reference numerals and the explanation thereof is omitted. The features that are not explained herein are the same as in Embodiment 1.

<Driving Force Transmission Device>

The schematic configuration of the driving force transmission device 8 according to Embodiment 4 will be explained hereinbelow with reference to FIGS. 15 and 16. FIG. 15 is an exploded perspective view illustrating the configuration of the driving force transmission device 8 according to the present embodiment. FIG. 16 is a cross-sectional view illustrating the meshing relationship of an input gear 70, a bevel gear 71a, a bevel gear 71b, and an output gear 72. Parts other than those four parts and a carrier 75 having the rotation shafts of the gears are omitted in the figures.

The driving force transmission device 8 according to Embodiment 4 is provided mainly with the input gear 70, the bevel gears 71a and 71b, the output gear 72, and a carrier unit 73. The input gear 70 has outer teeth 70a which mesh with a drive gear train (not depicted in the figure) and input rotational driving force from the motor M, bevel teeth 70b which mesh with the bevel gears 71a and 71b, and a hole for inserting a shaft portion 75a of the carrier 75, and is rotatably supported by the carrier 75. The bevel gears 71a and 71b are rotatably supported on a rotation shaft 75b provided at the carrier 75 and mesh with the bevel teeth of the input gear 70 and the output gear 72, respectively. The output gear 72 has outer teeth 72a outputting the rotational driving force to the discharging roller drive gear train 7, and bevel teeth 72b meshing with the bevel gear 71a and the bevel gear 71b, and is rotatably supported by the carrier 75. The bevel gear 71a and the bevel gear 71b mesh with the bevel teeth 70b of the input gear 70 and the bevel teeth 72b of the output gear 72, whereby the driving force is successively transmitted from the input gear 70 to the output gear 72.

The carrier unit 73 is constituted by three parts, namely, a carrier 74 holding the locking lever 19 and the pushing spring 20, the carrier 75 having the rotation shafts of the input gear 70, the bevel gears 71a and 71b, the output gear 72, and the disk member 21, and a bevel gear bearing 76, and is integrated by fitting. The locking lever 19 rotatably held at the carrier 74 locks the input gear 70 to the carrier 74 by the biasing force of the pushing spring 20, thereby restraining and integrating the input gear 70 and the carrier unit 73. The disk member 21 controls the operation of the locking lever 19 and is configured such that the rotation thereof is locked by the solenoid 22.

Figure 17:
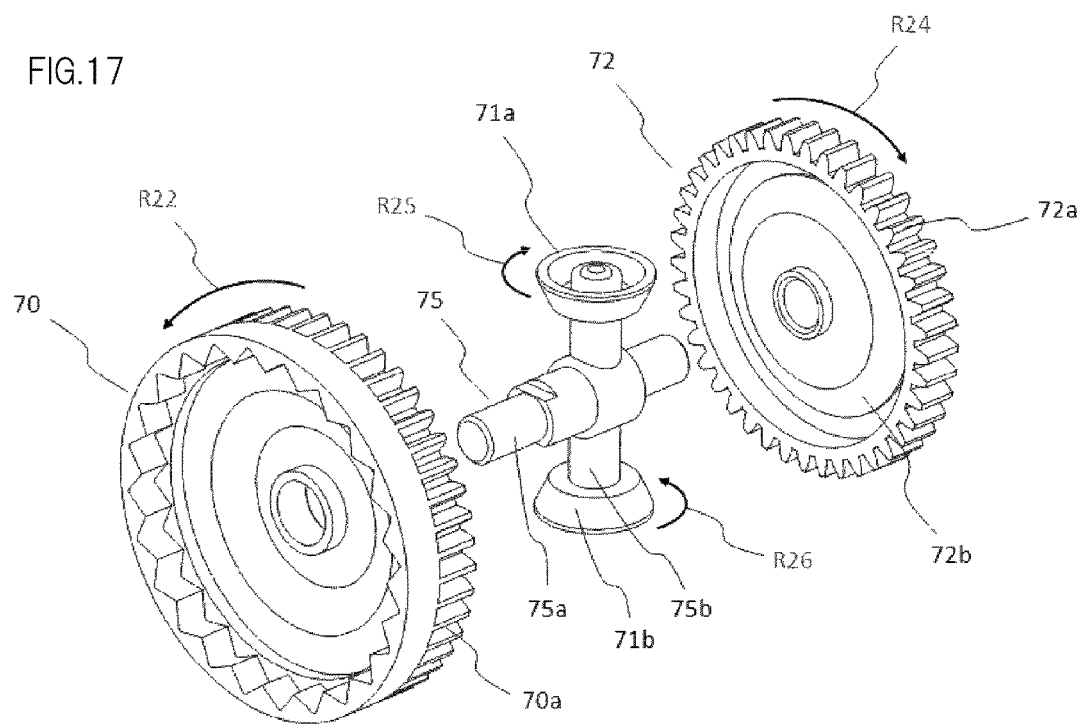
FIG. 17 illustrates the operation of the driving force transmission device according to Embodiment 4 of the present invention.

FIG. 17 illustrates the operation of the input gear 70, the bevel gear 71a, the bevel gear 71b, the output gear 72, and the carrier 75 in the driving force transmission device 8 at the time the paper sheet is discharged into the paper discharge tray 10.

The bevel gear 71a receives the drive from the input gear 70 and rotates in the direction of an arrow R25 about the rotation shaft 75b of the carrier 75. The other bevel gear 71b receives the drive from the input gear 70 and rotates in the direction of an arrow R26 about the rotation shaft 75b of the carrier 75. The output gear 72 meshes with the bevel teeth 72b with the bevel gear 71a and the bevel gear 71b, obtains the driving force from those bevel gears, and rotates in the direction of an arrow R24, and the rotation direction of the output gear 72 is reversed with respect to the direction of an arrow R22, which is the rotation direction of the input gear 70. In this case, the drive of the output gear 72 is transmitted to the discharging roller gear 5b through the discharging roller drive gear train 7, and the discharging roller 5a rotates in the direction of discharging the paper sheet P into the paper discharge tray 10.

When the paper sheet P is switched back in order to convey the paper sheet P from the paper discharge unit 5 into the conveying path B, the solenoid 22 is set ON and the locked state of the disk member 21 is released in the same manner as in Embodiment 1. Since the input gear 70 and the carrier unit 73 are restrained and integrated by the locking lever 19, the bevel gear 71a and the bevel gear 71b are stopped with respect to the rotation shaft 75b, integrated with the carrier unit 73, and rotated in the direction of the arrow R22 about the rotation shaft 75a. In this case, all of the constituent elements, with the exception of the solenoid 22, are integrated and rotate in the direction of the arrow R22 (the output gear 72 rotates in the direction of the arrow R23), and the rotation direction of the inputted drive is the same as the rotation direction of the outputted drive. A configuration in which the rotation of the carrier 75 with respect to the output gear 72 is regulated by the solenoid 22 (the output gear 72 and the carrier 75 are restrained and integrated) may be also used.

In the driving force transmission device 8 of the present embodiment, the input gear 70 and the output gear 72 are coaxially and rotatably held by the carrier 75. Therefore, the degree of coaxiality of the input gear 70 and the output gear 72 can be controlled easier and the structure of the carrier having the rotation shafts of the gears can be simplified by comparison with those of Embodiment 1 and Embodiment 2 in which the input gear 70 and the output gear 72 are held by different carriers.

In the cases explained in the embodiments hereinabove, the solenoid is used as an actuator, but an actuator that can be used in the present invention is not limited to the above-described configuration. Thus, any actuator can be used, as appropriate, provided that it has a simple configuration and can restrain and release the carrier with respect to the input gear.

(Embodiment 5)

In the present embodiment, a driving force transmission device is explained in which the driving force is switched by a simple configuration in which the requirement for accuracy of parts is relaxed.

Initially, the driving force transmission device and image-forming apparatus according to Embodiment 5 of the present invention will be explained with reference to FIGS. 18, 19, and 26. In the present embodiment, a laser beam printer is used as an example of the image-forming device, and the case is explained in which the driving force transmission device is used in a paper reversal unit that is used during the two-sided printing. The driving force transmission device according to the present invention has a structure in which the rotation direction of output is switched with respect to the unidirectionally rotating input by using a planetary gear mechanism, and this device can be applied to reversing the paper conveying direction or for switching the drive direction between the forward rotation and reverse rotation. The application range thereof is not particularly limited.

<Image-Forming Apparatus>

Figure 26:
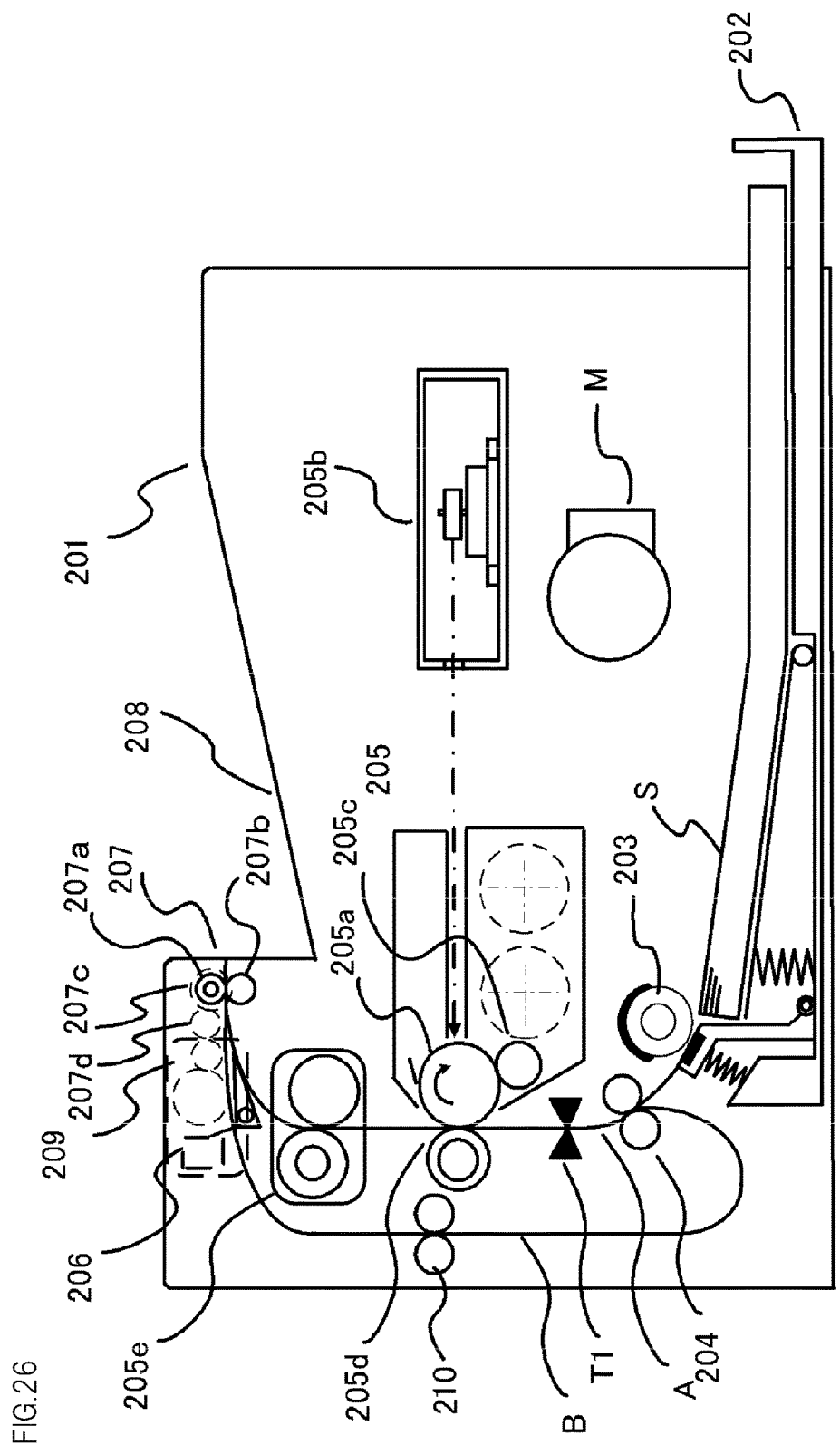
FIG. 26 is a schematic cross-sectional view illustrating the configuration of the image-forming apparatus according to Embodiments 5 to 10 of the present invention.

FIG. 26 is a schematic cross-sectional view illustrating the configuration of the image-forming apparatus according to the present embodiment. In an image-forming apparatus 201, an image is formed on a paper sheet S as a recording material by a developing agent (toner) by using an electrophotographic process.

The image-forming apparatus 201 is provided with a paper sheet cassette 202 in which a predetermined number of paper sheets S are stacked, a paper feed roller 203 that feeds one-by-one the paper sheets located in the paper sheet cassette 202, and a conveying roller pair 204 that conveys the paper sheets S through a conveying path A to an image-forming unit 205. In the image-forming unit 205, a photosensitive drum 205a is irradiated with information light based on image information by an exposure unit 205b, and an electrostatic latent image formed on the photosensitive drum 205a is developed by a developing means 205c. A transfer means 205d then transfers the image developed on the photosensitive drum 205a to the paper sheet S, and a fixing means 205e fixes the transferred image on the paper sheet S. Where the tip of the supplied paper sheet S is detected by a sensor T1, the image-forming unit 205 performs an image forming operation on the paper sheet S synchronously with the detected information. In the case of one-sided printing, the paper sheets S with images fixed by the fixing means 205e are discharged through a paper discharge conveying unit 207 and stacked on a paper discharge tray 208.

In the case of two-sided printing, the discharging roller 207a is rotationally driven in reverse, thereby reversing the conveying direction of the paper sheet S and pulling the paper sheet S into the device before the rear end of the paper sheet S, which has been printed on one side and reached the paper discharge conveying unit 207, gets out between the discharging roller 207a and the paper discharge driven roller 207b. The paper sheet S enters the conveying path B as a result of switching the position of the switching flapper 206 provided between the fixing means 205e and the paper discharge conveying unit 207. The paper sheet is then moved through the two-sided conveying roller 210 to the conveying roller pair 204 located upstream of the image-forming unit 205 in the conveying path A and allowed to pass again through the image-forming unit to form an image on the second side.

In the present embodiment, the drive motor M supplies driving force to a plurality of drive members such as the paper feed roller 203, the conveying roller pair 204, the photosensitive drum 205a, the fixing means 205e, and the two-sided conveying roller 210 through a drive train (not depicted in the figure). Therefore, each drive member is basically configured to be capable of obtaining only the unidirectional constant-rotation drive. Accordingly, the image-forming apparatus of the present embodiment is provided with a driving force transmission device 209 capable of switching, as appropriate, the forward rotation and reverse rotation of the rotational driving force from the drive motor M in order to drive the discharging roller 207a in reverse at the time of two-sided printing. The driving force transmission device 209 is configured such that the rotational driving force from the drive motor M can be transmitted, while switching, as appropriate, the rotation direction thereof, through a paper discharge idler gear 207d to the discharging roller gear 207c for rotationally driving the discharging roller 207a.

<Driving Force Transmission Device>

Figure 18A:
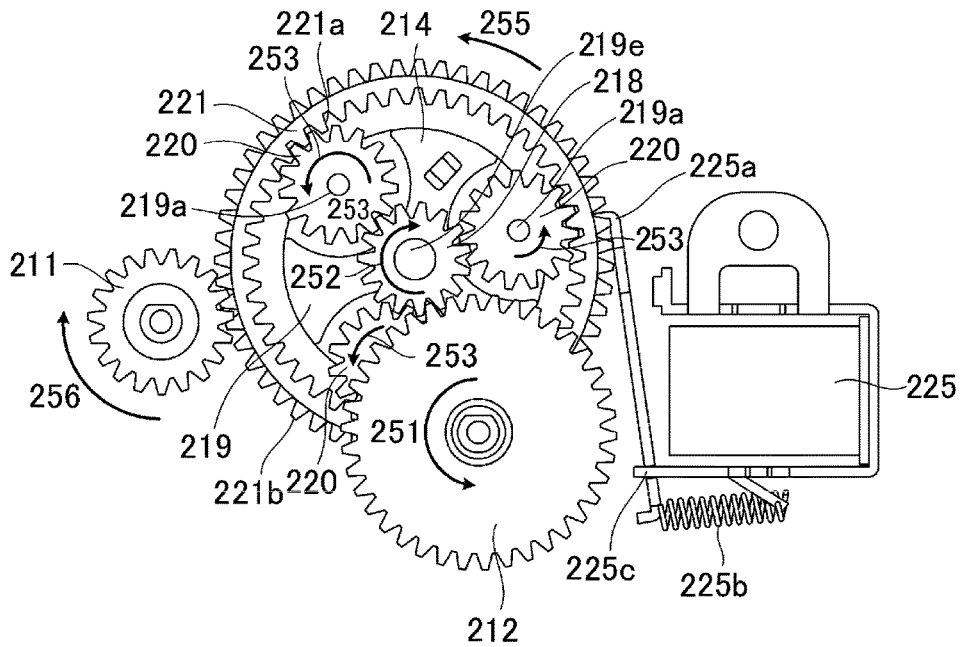
FIGS. 18A and 18B illustrate the configuration and operation of the driving force transmission device according to Embodiment 5 of the present invention.
Figure 18B:
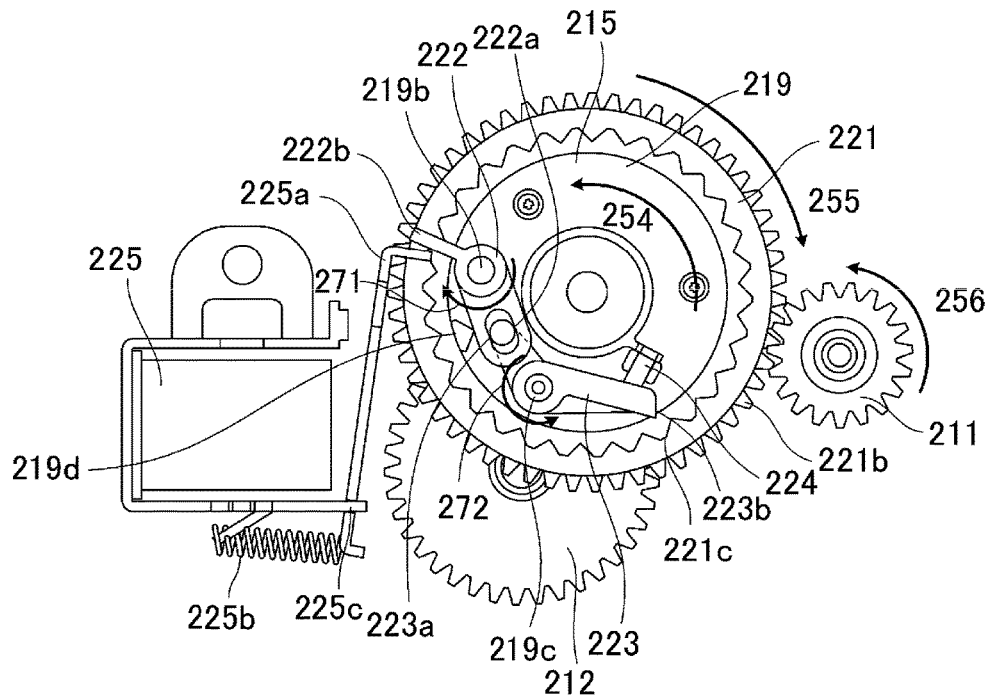
Figure 19A:
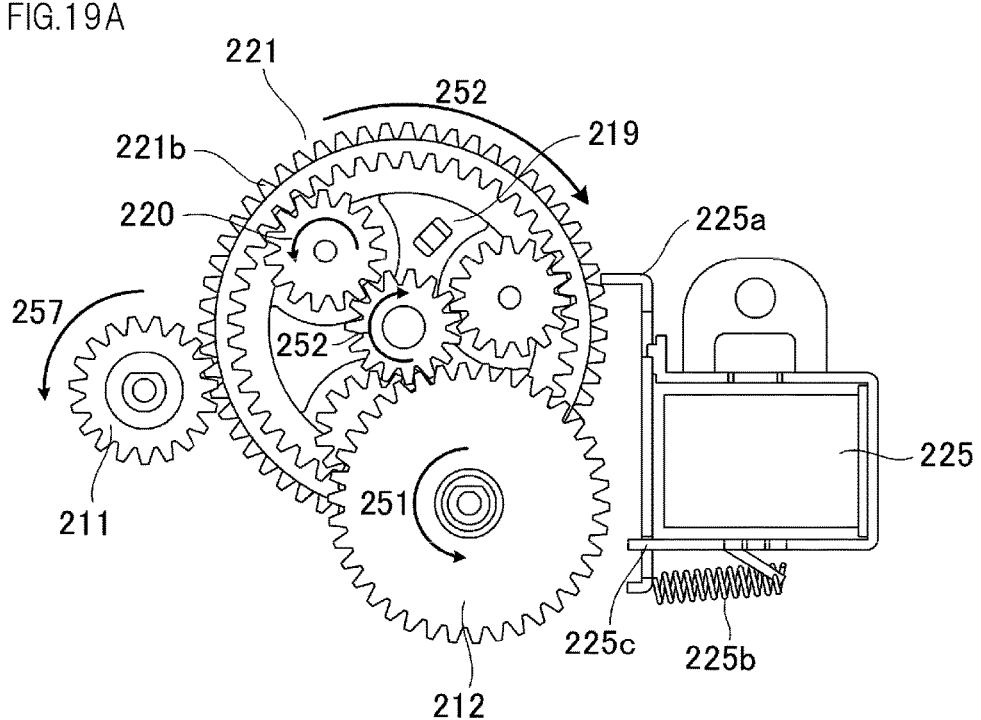
FIGS. 19A and 19B illustrate the configuration and operation of the driving force transmission device according to Embodiment 5 of the present invention.
Figure 19B:
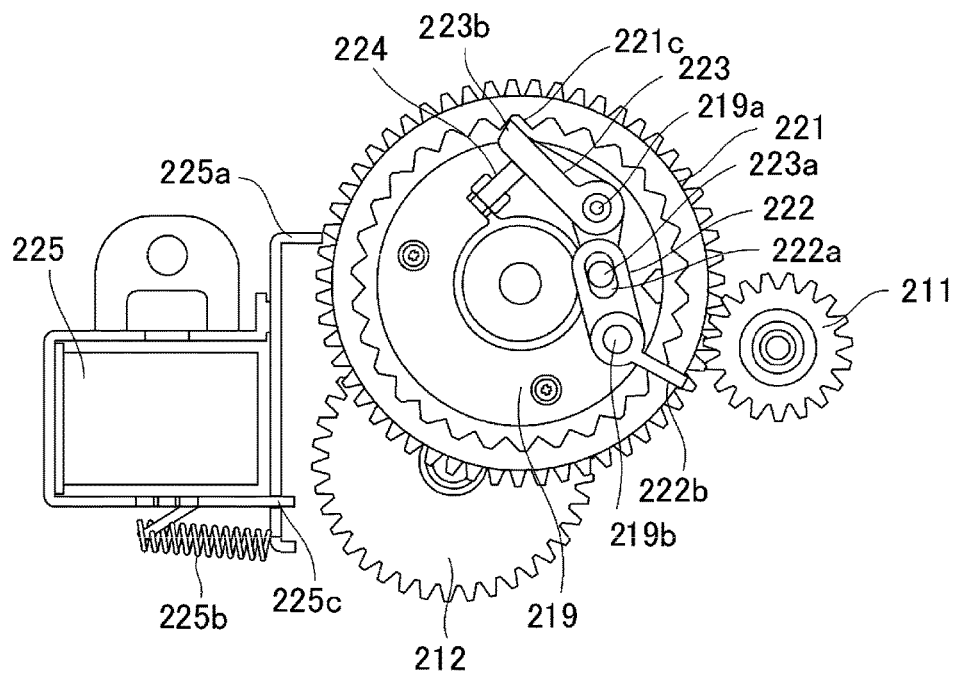

The driving force transmission device 209 according to the present embodiment will be explained below with reference to FIGS. 18 and 19. FIGS. 18 and 19 illustrate the configuration of the driving force transmission device 209 according to the present embodiment. Here, FIGS. 18A and 19A are the views from one side in the direction of the axis of rotation of the gears, and FIGS. 18B and 19B are the views from the other side. FIG. 18 illustrates the configuration and operation of the driving force transmission device 209 at the time of the forward rotation operation in which the discharging roller 207a discharges the paper sheet S into the paper discharge tray 208. Further, FIG. 19 illustrates the configuration and operation of the driving force transmission device 209 at the time of reverse rotation operation in which the rotation direction of the discharging roller 207a is reversed during the two-sided printing and the roller rotates in the direction of pulling the paper sheet S back into the device.

In the present embodiment, an output gear 211 meshes with the paper discharge idler gear 207d and rotates the discharging roller 207a through the discharging roller gear 207c. An input gear 212 is configured to mesh with a sun gear 218. The relationship between the input and output (transmission direction of driving force) may be reversed. The configuration explained in the present embodiment switches the restraint and release of the carrier and inner-tooth gear among the three below-described rotating elements of the planetary gear, but the same effect is obtained by restraining and releasing any two elements among the three rotating elements, inclusive of the sun gear, with the same configuration.

As depicted in FIG. 26, in the driving force transmission device 209, unidirectional rotational driving force indicated by an arrow 251 is inputted to the input gear 212 which is the input member depicted in FIG. 18A from the drive motor M through a gear train (not depicted in the figure). The discharging roller gear 207c for rotationally driving the discharging roller 207a meshes with the output gear 211 of the driving force transmission device 209 through the paper discharge idler gear 207d, and the discharging roller 207a also rotates forward or reverse according to the forward/reverse switching of the output gear 211 which is the output member of the driving force transmission device 209. Those rollers and gears are rotatably supported on the body frame of the image-forming apparatus 201.

<<Forward Rotation Operation>>

The configuration and operation of the driving force transmission device 209 at the time of forward rotation operation in which the discharging roller 207a depicted in FIG. 26 rotates in the direction of discharging the paper sheet S into the paper discharge tray 208 will be described hereinbelow with reference to FIG. 18. The driving force transmission device 209 is provided with the output gear 211, the input gear 212, a planetary gear structural unit 214, a restraining structural unit 215, and a solenoid 225. The output gear 211, the input gear 212, and a carrier 219 of the planetary gear structural unit 214 are rotationally supported on the body frame of the image-forming apparatus 201. The solenoid 225 is fixed to the same frame.

As depicted in FIG. 18A, the rotational driving force is transmitted at all times in the direction of the arrow 251 from the drive motor M to the input gear 212. The input gear 212 meshes with the sun gear 218 which is held rotatably on a rotation spindle 219e provided at the carrier 219 (rotational member), and the sun gear 218 rotates in the direction of an arrow 252. The sun gear 218 meshes with a planetary gear 220 which is held rotatably at a shaft 219a provided at the carrier 219, and the planetary gear 220 rotates in the direction of an arrow 253.

At this time, as depicted in FIG. 18B, a locking lever 222 and a locking member 223 are held rotatably by shafts 219b and 219c, respectively, at the rear surface of the carrier 219. The locking lever 222 and the locking member 223 are swingably linked to each other and form a link mechanism because a boss 223a provided at the locking member 223 is fitted into the elongated hole 222a provided at the locking lever 222 and the boss 223a moves inside the elongated hole 222a.

A flapper-type solenoid 225 is provided outside of the planetary gear structural unit 214. In the solenoid 225, a flapper 225a, which is a movable piece, is supported at a frame so that the flapper 225a can swing about a fulcrum 225c, and one end of the flapper 225a is connected by a spring 225b to the frame. As depicted in FIG. 18B, when an electromagnet is not energized, one end of the flapper 225a is pulled to a spring 225b serving as a biasing member, thereby positioning the tip portion on the other end at a circular trajectory (operation position) of a tip 222b of the locking lever 222. In other words, the tip portion (contact region) of the flapper 225a is at a constant position in which it can be in contact with the tip 222b (region to be contacted) of the locking lever 222. The locking lever 222 held at the carrier 219 is moved circularly with respect to the rotation shaft of the carrier 219 by the rotation of the carrier 219 in the direction of an arrow 254.

As a result of the tip 222b of the locking lever 222 abutting against (coming into contact with) the tip of the flapper 225a, the locking lever, as a portion to be acted upon, continues the circular movement caused by the rotation of the carrier 219, while rotating in the direction of an arrow 271 around a shaft 219b of the carrier 219. In conjunction with this rotation of the locking lever 222, the locking member 223 linked to the locking lever 222 rotates in the direction of an arrow 272 about a shaft 219c of the carrier 219 (moves in the direction parallel to the direction orthogonal to the rotation shaft of the carrier 219), while a boss 223a moves inside an elongated hole 222a, against the biasing force of a spring 224. Because of such rotation, a hook portion 223b at the tip of the locking member 223 withdraws to a withdrawal position (disengaging position) from the position of engagement with a groove portion 221c provided in the rear surface (surface seen in FIG. 18B) of an inner-tooth gear 221. The locking lever 222 is configured such that once the hook portion 223b moves to the withdrawal position, the locking lever comes into contact with a stopper portion 219d provided at the carrier 219 and the rotation in the direction of the arrow 271 is regulated. The locking lever 222 is also configured such that the state of engagement with the flapper 225a is maintained even when the rotation with respect to the carrier 219 is stopped. Therefore, the rotation of the carrier 219 in the direction of the arrow 254 is stopped by the flapper 225a engaged with the locking lever 222.

As depicted in FIG. 18A, where the carrier 219 stops rotating, the planetary gear 220 which is rotatably supported by the carrier 219 is rotated in the direction of the arrow 253 (spins with respect to the carrier 219) by the rotation of the sun gear 218 at this position. The planetary gear 220 meshes with the inner gear 221a of the inner-tooth gear 221 and rotates the inner-tooth gear 221 in the direction of an arrow 255. The output gear 211, which meshes with the annular gear 221b of the inner-tooth gear 221, rotates in the direction of an arrow 256 and performs the forward rotation operation that causes the discharging roller 207a and also the discharging roller gear 207c, which meshes through the paper discharge idler gear 207d, to rotate in the discharge rotation of the paper sheet S.

<<Reverse Rotation Operation>>

The configuration and operation of the driving force transmission device 209 at the time of reverse rotation operation in which the rotation direction of the discharging roller 207a depicted in FIG. 26 is switched to the direction of pulling the paper sheet S back into the device during the two-sided printing will be described hereinbelow with reference to FIG. 19. The switching may be performed at a timing after a predetermined period of time elapses since the detection by the sensor T1, or a sensor that detects the position of the paper sheet S may be provided between the fixing means 205e and the paper discharge conveying unit 207 and the switching may be performed on the basis of a detection result from the sensor.

As depicted in FIG. 19B, where the electromagnet of the solenoid 225 is energized, the flapper 225a is pulled to the electromagnet and rotated about the fulcrum 225c, and the tip of the flapper moves to a withdrawal position (position to be acted upon) which is outside the circular trajectory of the tip 222b of the locking lever 222. In other words, the tip of the flapper 225a moves to a separated position at a distance from the tip 222b of the locking lever 222. Where the locking of the locking lever 222 with the flapper 225a is released, the locking member 223 is rotated by the biasing force of the pushing spring 224, and the hook portion 223b thereof moves to the position of engagement with the groove portion (portion to be engaged) 221c of the inner-tooth gear 221. As a result locking the hook portion 223b of the locking portion held at the carrier 219 and the groove portion 221c which is the portion to be engaged of the inner-tooth gear 221, the carrier 219 and the inner-tooth gear 221 are mutually restrained and rotate integrally.

As depicted in FIG. 19A, at the time of the reverse rotation operation, the rotational driving force in the direction of the arrow 251 is transmitted at all times from the drive motor M to the input gear 212, in the same manner as at the time of forward rotation. Therefore, the sun gear 218 is rotated in the direction of the arrow 252 by the rotational drive force transmitted from the input gear 212. Since the carrier 219 and the inner-tooth gear 221 are integrated, the planetary gear 220 which is meshed with the sun gear 218 revolves (rotates about the sun gear 218) in the direction of the arrow 252 integrally with the carrier 219 and the inner-tooth gear 221, without spinning (without rotating on the carrier 219). Thus, the rotation direction of the inner-tooth gear 221 is reversed in the direction opposite that at the time of forward rotation. As a result, the output gear 211 rotates in the direction of the arrow 257, and the rotation of the paper discharge idler gear 207d and the discharging roller gear 207c, which are meshed with the output gear, is also reversed, thereby switching the discharging roller 207a to the reverse rotation operation. In this case, since the sun gear 218 and the inner-tooth gear 221 rotate integrally, the output gear 211 rotates with a speed higher than that at the time of forward rotation and the speed at which the paper sheet S is pulled into the conveying path B rises. As a result the treatment time can be shortened.

The timing of the reverse rotation operation of the discharging roller 207a can be determined by detecting the paper position with the sensor T1 or by providing a sensing means for sensing the paper position between the fixing means 205e and the paper discharge conveying unit 207. For example, the solenoid 225 is set ON after a predetermined time according to the sensing signals of those sensing means, and the flapper 225a is withdrawn from the position of engagement with the locking lever 222. Once the paper sheet S thereafter reaches the two-sided conveying roller 210 of the conveying path B, the solenoid 225 is set OFF to switch the discharging roller 207a again to the forward rotation operation. Where the flapper 225a returns to the position depicted in FIG. 18, the hook portion 223b of the locking member 223 withdraws from the groove portion 221c of the inner-tooth gear 221, which is the portion to be engaged, as indicated hereinabove. Where the restraint by the carrier 219 is released, the inner-tooth gear 221 rotates in the direction of the arrow 255, the output gear 211 is rotated in the direction of the arrow 256, and the discharging roller 207a is rotated forward through the paper discharge idler gear 207d and the discharging roller gear 207c.

The driving force transmission device according to the present embodiment uses a planetary gear mechanism. In the planetary gear mechanism, among the three rotating elements (sun gear, inner-tooth gear, and planetary gear) of the planetary gear mechanism, one of the sun gear and the inner-tooth-gear is an input rotating member (sun gear 218) and the other is an output rotating member (inner-tooth gear 221). The input rotating member inputs the rotational power from the drive source (drive motor M). In such planetary gear mechanism, the rotation direction of the output rotating member can be switched by switching between a state in which the inner-tooth gear and the carrier are restrained and integrated and a state in which they are neither restrained nor integrated. The restraint and release of the sun gear linked to the input gear and the carrier of the planetary gear in the planetary gear mechanism have been conventionally performed with a clutch mechanism using a roller clutch, thereby switching the rotation direction of the inner-tooth gear, as described in Japanese Patent Application Publication No. 2008-304050. However, when a roller clutch is used, the roller clutch parts require a high accuracy and the cost of parts rises.

By contrast, in the present embodiment, the carrier (carrier 219) rotatably supporting the planetary gear (planetary gear 220) has the engagement portion (engagement member 223) that can engage the inner-tooth gear and the carrier with each other. The actuator (solenoid 225) configured to be capable of moving the movable portion (flapper 225a) between the operation position in which the engagement portion is acted upon and the non-operation position in which the engagement portion is not acted upon is provided as an operation means for operating the engagement portion.

When the movable portion is in the operation position, the engagement portion moves to the disengaging position in which the inner-tooth gear and the carrier are not engaged with each other, and the rotation of the carrier is regulated. Meanwhile, when the movable portion is in the non-operation position, the engagement portion moves to the engaging position in which the inner-tooth gear and the carrier are engaged with each other, and the carrier rotates integrally with the inner-tooth gear. With such a configuration, the requirement for accuracy of parts is relaxed and the forward-reverse rotation of the drive output can be switched with a simplified mechanism.

Further, when one of the sun gear, inner-tooth gear, and carrier is taken as an input member, another one is taken as an output member, and the remaining one is taken as a rotational member, in the configuration of the present embodiment, for example, the engagement/disengagement of the inner-tooth gear 221, which is the output member, and the carrier 219, which is the rotational member, is switched. However, when one of the sun gear 218, the inner-tooth gear 221, and the carrier 219 is taken as an input member, another one is taken as an output member, and the remaining one is taken as a rotational member, the configuration of the present embodiment can be used, provided that the engagement/disengagement of one of the input member and the output member with the rotational member can be switched.

(Embodiment 6)

The driving force transmission device according to Embodiment 6 of the present invention will be described hereinbelow with reference to FIG. 20. FIG. 20 illustrates the configuration of the planetary gear of the driving force transmission device according to Embodiment 6 of the present invention. In the present embodiment, functions and components same as those in Embodiment 5 are assigned with same reference numerals and the explanation thereof is omitted. The features that are not explained herein are the same as in Embodiment 5.

As indicated in FIG. 20, in the driving force transmission device 209 according to the present embodiment, a planetary gear 226 has a two-stage stepped gear structure in which two gears that differ in a pitch circle size are integrated and used at the input side and output side. At the input side of driving force, the sun gear 218 meshes with a first gear 226a of the planetary gear 226, and at the output side of driving force, the inner gear 221a of the inner-tooth gear 221 meshes with a second gear 226b of the planetary gear 226.

When the planetary gear 220 is not a stepped gear, as in Embodiment 5, where the sun gear 218 is taken as a gear on the input side of unidirectional rotation and the annular gear 221b of the inner-tooth gear 221 is taken as a gear on the output side, the rotation speed at the output side (annular gear 221b) changes between that at the time of forward rotation operation and that at the time of reverse rotation operation. Thus, when the revolution speed of the drive motor M is the same, the rotation speed at the output side is higher at the time of reverse rotation operation in which the carrier 219 and the inner-tooth gear 221 are restrained with respect to each other and rotate integrally and the rotation direction is reversed than at the time of forward rotation operation in which the carrier 219 and the inner-tooth gear 221 are not restrained with respect to each other and the rotation of the carrier 219 is restricted. It goes without saying that where the input side and output side are exchanged, the relationship of the rotation speeds is inverted.

In the present embodiment, the planetary gear 226 has a stepped gear configuration, the sun gear 218 is used at the input side of unidirectional rotation, the sun gear 218 meshes with the first gear 226a of the planetary gear 226, and the second gear 226b meshes with the inner gear 221a of the inner-tooth gear 221. With such a configuration, the pitch circle diameters of the first gear 226a and the second gear 226b of the planetary gear 226 can be set with a certain degree of freedom. Therefore, the rotation speed at the time of forward rotation operation and reverse rotation operation can be set with a higher degree of freedom than in Embodiment 5 in which the pitch circle diameter of the planetary gear 220 is determined according to the pitch circle diameters of the sun gear 218 and the inner-tooth gear 221. In the present embodiment, since the planetary gear 226 has a stepped gear configuration, the gear ratio of the output gear (annular gear 221b) to the input gear (sun gear 218) at the time of forward rotation operation is the same as at the time of reverse rotation operation. Therefore, the rotation speed of the output gear or the discharging roller 207a at the time of forward rotation operation is the same as at the time of reverse rotation operation.

(Embodiment 7)

The driving force transmission device according to Embodiment 7 of the present invention will be described hereinbelow with reference to FIGS. 21 to 25. In the present embodiment, functions and components same as those in Embodiments 5 and 2 are assigned with same reference numerals and the explanation thereof is omitted. The features that are not explained herein are the same as in Embodiments 5 and 2.

As indicated in FIG. 26, in the driving force transmission device 209 according to the present embodiment, the unidirectional rotational driving force indicated by the arrow 251 is also inputted to the input gear 212, which is depicted in FIG. 18A, from the drive motor M through a gear train (not shown in the figure). Further, the paper discharge idler gear 207d and the discharging roller gear 207c for rotationally driving the discharging roller 207a mesh with the output gear 211 of the driving force transmission device 209, and the discharging roller 207a rotates forward or reverse according to the switching of the forward and reverse rotation of the output gear 211 by the driving force transmission device 209.

Figure 21A:
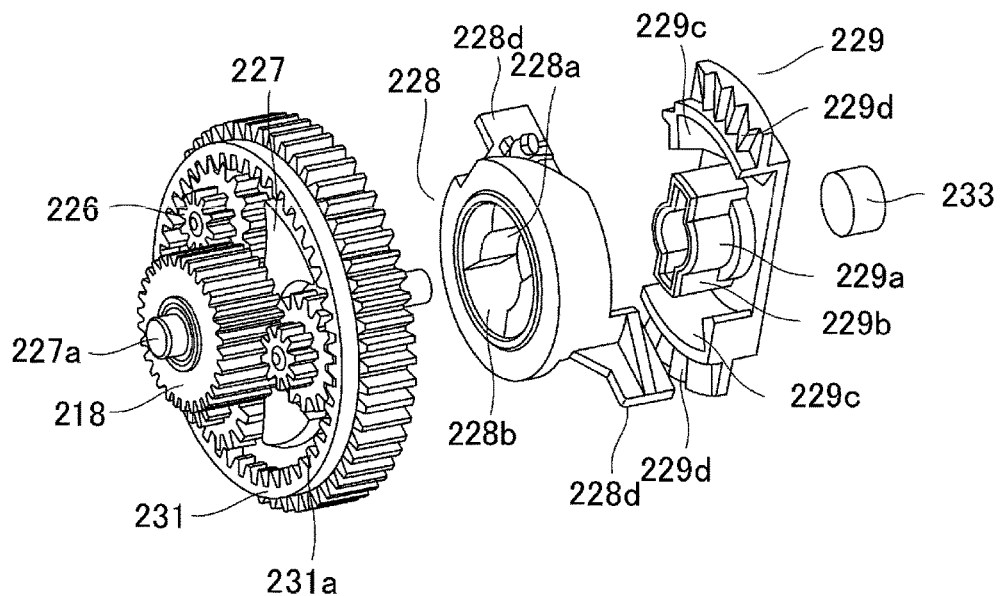
FIGS. 21A and 21B illustrate the configuration and operation of the driving force transmission device according to Embodiment 7 of the present invention.
Figure 21B:
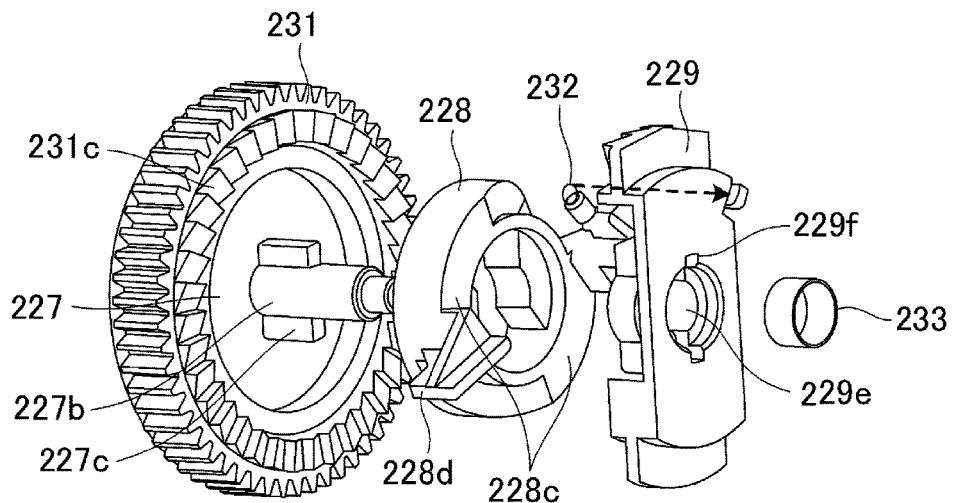
Figure 22A:
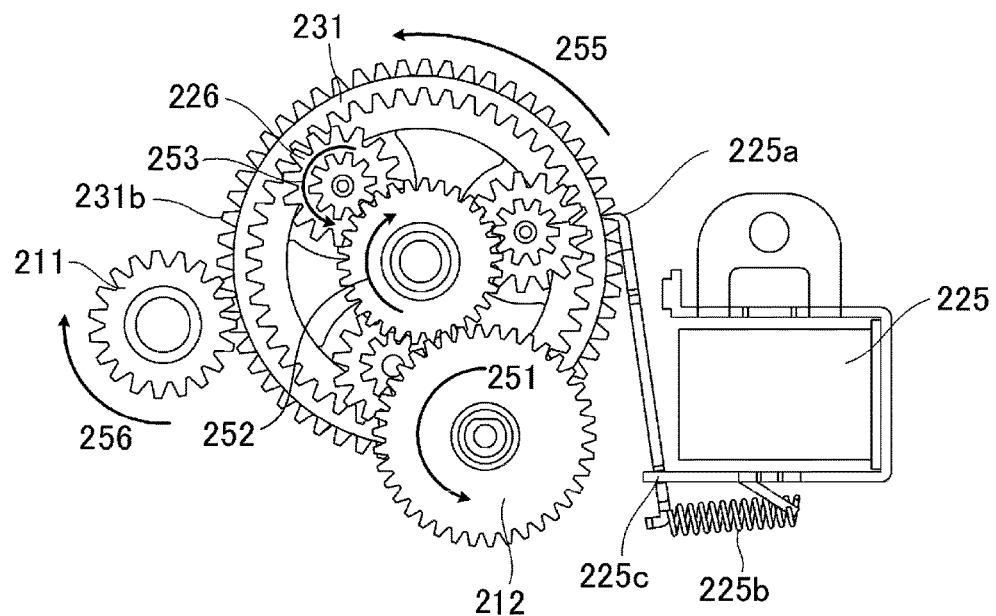
FIGS. 22A and 22B illustrate the configuration and operation of the driving force transmission device according to Embodiment 7 of the present invention.

The configurations of the planetary gear structural unit 214 and the restraining structural unit 215 in the driving force transmission device 209 according to the present embodiment will be explained hereinbelow with reference to FIG. 21. FIG. 21 is an exploded perspective view illustrating the configurations of the planetary gear structural unit 214 (the sun gear 218, the planetary gear 226, an inner-tooth gear 231), a carrier 227, a locking rotating cam 228, and a rotating locking member 229 in the driving force transmission device 209 according to the present embodiment. FIG. 21A is a perspective view from the front side relating to the case in which the side depicted in FIG. 22A is taken as the front side. FIG. 21B is a perspective view taken from the rear side.

As shown in FIG. 21A, the carrier 227 is configured integrally with a shaft portion 227a, and three sets of the planetary gear 226 of a stepped gear configuration are rotatably held on the carrier 227 in the same manner as in Embodiments 5 and 2. The planetary gears 226 mesh with the sun gear 218 and the inner gear 231a of the inner-tooth gear 231.

The locking rotating cam 228 has a hole 228a into which a shaft portion 229a of the rotating locking member 229 is rotatably fitted. A notched portion 228b is provided in the hole 228a, and a rib periphery 229b of the shaft portion 229a is fitted into the notched portion 228b. The rotation of the locking rotating cam 228 with respect to the rotating locking member 229 is regulated within a range in which the rib periphery 229b can move inside the notched portion 228b, and the rotating locking member 229 is unidirectionally biased in the rotation direction with respect to the locking rotating cam 228 by a spring 232 depicted in FIG. 21B. The spring 232 is applied to a portion of the rotating locking member 229 which is shown by a broken arrow in the figure. The spring 232 operates as explained with respect to the operation of restraining and releasing the inner-tooth gear 231 and the carrier 227.

As depicted in FIG. 21B, in the locking rotating cam 228, a cam surface 228c with an axial height changing continuously around the axis of rotation is provided at two radially opposing locations around the axis of rotation. Meanwhile, as depicted in FIG. 21A, in the rotating locking member 229, a cam surface 229c with an axial height also changing continuously around the axis of rotation is provided at two locations facing the cam surfaces 228c of the locking rotating cam 228. The rotating locking member 229 has tooth-shaped hook portions 229d continuous in the circumferential direction on the outside of the cam surfaces 229c. The hook portions 229d are configured to be biased in the contact direction by a spring 233 with respect to tooth-shaped groove portions 231c continuously provided on the side surface of the inner-tooth gear 231 depicted in FIG. 21B, and to be capable of assuming a contact position and a separated position according to the relative positions of the corresponding cam surfaces 228c, 229c in the rotation direction. The locking rotating cam 228 is integrally combined with the rotating locking member 229 to enable a swinging movement therebetween. Further, a shaft 227b and a rib 227c of the carrier 227 are fitted into a hole 229e and a rib inner periphery 229f, and the rotating locking member 229 is rotationally driven integrally with the carrier 227.

In the present embodiment, the feature of switching the forward and reverse directions of the output rotation with respect to the unidirectional input rotation by restraining and releasing, as appropriate, the inner-tooth gear 231 with respect to the carrier 227 is the same as in Embodiments 5 and 2. The configuration and operation of the carrier 227 and the inner-tooth gear 231 in the present embodiment will be explained hereinbelow with reference to FIGS. 22 to 25.

Figure 22B:
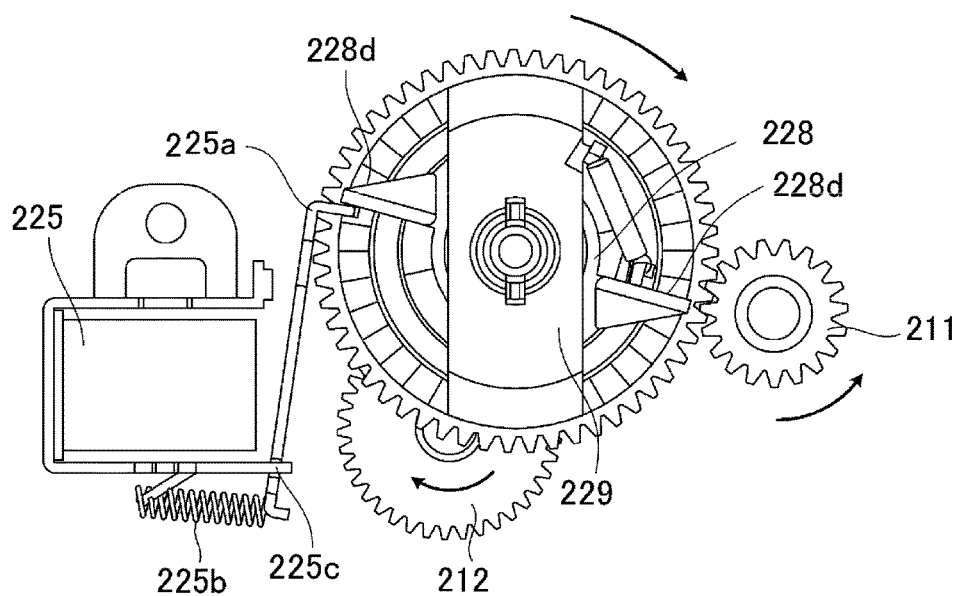

FIG. 22 depicts the configuration of the driving force transmission device 209 according to the present embodiment. FIG. 22A is a view taken from one side in the direction of the axis of rotation of the gears. FIG. 22B is a view taken from the other side. FIG. 22 depicts the configuration and operation of the driving force transmission device 209 at the time of forward rotation operation in which the discharging roller 207a rotates in the direction of discharging the paper sheet S into the paper discharge tray 208.

As depicted in FIG. 22, where the electromagnet of the solenoid 225 provided outside of the planetary gear structural unit 214 is switched off, the tip of the flapper 225a enters the rotation (circular movement) trajectory of the tip of a lever portion 228d of the locking rotating cam 228 rotating integrally with the rotating locking member 229.

Figure 23A:
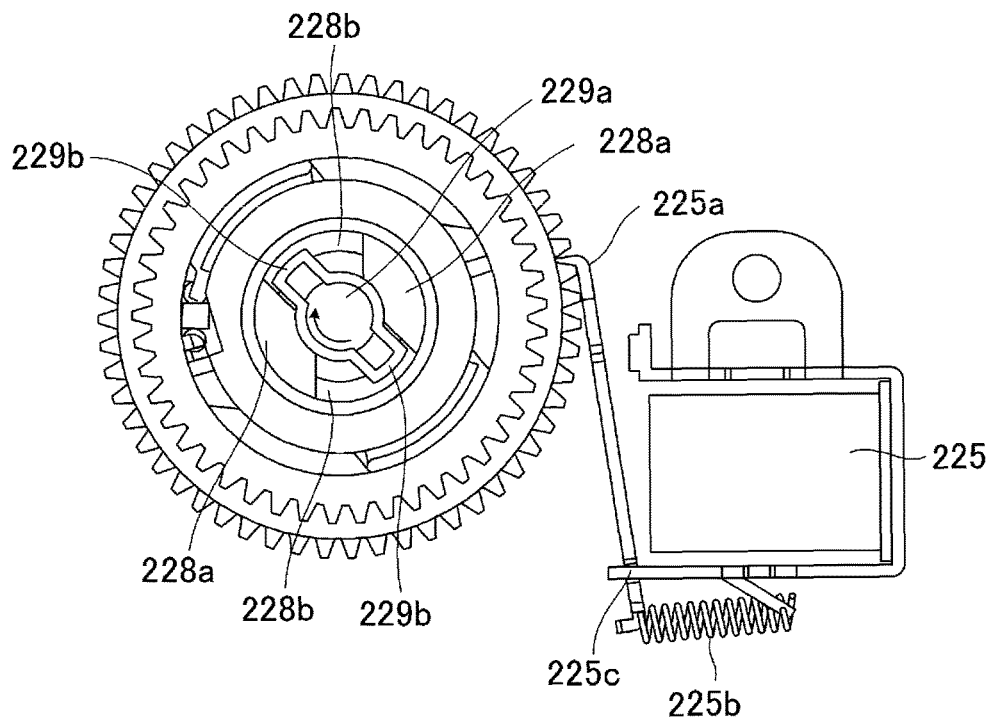
FIGS. 23A and 23B illustrate the configuration and operation of the driving force transmission device according to Embodiment 7 of the present invention.
Figure 23B:
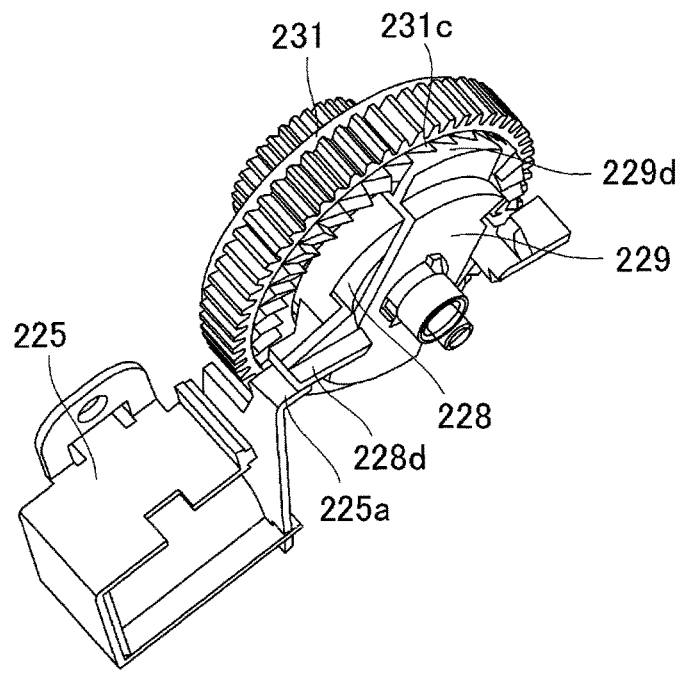
Figure 24A:
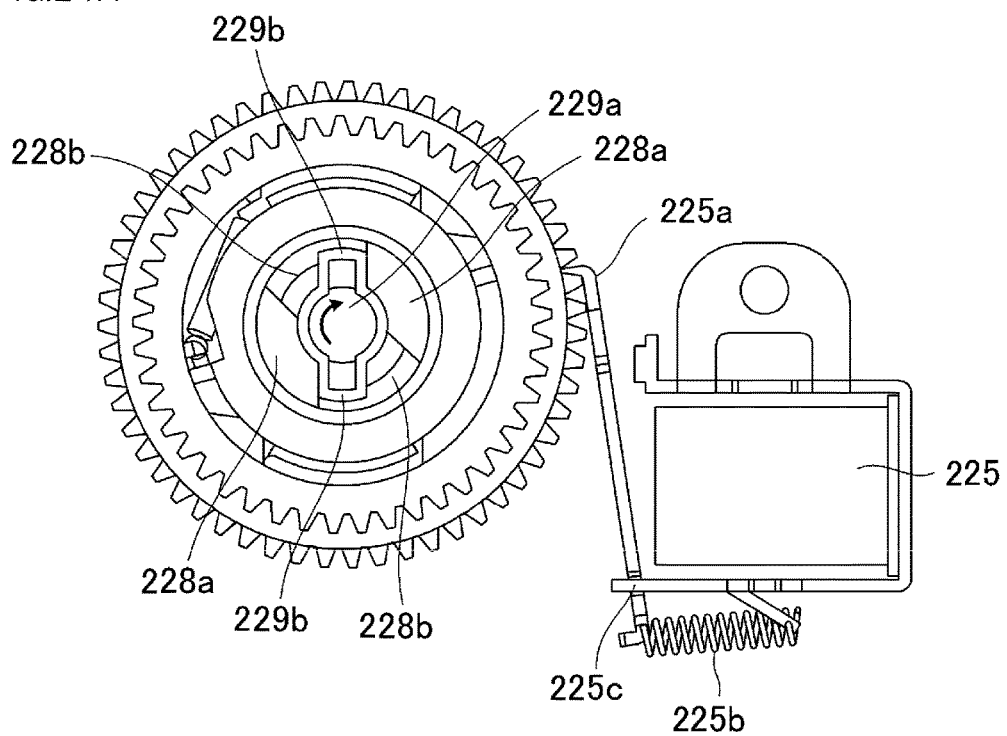
FIGS. 24A and 24B illustrate the configuration and operation of the driving force transmission device according to Embodiment 7 of the present invention.
Figure 24B:
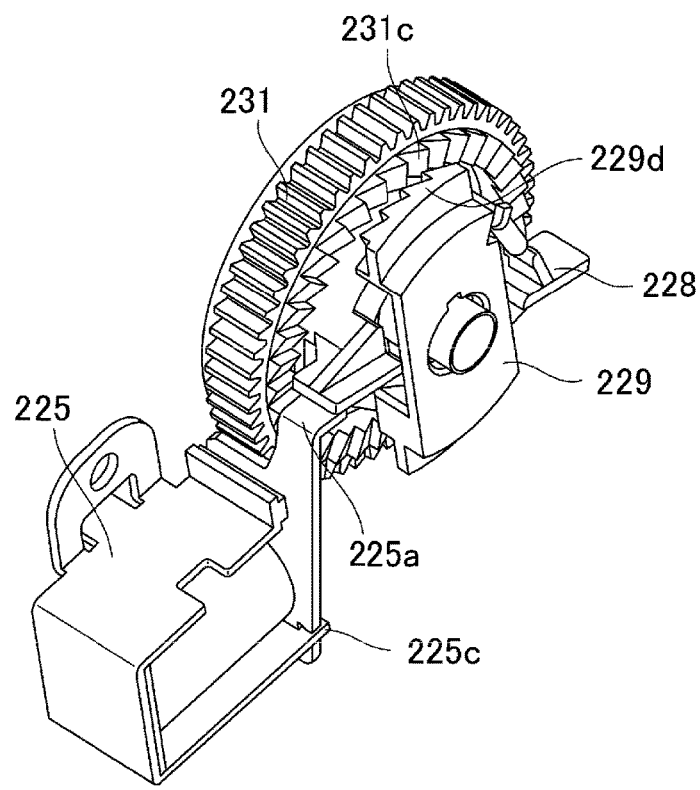

FIGS. 23 and 24 depict how the locking rotating cam 228, the rotating locking member 229, the inner-tooth gear 231, and the solenoid 225 are pushed out from the driving force transmission device 209 and illustrate the operational relationship thereof. FIGS. 23A and 24A are the views taken from the direction of the axis of rotation, and FIGS. 23B and 24B are perspective views. Further, FIG. 23 illustrates a state in which the carrier 227 and the inner-tooth gear 231 are restrained to each other, and FIG. 24 illustrates a state in which the restraint of the carrier 227 and the inner-tooth gear 231 is released.

Initially, as depicted in FIG. 23A, the rib periphery 229b of the rotating locking member 229 is positioned upstream, in the rotation direction, of the notched portion 228b of the locking rotating cam 228. In this case, as shown in FIG. 23B, the hook portion 229d of the rotating locking member 229 is locked to the groove portion 231c of the inner-tooth gear 231, and the carrier 227 restrains the inner-tooth gear 231. Where the carrier 227 further rotates in this state, as depicted in FIG. 24A, the rib periphery 229b of the rotating locking member 229 rotates to the downstream side, in the rotation direction, of the notched portion 228b of the locking rotating cam 228, and the rotation of the rotating locking member 229 and the carrier 227 is stopped by the flapper 225a. At this time, the spring 232 connecting the rotating locking member 229 and the locking rotating cam 228 is extended and stretched by the generated tension. Following the rotation of the rotating locking member 229, the rotating locking member 229 and the locking rotating cam 228 shift relative to each other in the direction of the axis of rotation and separate from each other under the effect of the cam surface 229c of the rotating locking member 229 and the cam surface 228c of the locking rotating cam 228 which slide against each other. As a result, the hook portion 229d of the rotating locking member 229 withdraws from the groove portion 231c of the inner-tooth gear 231, and the carrier 227 releases the restraint of the inner-tooth gear 231, as depicted in FIG. 24B. In this state, the planetary gear 226 spins at this position, as depicted in FIG. 22, and the inner-tooth gear 231 rotates in the direction of the arrow 255. The output gear 211 that meshes with the annular gear 231b of the inner-tooth gear 231 rotates in the direction of the arrow 256 and performs the forward rotation operation of rotating the meshing paper discharge idler gear 207d, discharging roller gear 207c, and the discharging roller 207a in the direction of discharging the paper sheet S into the paper discharge tray 208.

Figure 25A:
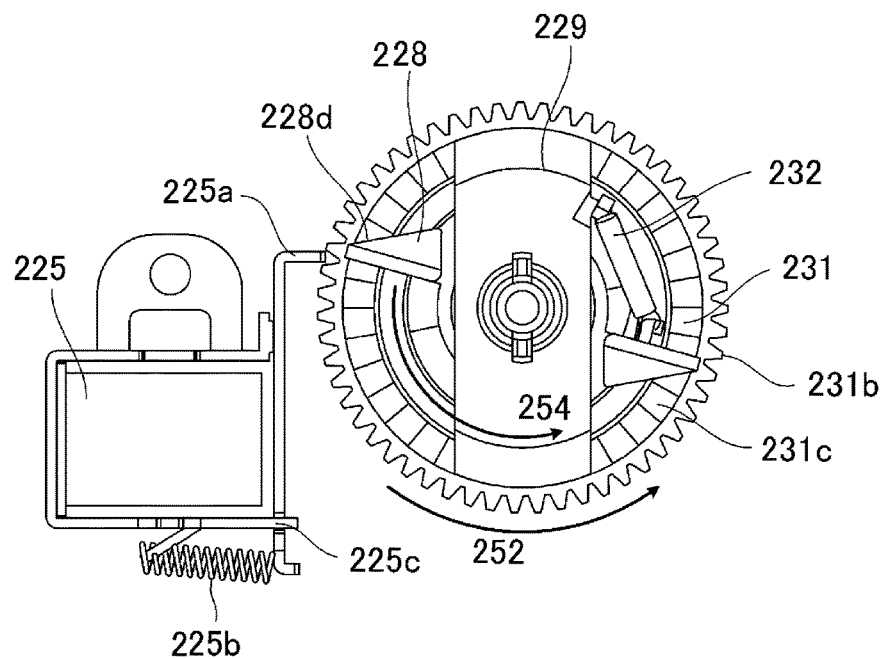
FIGS. 25A and 25B illustrate the configuration and operation of the driving force transmission device according to Embodiment 7 of the present invention.
Figure 25B:
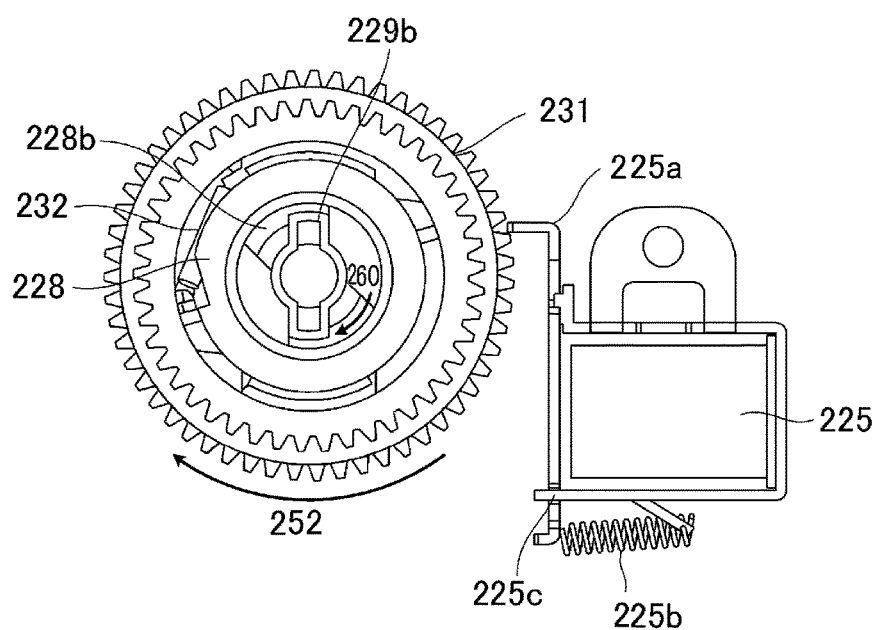

FIG. 25 illustrates, with partial omissions, the configuration of the driving force transmission device 209 according to the present embodiment. FIG. 25A is a view taken from the other side in the direction of the rotation axes of the gears, and FIG. 25B is a view taken from the one side. FIG. 25 also illustrates the configuration and operation of the driving force transmission device 209 at the time of reverse rotation operation in which the rotation direction of the discharging roller 207a is reversed to a direction in which the paper sheet S is pulled back into the device during the two-sided printing.

As depicted in FIG. 25, where the solenoid 225 is set ON and the flapper 225a is attracted to the electromagnet and withdrawn from the rotation trajectory of the tip of the lever portion 228d of the locking rotating cam 228, the rotating locking member 229 and the locking rotating cam 228 start rotating in the direction of the arrow 254. At this time, as shown in FIG. 25B, the locking rotating cam 228 is rotated ahead in the direction of an arrow 260 by the tension of the extended spring 232, and the rib periphery 229b of the rotating locking member 229 moves from one end surface to the other end surface of the notched portion 228b of the locking rotating cam 228. At this time, following the rotation of the locking rotating cam 228, the locking rotating cam 228 and the rotating locking member 229 get close to each other in the axial direction under the effect of the cam surface 228c of the locking rotating cam 228 and the cam surface 229c of the rotating locking member 229 and the pushing force of the spring 233 that pushes the rotating locking member 229 in the direction of the axis of rotation. As a result, as shown in FIG. 23B, the hook portion 229d of the rotating locking member 229 is locked to the groove portion 231c of the inner-tooth gear 231, and the carrier 227 again restrains the inner-tooth gear 231. In this state, since the planetary gear 226, the carrier 227, and the inner-tooth gear 231 rotate integrally following the rotation of the sun gear 218, the annular gear 231b of the inner-tooth gear 231 starts rotating in reverse in the direction of the arrow 252. As a result, the rotation direction of the output gear 211 and the discharging roller gear 207c meshing therewith is also reversed, and the operation of the discharging roller 207a is switched to the reverse rotation operation.

In the case explained in Embodiments 5 to 7, the flapper-type solenoid is used as an actuator, but an actuator that can be used in the present invention is not limited to the above-described configuration. Thus, any actuator can be used, as appropriate, provided that it has a simple configuration and can restrain and release the carrier with respect to the input gear.

The configuration of the planetary gear structural unit 214 is also not limited to that in the abovementioned embodiment, and the number of planetary gears 220 is not limited to three, as in Embodiments 5 to 7.

(Embodiment 8)

The driving force transmission device and image-forming apparatus according to Embodiment 8 of the present invention will be described hereinbelow with reference to FIGS.

27 and 28. The driving force transmission device of the present embodiment is used in the image-forming apparatus explained in Embodiment 5. Thus, as depicted in FIG. 26, the configuration of an image-forming apparatus 301 according to the present embodiment is the same as that of the image-forming apparatus 201, except that a driving force transmission device 309 is used therein.

<Driving Force Transmission Device>

Figure 27A:
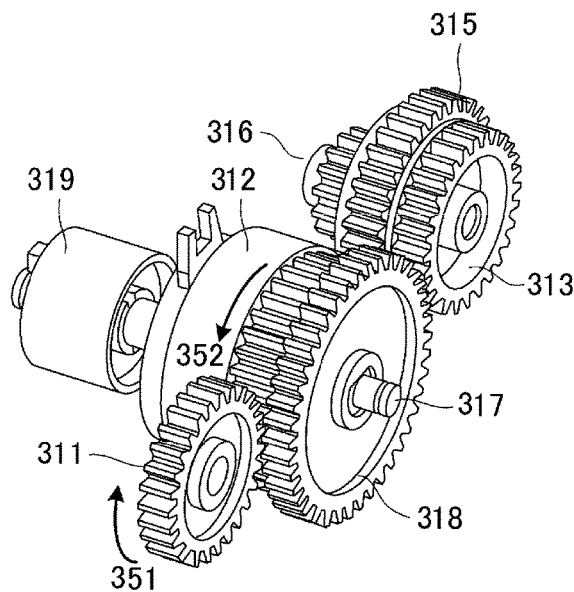
FIGS. 27A and 27B illustrate the configuration and operation of the driving force transmission device according to Embodiment 8 of the present invention.
Figure 27B:
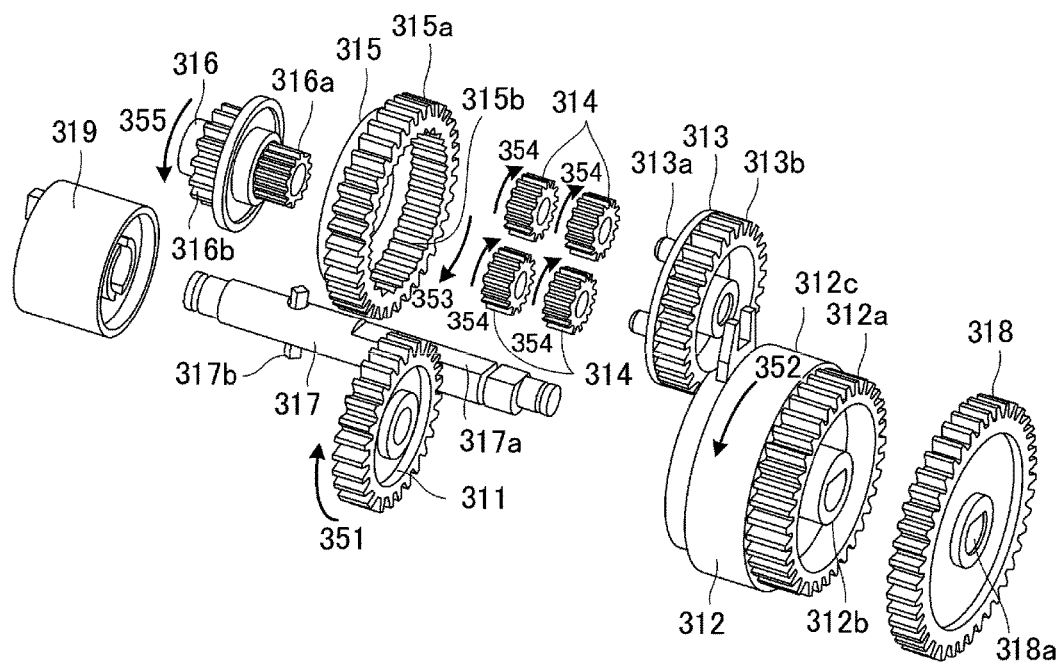
Figure 28A:
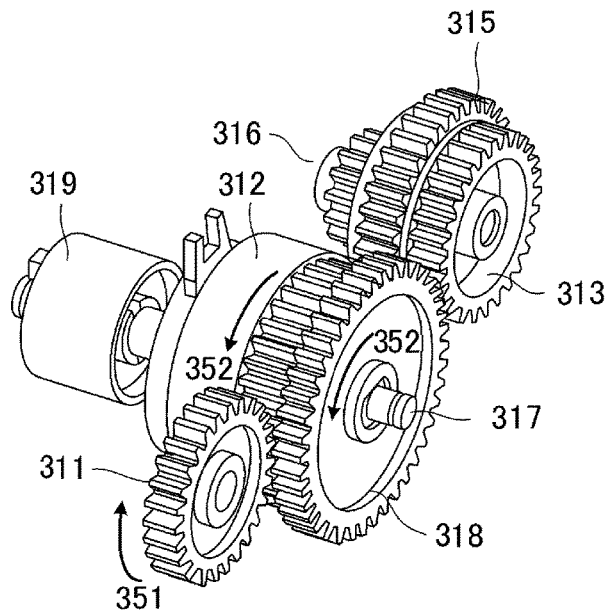
FIGS. 28A and 28B illustrate the configuration and operation of the driving force transmission device according to Embodiment 8 of the present invention.
Figure 28B:
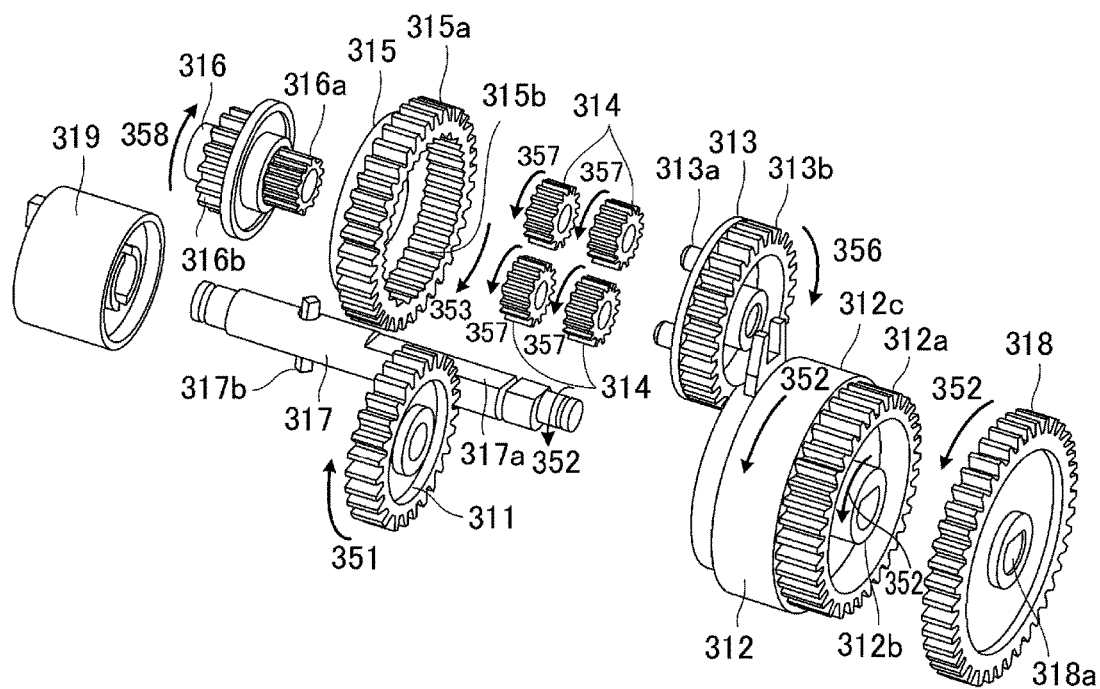

The driving force transmission device 309 according to the present embodiment will be explained hereinbelow with reference to FIGS. 27 and 28. FIGS. 27 and 28 are perspective views illustrating the configuration of the driving force transmission device 309 according to the present embodiment. FIGS. 27A and 28A illustrate the state in which the components are integrated, and FIGS. 27B and 28B illustrate the state in which the components are disassembled. FIG. 27 illustrates the configuration and operation of the driving force transmission device 309 at the time of forward rotation operation in which the discharging roller 207a rotates in the direction of discharging the paper sheet S into the paper discharge tray 208. FIG. 28 illustrates the configuration and operation of the driving force transmission device 309 at the time of reverse rotation operation in which the rotation direction of the discharging roller 207a is reversed to a direction in which the paper sheet S is pulled back into the device during the two-sided printing.

In the present embodiment, an output gear 316b which is integrated with a sun gear 316a of the planetary gear mechanism as a planetary output gear 316 meshes with the paper discharge idler gear 207d and rotates the discharging roller 207a through the discharging roller gear 207c. Further, a drive input gear 311 is configured to mesh with an outer-tooth gear 315a of a planetary input gear 315 through a clutch input gear 312a. The relationship between the input and output (transmission direction of driving force) may be reversed.

In the driving force transmission device 309 depicted in FIG. 26, the unidirectional rotational driving force indicated by an arrow 351 is inputted to the drive input gear 311 as an input member depicted in FIG. 27 from the drive motor M through a gear train (not shown in the figure). Further, in FIG. 26, the discharging roller gear 207c for rotationally driving the discharging roller 207a meshes with the output gear 316b of the driving force transmission device 309 through the paper discharge idler gear 207d. The discharging roller 207a also rotates forward or reverse according to the switching of the forward and reverse rotation of the output gear 316b serving as the output member of the driving force transmission device 309. Those rollers and gears are rotationally supported on the frame of the image-forming apparatus 301.

<<Forward Rotation Operation>>

The configuration and operation of the driving force transmission device 309 at the time of forward rotation operation in which the discharging roller 207a depicted in FIG. 26 rotates in the direction of discharging the paper sheet S to the paper discharge tray 208 will be described hereinbelow with reference to FIG. 27. As depicted in FIG. 27, the driving force transmission device 309 is constituted by the carrier (first rotational member) 313, the planetary gear 314, the planetary input gear 315, the planetary output gear 316, the drive input gear 311, an electromagnetic clutch (clutch) 312, a drive transmission shaft 317, a carrier input gear (second rotational member) 318, and a torque limiter 319.

The drive input gear 311 is rotationally supported about a support shaft (not shown in the figure) as a device main body. The rotational driving force in the direction of the arrow 351 is transmitted at all times from the drive motor M to the drive input gear 311. The drive input gear 311 meshes with a clutch input gear 312a of the electromagnetic clutch 312 disposed at the drive transmission shaft 317. The clutch input gear 312a is configured integrally with the armature of the electromagnetic clutch 312 and held rotatably about the clutch output shaft 312b configured integrally with the rotor of the electromagnetic clutch 312. The armature, rotor, and coil of the electromagnetic clutch 312 constitute the internal structure and are not shown in the figure. The conventional electromagnetic clutch can be used, as appropriate, for the electromagnetic clutch 312.

A locking portion 312c of the electromagnetic clutch 312 is locked to the frame of the image-forming apparatus 301 (not shown in the figure), thereby preventing the entire electromagnetic clutch 312 from rotating. Following the rotation of the drive input gear 311 in the direction of the arrow 351, the clutch input gear 312a rotates in the direction of the arrow 352. The clutch input gear 312a meshes with the outer-tooth gear 315a provided on the outer circumference of the planetary input gear 315, and the planetary input gear 315 rotates in the direction of the arrow 353. An inner-tooth gear 315b is provided at the inner circumference of the planetary input gear 315 and meshes at one side with the planetary gear 314. The planetary gear 314 is rotationally supported about a planetary support shaft 313a provided at the side surface of the carrier 313.

A carrier gear 313b is provided at the outer contour surface of the carrier 313 and meshes with the adjacent carrier input gear 318. The carrier input gear 318 has a D-cut hole 318a on the inner diameter portion and mates with a D-cut surface 317a of the drive transmission shaft 317. The D-cut surface 317a of the drive transmission shaft 317 also simultaneously mates with the clutch output shaft 312b provided integrally with the rotor of the electromagnetic clutch 312. Further, the drive transmission shaft 317 meshes with the torque limiter 319 through a parallel pin 317b and receives a predetermined rotational load from the torque limiter 319.

The drive transmission shaft 317, the clutch output shaft 312b of the electromagnetic clutch 312, the carrier input gear 318, and the carrier 313 are maintained in the stationary state by the rotational load of the torque limiter 319. Since the carrier 313 is maintained in the stationary state, the planetary gear 314 is spun in the direction of the arrow 354 about the planetary support shaft 313a of the stationary carrier 313 by the rotational power received from the inner-tooth gear 315b of the planetary input gear 315. The planetary gear 314 meshes with the sun gear 316a of the planetary output gear 316, and the planetary output gear 316 rotates in the direction of the arrow 355 due to the rotation of the planetary gear 314.

As mentioned hereinabove, the output gear 316b of the planetary output gear 316 meshes with the discharging roller gear 207c through the paper discharge idler gear 207d depicted in FIG. 26. Therefore, the discharging roller gear 207c and the discharging roller 207a perform the forward rotation operation of rotating in the discharge direction of the paper sheet S. The carrier 313, the planetary output gear 316, and the drive transmission shaft 317 are rotatably supported at the frame of the image-forming apparatus 301.

<<Reverse Rotation Operation>>

The configuration and operation of the driving force transmission device 309 at the time of reverse rotation operation in which the rotation direction of the discharging roller 207a depicted in FIG. 26 is switched to the direction of pulling the paper sheet S back into the device during the two-sided printing will be described hereinbelow with reference to FIG. 28. The switching may be performed at a timing after a predetermined period of time elapses since the detection by the sensor T1, or a sensor that detects the position of the paper sheet S may be provided between the fixing means 205e and the paper discharge conveying unit 207 and the switching may be performed on the basis of a detection result from the sensor.

The rotational driving force in the direction of the arrow 351 is transmitted at all times from the drive motor M to the drive input gear 311 in the same manner as at the time of the forward rotation operation.

Where electric power is supplied to the electromagnetic clutch 312, the coil of the electromagnetic clutch 312 is energized and a magnetic force is generated. The armature and rotor of the electromagnetic clutch 312 are attracted to each other and integrated by the magnetic force. The clutch input gear 312a is integrated on the armature side, and the clutch output shaft 312b is integrated at the rotor side. Since the armature and rotor of the electromagnetic clutch 312 are integrated, the rotational power of the clutch input gear 312a is transmitted to the clutch output shaft 312b. As a result of overcoming the rotational load of the torque limiter 319, the clutch output shaft 312b rotates integrally (synchronous rotation) with the clutch input gear 312a in the direction of the arrow 352.

As described hereinabove, the clutch input gear 312a meshes with the outer-tooth gear 315a of the planetary input gear 315 and rotates the planetary input gear 315 in the direction of the arrow 353. At the same time, the clutch output shaft 312b of the electromagnetic clutch 312 rotates the carrier input gear 318 in the direction of the arrow 352 through the drive transmission shaft 317, the rotational power is transmitted to the carrier gear 313b, and the carrier 313 rotates in the direction of the arrow 356. In other words, the carrier 313 rotates in the same direction as the planetary input gear 315.

The ratio of the number of teeth of the outer-tooth gear 315a of the planetary input gear 315 and the number of teeth of the clutch input gear 312a of the electromagnetic clutch 312 is provided with a difference of a ratio of 1:1.5 with respect to the ratio of the number of teeth of the carrier gear 313b and the number of teeth of the carrier input gear 318. As a result, the carrier 313 rotates at a revolution speed which is 1.5 times that of the planetary input gear 315.

At this time, the planetary gear 314 supported by the planetary support shaft 313a of the carrier 313 starts revolving, together with the carrier 313, in the direction of the arrow 356 at a rate which is 1.5 times that of the planetary input gear 315. At the same time, since the planetary input gear 315 also continues rotating at a constant speed in the direction of the arrow 353, the planetary gear 314 assumes a state of revolving such as to overtake the planetary input gear 315. As a result, the gear tooth surface of the planetary gear 314 and the tooth face of the inner-tooth gear 315b of the planetary input gear 315 come into contact with the tooth face on the side opposite to that at the time of forward rotation, and the rotation direction of the planetary gears 314 is reversed in the direction of the arrow 357. Therefore, the rotation direction of the sun gear 316a of the planetary output gear 316, which meshes with the planetary gear 314, is changed to the direction of the arrow 358. As described above, the output gear 316b of the planetary output gear 316 meshes with the discharging roller gear 207a through the paper discharge idler gear 207d depicted in FIG. 26. As a result, the discharging roller gear 207c and the discharging roller 207 perform the reverse rotation operation.

The reverse rotation operation of the discharging roller 207a is realized by detecting the paper position with the sensor T1 or providing a sensing means for sensing the paper position between the fixing means 205e and the paper discharge conveying unit 207, and supplying electric power to the electromagnetic clutch 312 after a predetermined time according to the detection signal. Once the paper sheet S thereafter reaches the two-sided conveying roller 210 of the conveying path B, the supply of electric power to the electromagnetic clutch 312 is cut off in order to switch the discharging roller 207a again to the forward rotation operation. Where the supply of electric power to the electromagnetic clutch 312 is cut off, the magnetic force maintaining the attraction state of the armature and rotor of the electromagnetic clutch 312 disappears, and the attraction state of the armature and rotor is canceled. The clutch output shaft 312b that is integrated with the rotor attempts to continue rotating by inertia together with the drive transmission shaft 317, the carrier input gear 318, and the carrier 313, but is restrained by the rotational load of the torque limiter 319 meshing through the parallel pin 317b of the drive transmission shaft 317. Where the carrier 313 is stationary, the planetary gear 314 supported on the planetary support shaft 313a stops revolving and again assumes a state in which it is spun by the inner-tooth gear 315b of the planetary input gear 315, and the rotation direction returns to the direction of the arrow 354 depicted in FIG. 27B. As a consequence, the planetary output gear 316 meshing with the planetary gear 314 rotates in the direction of the arrow 355 depicted in FIG. 27B and rotates the discharging roller 207a forward through the paper discharge idler gear 207d and the discharging roller gear 207c.

In the present embodiment, the ratio of the number of teeth of the planetary output gear 316 and the planetary gear 314 is 1:1, and the ratio of the number of teeth of the inner-tooth gear 315b of the planetary input gear 315 and the planetary gear 314 is 1:3. Further, the ratio of the number of teeth of the outer-tooth gear 315a of the planetary input gear 315 and the number of teeth of the clutch input gear 312a of the electromagnetic clutch 312 is taken as 1:1.5 with respect to the ratio of the number of teeth of the carrier gear 313b and the number of teeth of the carrier input gear 318. With such a configuration, the rotation speed of the planetary output gear 316 at the time of forward rotation is the same as at the time of reverse rotation.

It is apparent that the rotation speed at the time of forward rotation and at the time of reverse rotation can be set to any relationship. The ratio of the number of teeth of the constituent elements of the planetary gear mechanism, the ratio of the number of teeth of the outer-tooth gear 315a of the planetary input gear 315 and the number of teeth of the clutch input gear 312a of the electromagnetic clutch 312, and the ratio of the number of teeth of the carrier gear 313a and the number of teeth of the carrier input gear 318 may be adjusted.

In particular, by setting the rotation speed at the time of reverse rotation to be higher than that at the time of forward rotation, it is possible to increase the rate at which the paper sheet S is pulled into the conveying path B, thereby shortening the treatment time.

Further, in the configuration in which the rotation speed at the time of forward rotation and at the time of reverse rotation is changed, the planetary input gear 315 and the carrier 313 can be also set to rotate at the same speed at the time of reverse rotation. The ratio of the number of teeth of the outer-tooth gear 315a of the planetary input gear 315 and the number of teeth of the clutch input gear 312a of the electromagnetic clutch 312 may be set to 1:1 to the ratio of the number of teeth of the carrier gear 313b and the number of teeth of the carrier input gear 318. In this case, the planetary gear 314 stops spinning and only revolves, and the planetary input gear 315, the carrier 313, the planetary gear 314, and the planetary output gear 316 rotate integrally. Therefore, the rolling transmission loss of gears generated between the inner-tooth gear 315b of the planetary input gear 315 and the planetary gear 314, and between the planetary gear 314 and the sun gear 316a of the planetary output gear 316 at the time of reverse rotation can be reduced.

The driving force transmission device according to the present embodiment uses a planetary gear mechanism. In the planetary gear mechanism, among the three rotating elements (sun gear, inner-tooth gear, and planetary gear) of the planetary gear mechanism, one of the sun gear and the inner-tooth-gear is an input rotating member (planetary input gear 315) and the other is an output rotating member (planetary output gear 316). The input rotating member inputs the rotational power from the drive source (drive motor M).

In such planetary gear mechanism, the rotation direction of the output rotating member can be switched by switching between a state in which the inner-tooth gear and the carrier are restrained and integrated and a state in which they are neither restrained nor integrated. The restraint and release of the sun gear linked to the input gear and the carrier of the planetary gear in the planetary gear mechanism have been conventionally performed with a clutch mechanism using a roller clutch, thereby switching the rotation direction of the inner-tooth gear, as described in Japanese Patent Application Publication No. 2008-304050. However, when a roller clutch is used, the roller clutch parts require a high accuracy and the cost of parts rises.

By contrast, in the present embodiment, the carrier (carrier 313) rotatably supporting the planetary gear (planetary gear 314) is controlled to two states, namely, a rotation state in which the carrier is rotated in the same direction as the input rotating member by the rotational power from the drive source and a stopped state. The actuator (electromagnetic clutch 312) that switches the transmission of the rotational power of the drive source to the carrier at any timing is provided on the driving force transmission path of the drive source and the carrier. A rotational load application means (torque limiter 319) is linked to the carrier on the side of switching the transmission state and cut-off state of the rotational driving force to the carrier with the actuator. When the rotational driving force is cut off, the stopped state of the carrier is maintained by the rotational load application means linked to the carrier, thereby making it possible to switch, as appropriate, the rotation direction of the output drive. With such a configuration, the requirement for accuracy of parts is relaxed and the forward-reverse rotation of the drive output can be switched with a simplified mechanism.

Further, the configuration of the present embodiment can be used when one of the sun gear, inner-tooth gear, and carrier supporting the planetary gear is taken as an input member, another one is taken as an output member, and the remaining one is taken as a first rotational member. In the above-described configuration, a second rotational member meshing with the first rotational member may be provided, and the rotation direction of the output member may be switched by rotating and stopping the second rotational member.

(Embodiment 9)

The driving force transmission device and image-forming apparatus according to Embodiment 9 of the present invention will be described hereinbelow with reference to FIGS. 29 to 30. In the present embodiment, functions and components same as those in Embodiment 8 are assigned with same reference numerals and the explanation thereof is omitted. The features that are not explained herein are the same as in Embodiment 8.

Figure 29A:
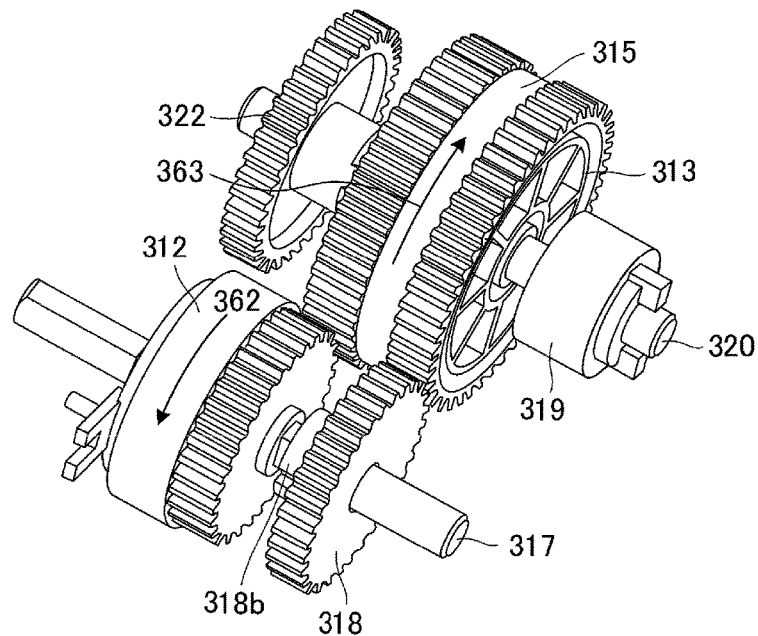
FIGS. 29A and 29B illustrate the configuration and operation of the driving force transmission device according to Embodiment 9 of the present invention.
Figure 29B:
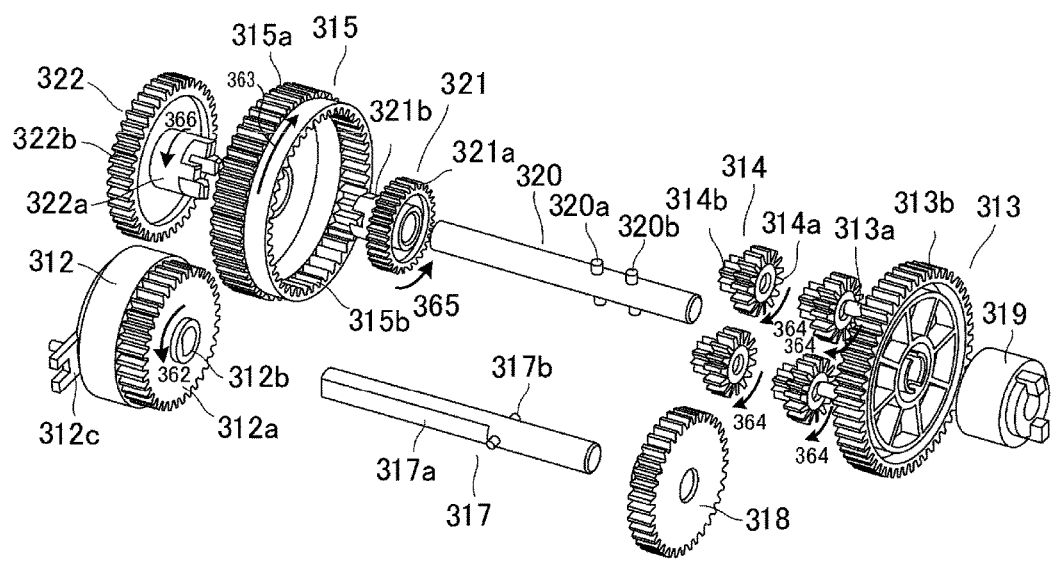
Figure 30A:
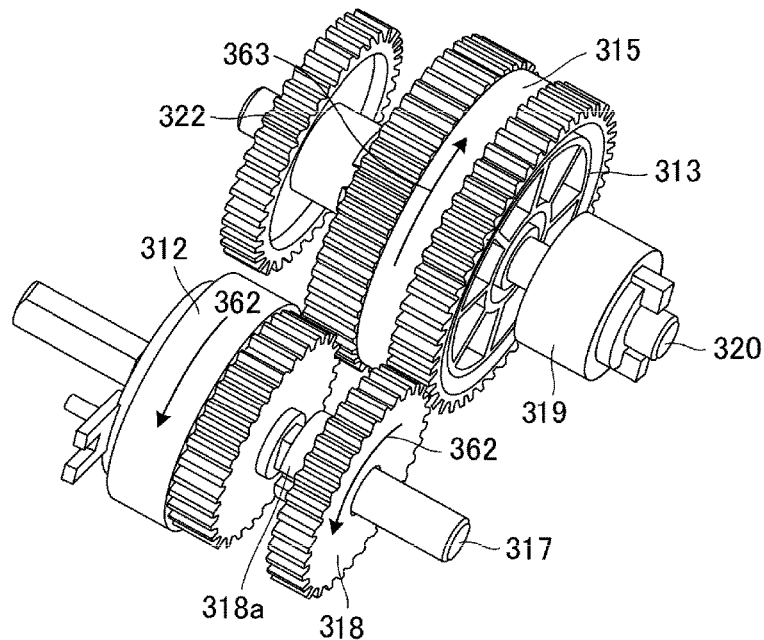
FIGS. 30A and 30B illustrate the configuration and operation of the driving force transmission device according to Embodiment 9 of the present invention.
Figure 30B:
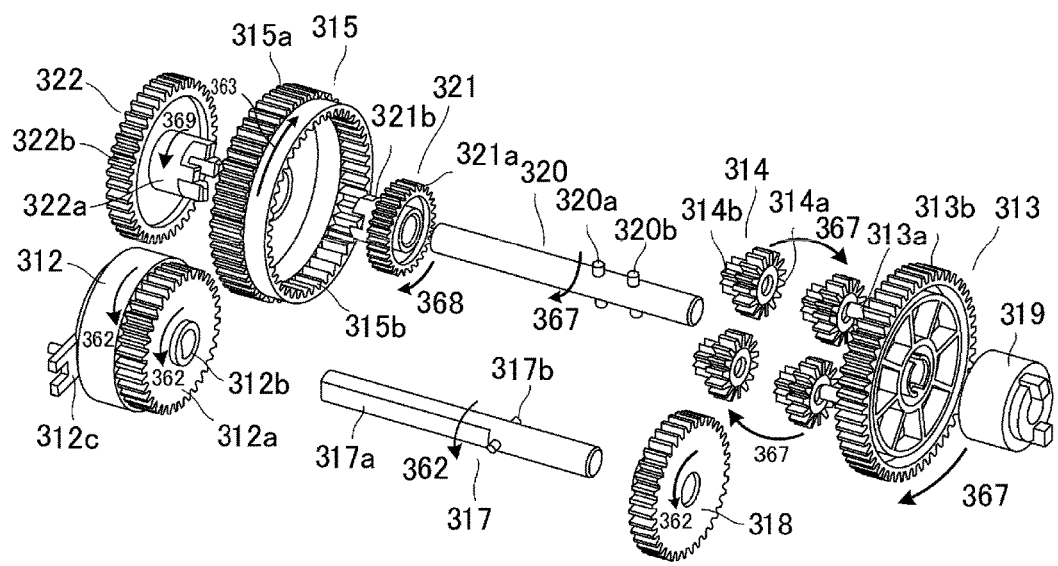

FIGS. 29 and 30 are perspective views illustrating the configuration of the driving force transmission device 309 according to the present embodiment. FIGS. 29A and 30A illustrate the state in which the components are integrated, and FIGS. 29B and 30B illustrate the state in which the components are disassembled. FIG. 29 illustrates the configuration and operation of the driving force transmission device 309 at the time of forward rotation operation in which the discharging roller 207a rotates in the direction of discharging the paper sheet S into the paper discharge tray 208. FIG. 30 illustrates the configuration and operation of the driving force transmission device 309 at the time of reverse rotation operation in which the rotation direction of the discharging roller 207a is reversed to a direction in which the paper sheet S is pulled back into the device during the two-sided printing.

In the present embodiment the planetary gear 314 has a stepped gear structure, and the driving force is transmitted at the drive output side by engaging transmission coupling portions 321b, 322a of the sun gear 321 and the output gear 322, respectively. The planetary gear 314 is a two-step stepped gear in which two gears that differ in a pitch circle size, namely, a first gear 314a and a second gear 314b, are integrated. The inner-tooth gear 315b of the planetary input gear 315 on the drive input side meshes with the first gear 314a of the planetary gear 314, and the outer-tooth gear 321a of the sun gear 321 meshes with the second gear 314b of the planetary gear 314.

<Forward Rotation Operation>>

The configuration and operation of the driving force transmission device 309 at the time of forward rotation operation in the present embodiment will be described hereinbelow with reference to FIG. 29. The clutch input gear 312a of the electromagnetic clutch 312 meshes with the drive input gear 311, which is not shown in FIG. 29, and the rotational driving force in the direction of an arrow 362 is transmitted at all times from the drive motor M.

The clutch input gear 312a is configured integrally with the armature of the electromagnetic clutch 312 and held rotatably about the clutch output shaft 312b configured integrally with the rotor of the electromagnetic clutch 312. Following the rotation of the drive input gear 311, the clutch input gear 312a rotates in the direction of the arrow 362. The clutch input gear 312a meshes, on the other side, with the outer-tooth gear 315a provided at the outer circumference of the planetary input gear 315, and the planetary input gear 315 rotates in the direction of an arrow 363. An inner-tooth gear 315b is provided on the outer circumference of the planetary input gear 315 and meshes at one side with the first gear 314a of the planetary gear 314. The planetary gear 314 is rotatably supported about the planetary support shaft 313a provided on the side surface of the carrier 313.

The carrier gear 313b is provided at the outer contour surface of the carrier 313 and meshes with the adjacent carrier input gear 318. The carrier input gear 318 has a transmission coupling 318b and mates with the parallel pin 317b of the drive transmission shaft 317. The D-cut surface 317a of the drive transmission shaft 317 mates with the clutch output shaft 312b provided integrally with the rotor of the electromagnetic clutch 312. Further, the carrier 313 meshes with the torque limiter 319 through parallel pins 320a, 320b provided at a drive transmission shaft 320 and receives a predetermined rotational load from the torque limiter 319. The drive transmission shaft 320 is rotationally supported on the frame of the image-forming apparatus 301.

The drive transmission shaft 320, the carrier 313, the carrier input gear 318, and the drive transmission shaft 317 of the electromagnetic clutch 312 are maintained in a stationary state by the rotational load of the torque limiter 319. Since the carrier 313 is maintained in the stationary state, the planetary gear 314 is spun in the direction of an arrow 364 about the planetary support shaft 313a of the stationary carrier 313 by the rotational power received from the inner-tooth gear 315b of the planetary input gear 315. The second gear 314b of the planetary gear 314 meshes with the outer-tooth gear 321a of the sun gear 321, and the planetary output gear 316 rotates in the direction of an arrow 365.

As mentioned hereinabove, since the sun gear 321 and the output gear 322 are meshed by the respective transmission coupling portions 321b, 322a, the output gear 322 rotates in the direction of an arrow 366 which is the same as the rotation direction of the sun gear.

<<Reverse Rotation Operation>>

The configuration and operation of the driving force transmission device 309 at the time of reverse rotation operation in the present embodiment will be described hereinbelow with reference to FIG. 30. The clutch input gear 312a of the electromagnetic clutch 312 meshes with the drive input gear 311 which is not shown in FIG. 30, and the rotational driving force is transmitted from the drive motor M in the direction of the arrow 362 at all times in the same manner as at the time of forward rotation.

Where electric power is supplied to the electromagnetic clutch 312, the coil of the electromagnetic clutch 312 is energized and a magnetic force is generated. The armature and rotor of the electromagnetic clutch 312 are attracted to each other and integrated by the magnetic force. The clutch input gear 312a is integrated on the armature side, and the clutch output shaft 312b is integrated at the rotor side. Since the armature and rotor of the electromagnetic clutch 312 are integrated, the rotational power of the clutch input gear 312a is transmitted to the clutch output shaft 312b. As a result of overcoming the rotational load of the torque limiter 319, the clutch output shaft 312b rotates synchronously with the clutch input gear 312a in the direction of the arrow 362.

As described hereinabove, the clutch input gear 312a meshes with the outer-tooth gear 315a of the planetary input gear 315 and rotates the planetary input gear 315 in the direction of the arrow 363. At the same time, the clutch output shaft 312b of the electromagnetic clutch 312 rotates the carrier input gear 318 in the direction of the arrow 362 through the drive transmission shaft 317, the rotational power is transmitted to the carrier gear 313b, and the carrier 313 rotates in the direction of an arrow 367.

In the present embodiment, the number of teeth of the clutch input gear 312a of the electromagnetic clutch 312 is equal to the number of teeth of the carrier input gear 318, and the number of teeth of the outer-tooth gear 315a of the planetary input gear 315 is equal to the number of teeth of the carrier gear 313b. As a result, the carrier 313 rotates at a revolution speed equal to that of the planetary input gear 315.

At this time, the planetary gear 314 supported by the planetary support shaft 313a of the carrier 313 starts revolving together with the carrier 313 in the direction of an arrow 367. At the same time, the planetary input gear 315 also continues rotating at a constant speed in the direction of the arrow 363. The speed of the movement caused by the revolution of the planetary gear 314 is equal to the rotation speed of the planetary input gear 315. Therefore, the planetary gear 314 stops spinning when the first gear 314a meshes (comes into contact) with the inner-tooth gear 315b of the planetary input gear 315 at the tooth surface opposite that at the time of forward rotation. Practically at the same time, the second gear 314b of the planetary gear 314 comes into contact with the outer-tooth gear 321a of the sun gear 321 at the tooth surface opposite that at the time of forward rotation. As a result, the four elements, namely, the carrier 313, the planetary input gear 315, the planetary gear 314, and the sun gear 321 rotate integrally in the direction of an arrow 368. As a consequence, the rotation direction of the output gear 322 that is meshed by the transmission coupling portions 321b, 322a with the sun gear 321 is changed to the direction of an arrow 369. Since the outer-tooth gear 322b of the output gear 322 meshes with the discharging roller gear 207a through the paper discharge idler gear 207d depicted in FIG. 26, the discharging roller gear 207c and the discharging roller 207 perform the reverse rotation operation.

In the present embodiment, the ratio of the number of teeth of the planetary output gear 316 and the planetary gear 314 is 1:1, and the ratio of the number of teeth of the inner-tooth gear 315b of the planetary input gear 315 and the first gear 314a of the planetary gear 314 is 1:3. Further, the ratio of the number of teeth of the outer-tooth gear 315a of the planetary input gear 315 and the number of teeth of the clutch input gear 312a of the electromagnetic clutch 312 is taken as 1:1 with respect to the ratio of the number of teeth of the carrier gear 313b and the number of teeth of the carrier input gear 318. Further, the ratio of the number of teeth of the second gear 314b and the first gear 314a of the planetary gear is taken as 3:1. With such a configuration, the rotation speed of the planetary output gear 316 at the time of forward rotation is the same as at the time of reverse rotation.

By using the planetary gear 314 of a stepped gear configuration, as in the present embodiment, it is possible to realize at the same time the feature of making the rotation speed of the output shaft (output revolution speed) at the time of forward rotation equal to that at the time of reverse rotation, this feature being realized in Embodiment 8, and the feature of making the speed of the carrier 313 equal to that of the planetary input gear 315. Thus, the rolling transmission loss of gears generated between the inner-tooth gear 315b of the planetary input gear 315 and the first gear 314a of the planetary gear 314, and between the second gear 314b of the planetary gear 314 and the outer-tooth gear 321a of the sun gear 321 at the time of reverse rotation can be reduced.

Further, by disposing the carrier 313 and the torque limiter 319 on the drive transmission shaft 320 and linking through the parallel pins 320a, 320b of the drive transmission shaft 320, it is possible to reduce the mounting play by the gear backlash as compared with Embodiment 8. Therefore, the time required or transmitting the rotational load of the torque limiter 319 to the carrier 313 is shortened and the stopping time of the carrier 313 is also shortened.

As explained in Embodiment 8, it is apparent that the rotation speed at the time of forward rotation and at the time of reverse rotation can be set to any relationship. The ratio of the number of teeth of the constituent elements of the planetary gear mechanism, the ratio of the number of teeth of the outer-tooth gear 315a of the planetary input gear 315 and the number of teeth of the clutch input gear 312a of the electromagnetic clutch 312, and the ratio of the number of teeth of the carrier gear 313b and the number of teeth of the carrier input gear 318 may be adjusted.

Further, according to the present embodiment, by using the planetary gear 314 of a stepped gear configuration (two-step gear structure), it is possible to increase the number of locations for adjusting the gear ratio and enable finer setting of the rotation speed at the time of reverse rotation with respect to that at the time of forward rotation.

Further, the configuration of the present embodiment can be used in the case in which one of the sun gear, the inner-tooth gear, and the carrier supporting the planetary gear is taken as an input member, another one is taken as an output member, and the remaining one is taken as a first rotational member. Further, in the above-described configuration, a second rotational member meshing with the first rotational member may be provided, and the rotation direction of the output member may be switched by rotating and stopping the second rotational member.

Embodiment 10

The driving force transmission device and image-forming apparatus according to Embodiment 10 of the present invention will be described hereinbelow with reference to FIGS. 31 to 32. In the present embodiment, functions and components same as those in Embodiments 8 and 2 are assigned with same reference numerals and the explanation thereof is omitted. The features that are not explained herein are the same as in Embodiments 8 and 2.

Figure 31A:
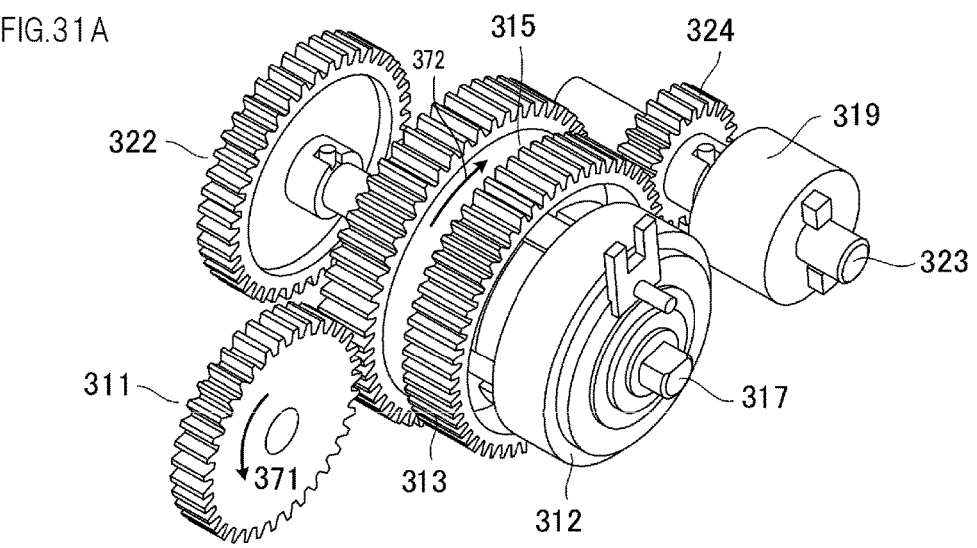
FIGS. 31A and 31B illustrate the configuration and operation of the driving force transmission device according to Embodiment 10 of the present invention.
Figure 31B:
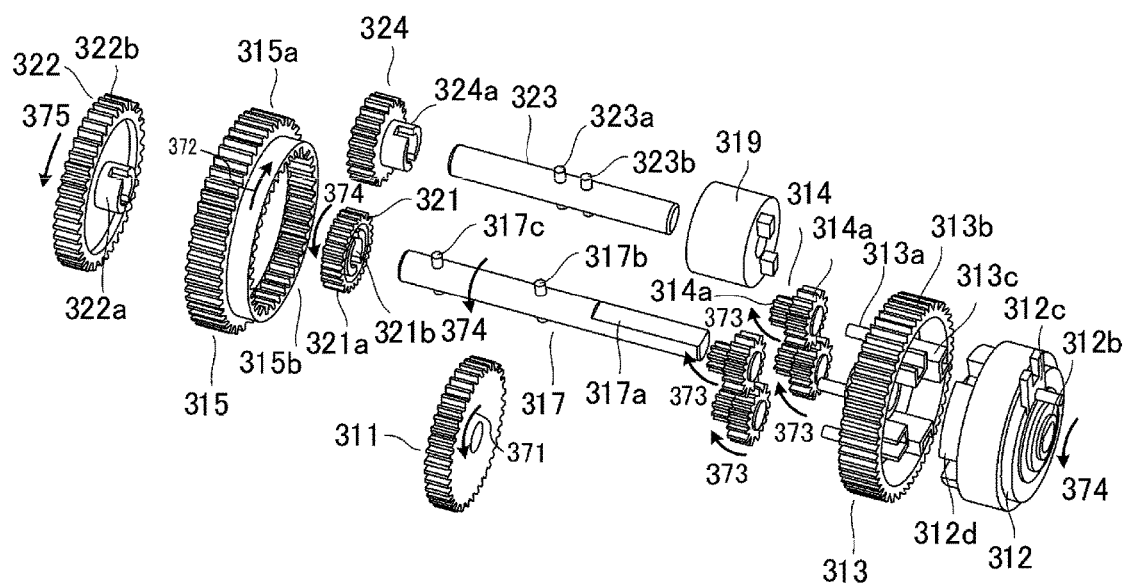
Figure 32A:
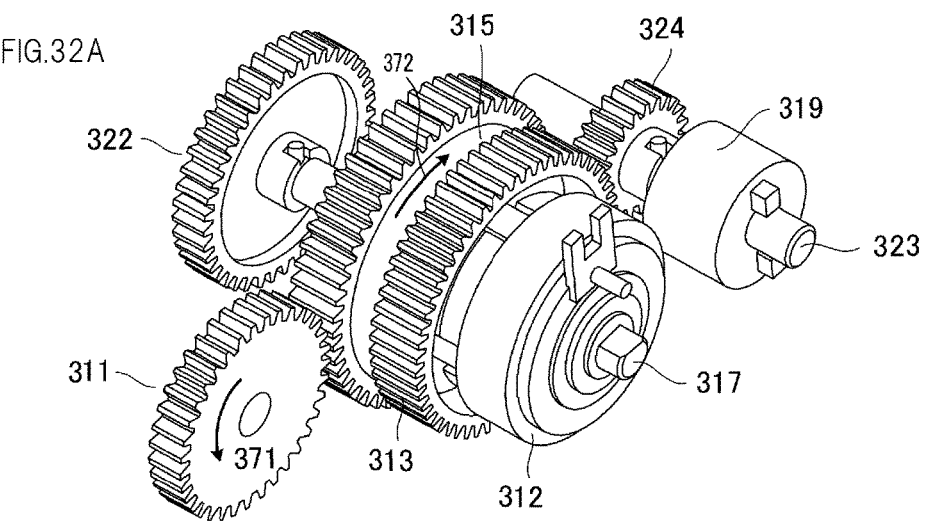
FIGS. 32A and 32B illustrate the configuration and operation of the driving force transmission device according to Embodiment 10 of the present invention.
Figure 32B:
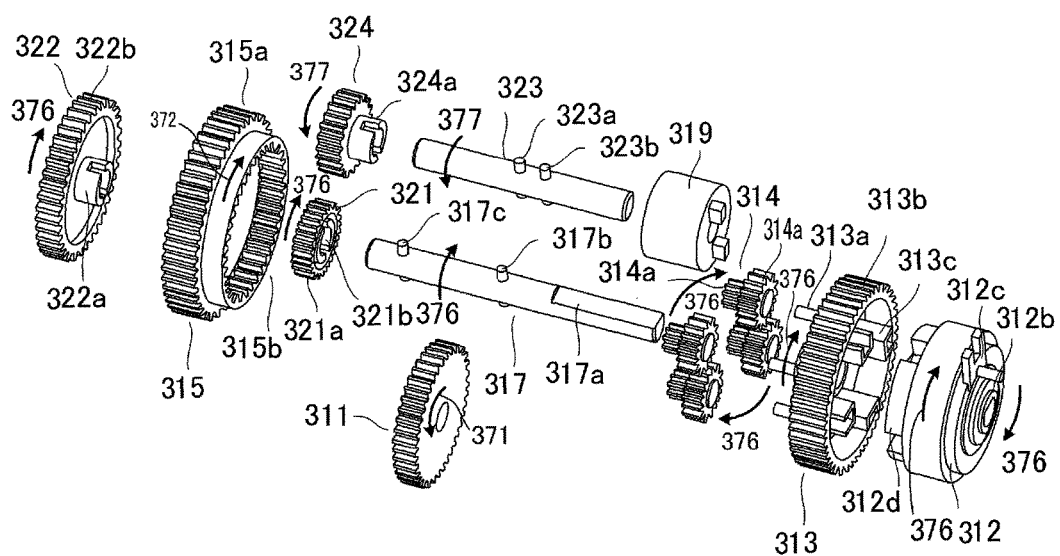

FIGS. 31 and 32 are perspective views illustrating the configuration of the driving force transmission device 309 according to the present embodiment. FIGS. 31A and 32A illustrate the state in which the components are integrated, and FIGS. 31B and 32B illustrate the state in which the components are disassembled. FIG. 31 illustrates the configuration and operation of the driving force transmission device 309 at the time of forward rotation operation in which the discharging roller 207a rotates in the direction of discharging the paper sheet S into the paper discharge tray 208. FIG. 32 illustrates the configuration and operation of the driving force transmission device 309 at the time of reverse rotation operation in which the rotation direction of the discharging roller 207a is reversed to a direction in which the paper sheet S is pulled back into the device during the two-sided printing.

In the driving force transmission device 309, the unidirectional rotational driving force indicated by an arrow 371 is inputted to the drive input gear 311 depicted in FIG. 31A from the drive motor M depicted in FIG. 26 through a gear train (not shown in the figure). Further, the paper discharge idler gear 207d and the discharging roller gear 207c for rotationally driving the discharging roller 207a depicted FIG. 26 mesh with the output gear 322 of the driving force transmission device 309, and the discharging roller 207a also rotates forward or reverse according to the switching of the forward and reverse rotation of the output gear 322 by the driving force transmission device 309.

<<Forward Rotation Operation>>

The configuration and operation of the driving force transmission device 309 at the time of forward rotation operation in the present embodiment will be explained hereinbelow with reference to FIG. 31.

As depicted in FIG. 31, at the drive input side, the input gear 311 meshes with the outer-tooth gear 315a of the planetary input gear 315, and the rotation in the direction of an arrow 372 is transmitted to the planetary input gear 315. The planetary input gear 315 has the inner-tooth gear 315b on the inner circumference thereof, the inner-tooth gear 315b meshes with the first gear 314a of the planetary gear 314 having a stepped gear configuration. The planetary gear 314 is rotationally supported about the planetary support shaft 313a provided on the side surface of the carrier 313. At the drive output side, the second gear 314b of the planetary gear 314 meshes with the outer-tooth gear 321a of the sun gear 321. As a result of the drive transmission couplings 321b, 322a of the sun gear 321 and the output gear 322, respectively, engaging with the parallel pins 317b, 317c provided at the drive transmission shaft 317, the sun gear 321, the output gear 322, and the drive transmission shaft 317 rotate integrally. Therefore, the rotational driving force transmitted from the planetary gear 314 to the sun gear 321 is outputted from the output gear 322.

A clutch input coupling 312d of the electromagnetic clutch 312 meshes with a coupling portion 313c provided at the carrier 313. The clutch input coupling 312d is configured integrally with the armature of the electromagnetic clutch 312 and supported rotationally about the clutch output shaft 312b configured integrally with the rotor of the electromagnetic clutch 312. The clutch output shaft 312b of the electromagnetic clutch 312 mates with a D-cut surface 317a of the drive transmission shaft 317, and when the sun gear 321 rotates, the clutch output shaft 312b of the electromagnetic clutch 312 also rotates synchronously.

The carrier gear 313b is provided at the outer contour surface of the carrier 313 and meshes with an adjacent rotational load input gear 324. The rotational load input gear 324 has a transmission coupling 324a and mates with a parallel pin 323a of a rotational load input shaft 323. The rotational load input shaft 323 meshes with the torque limiter 319 through a parallel pin 323b and receives a predetermined rotational load from the torque limiter 319. The rotational load input shaft 323 is rotationally supported on the frame of the image-forming apparatus 301.

The rotational load input shaft 323, the rotational load input gear 324, the carrier 313, and the input coupling 312d of the electromagnetic clutch 312 are maintained in a stationary state by the rotational load of the torque limiter 319. Since the carrier 313 is maintained in the stationary state, the planetary gear 314 is spun in the direction of an arrow 373 about the planetary support shaft 313a of the stationary carrier 313 by the rotational power received from the inner-tooth gear 315b of the planetary input gear 315. Since the second gear 314b of the planetary gear 314 meshes with the outer-tooth gear 321a of the sun gear 321, the sun gear 321 rotates in the direction of an arrow 374.

As mentioned hereinabove, since the sun gear 321 and the output gear 322 are meshed by the respective drive transmission couplings 321b, 322a with the parallel pins 317b, 317c provided at the drive transmission shaft 317, the output gear 322 rotates in the direction of an arrow 375.

<<Reverse Rotation Operation>>

The configuration and operation of the driving force transmission device 309 at the time of reverse rotation operation in the present embodiment will be described hereinbelow with reference to FIG. 32. In the configuration depicted in FIG. 32, the outer-tooth gear 315a of the planetary input gear 315 meshes with the drive input gear 311, and the rotational driving force is transmitted from the drive motor M in the direction of the arrow 372 at all times.

Where electric power is supplied to the electromagnetic clutch 312, the coil of the electromagnetic clutch 312 is energized and a magnetic force is generated. The armature and rotor of the electromagnetic clutch 312 are attracted to each other and integrated by the magnetic force. The input coupling 312d is integrated on the armature side, and the clutch output shaft 312b is integrated at the rotor side. Since the armature and rotor are integrated, the clutch output shaft 312b, which rotates synchronously with the sun gear 321 in the direction of the arrow 374 depicted in FIG. 31B by the rotational power received from the sun gear 321 through the drive transmission shaft 317, attempts to rotate synchronously with the clutch input coupling 312d. The clutch input coupling 312d of the electromagnetic clutch 312 is meshed with the coupling portion 313c provided at the carrier 313, and the carrier 313 also starts rotating synchronously with the sun gear 321 through the clutch input coupling 312d and the clutch output shaft 312b of the electromagnetic clutch 312. At the same time, the planetary gear 314 stops spinning.

As mentioned hereinabove, the carrier 313 receives the rotational load from the torque limiter 319 through the adjacent rotational load input gear 324 and the rotational load input shaft 323. Therefore, the synchronous rotation of the drive transmission shaft 317, clutch output shaft 312b, clutch input coupling 312d, and the carrier 313 in the direction of the arrow 374 depicted in FIG. 31B by the rotational power of the sun gear 321 is stopped instantaneously. At this time, the sun gear 321 and the carrier 313 are in a state of being fixed by the electromagnetic clutch 312. Therefore, the sun gear 321 and the carrier 313 overcome the rotational load of the torque limiter 319 under the effect of the rotational power of the planetary input gear 315, which receives the rotational power from the drive motor M, and rotate integrally in the direction of an arrow 376.

Since the sun gear 321 and the output gear 322 are meshed by the respective drive transmission couplings 321b, 322a with the parallel pins 317b, 317c provided at the drive transmission shaft 317, as mentioned hereinabove, the output gear 322 rotates in the direction of the arrow 376 which is the same as the rotation direction of the sun gear 321. Since the outer-tooth gear 322b of the output gear 322 meshes with the discharging roller gear 207a through the paper discharge idler gear 207d depicted in FIG. 26, the discharging roller gear 207c and the discharging roller 207 perform the reverse rotation operation.

In the present embodiment, the ratio of the number of teeth of the inner-tooth gear 315b of the planetary input gear 315 and the first gear 314a of the planetary gear 314 is taken as 1:3, and the ratio of the number of teeth of the second gear 314b and the first gear 314a of the planetary gear is taken as 3:1. With such a configuration, the rotation speed of the planetary output gear 316 at the time of forward rotation is the same as at the time of reverse rotation.

In the present embodiment, the carrier 313 is caused to rotate synchronously and integrally with the sun gear 321 by disposing the carrier 313 and the electromagnetic clutch 312 on the drive transmission shaft 317 and mating and linking the coupling portion 313c provided at the carrier 313 with the clutch input coupling 312d of the electromagnetic clutch 312. Further, in the present embodiment, the planetary gear 314 has a stepped gear configuration. As a result, it is possible to realize at the same time the feature of making the rotation speed of the output shaft (output revolution speed) at the time of forward rotation equal to that at the time of reverse rotation, this feature being realized in Embodiment 8, and the feature of making the speed of the carrier 313 equal to that of the planetary input gear 315. Thus, the rolling transmission loss of gears generated between the inner-tooth gear 315b of the planetary input gear 315 and the first gear 314a of the planetary gear 314, and between the second gear 314b of the planetary gear 314 and the outer-tooth gear 321a of the sun gear 321 at the time of reverse rotation can be reduced.

In addition, in the present embodiment, the torque limiter 319 is disposed separately from the driving force transmission path from the drive motor M to the carrier 313. As a result, the rotational load required for the torque limiter 319 can be freely set by adjusting the number of teeth of the carrier gear 313b of the carrier 313 and the rotational load input gear 324.

Further, as described in Embodiment 8, it is apparent that the rotation speed at the time of forward rotation and at the time of reverse rotation can be set to any relationship by changing the ratio of the number of teeth of the constituent elements of the planetary gear mechanism.

In the above-described embodiments, the electromagnetic clutch 312 is used as the actuator, but the actuator that can be used in the present invention is not limited to the aforementioned electromagnetic clutch. Thus, any actuator enabling transmission and disconnection of rotational driving force with a simple configuration can be used as appropriate. The rotational load application means is also not limited to the torque limiter described in the embodiments, and any means capable of regulating the free rotation when the transmission of driving force to the carrier is cut off can be used as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications No. 2013-205241, filed Sep. 30, 2013, No. 2013-205242, filed Sep. 30, 2013, No. 2013-205243, filed Sep. 30, 2013 and No. 2014-195849, filed Sep. 25, 2014 which are hereby incorporated by reference herein in their entirety.

What is claimed is:

1. A driving force transmission device that transmits a driving force from a drive source,
the driving force transmission device comprising:
a first annular gear;
a second annular gear rotating coaxially with the first annular gear;
a first inner gear disposed inside the first annular gear and meshing with the first annular gear;
a second inner gear disposed inside the second annular gear and meshing with the second annular gear and the first inner gear;
a carrier rotatably supporting the first inner gear and the second inner gear and rotating coaxially with the first annular gear; and
an actuator that, in a case where one of the first annular gear, the second annular gear, and the carrier is an input member, another one is an output member, and the remaining one is a rotational member, causes either one of the input member and the output member to rotate integrally with the rotational member,
wherein, when the driving force is inputted from the drive source to the input member and the input member is rotated unidirectionally, a rotation direction of the output member in a case where one of the input member and the output member rotates integrally with the rotational member is reversed with respect to that in a case where one of the input member and the output member does not rotate integrally with the rotational member.

2. The driving force transmission device according to claim 1, wherein a gear portion of the first inner gear that meshes with the first annular gear and a gear portion of the first inner gear that meshes with the second inner gear are disposed side by side in a shaft direction of the first inner gear.

3. The driving force transmission device according to claim 2, wherein the first inner gear is a stepped gear in which a pitch circle diameter of the gear portion that meshes with the first annular gear and a pitch circle diameter of the gear portion that meshes with the second annular gear differ from each other.

4. The driving force transmission device according to claim 1, wherein the first inner gear and the second inner gear are gears of the same shape.

5. The driving force transmission device according to claim 1, further comprising:
- an engagement portion that is held at the rotational member and can move to an engaging position in which the engagement portion is engaged with one of the input member and the output member and a disengaging position in which the engagement portion is not engaged with one of the input member and the output member;
- a biasing member that biases the engagement portion to move from the disengaging position to the engaging position; and
- a movable portion that can be moved by the actuator to a contact position in which the movable portion is in contact with the rotational member and a separated position in which the movable portion is separated from the rotational member, wherein,
- when the movable portion is at the separated position, the engagement portion is at the engaging position in which the engagement portion is engaged with the one of the input member and the output member and the rotational member rotates integrally with the one of the input member and the output member, and
- the engagement portion is moved to the disengaging position, in which the engagement portion is not engaged with the one of the input member and the output member, and the rotation of the rotational member is regulated by contacting with the movable portion that is in the contact position contacting with the rotational member.

6. The driving force transmission device according to claim 5, wherein
- the rotational member has a contacted portion that is linked to the engagement portion and is in contact with the movable portion when the movable portion is in the contact position, and
- the engagement portion is moved from the engaging position to the disengaging position against a biasing force of the biasing member by a force received by the contacted portion from the movable portion.

7. The driving force transmission device according to claim 1, wherein a rotation shaft of the first inner gear and a rotation shaft of the second inner gear are not coaxial with a rotation shaft of the rotational member.

8. An image-forming apparatus that forms an image on a recording material,
the apparatus comprising:
- an image-forming unit that forms an image on one surface of the recording material;
- a rotating member for conveying the recording material that has passed through the image-forming unit;
- the driving force transmission device according to claim 1, which can switch forward and reverse the rotation direction of the rotational driving force transmitted to the rotating member; and a
- conveying unit that conveys the recording material to an upstream side of the image-forming unit after the conveying direction of the recording material is reversed by reversing the rotation direction of the rotating member.

* * * * *